US009628501B2

(12) United States Patent
Datta Ray et al.

(10) Patent No.: US 9,628,501 B2
(45) Date of Patent: Apr. 18, 2017

(54) PERVASIVE, DOMAIN AND SITUATIONAL-AWARE, ADAPTIVE, AUTOMATED, AND COORDINATED ANALYSIS AND CONTROL OF ENTERPRISE-WIDE COMPUTERS, NETWORKS, AND APPLICATIONS FOR MITIGATION OF BUSINESS AND OPERATIONAL RISKS AND ENHANCEMENT OF CYBER SECURITY

(71) Applicant: Albeado, Inc., Saratoga, CA (US)

(72) Inventors: Partha Datta Ray, Saratoga, CA (US);
Atluri Bhima Ranjit Kumar, Cupertino, CA (US); Christopher Reed, Soquel, CA (US); Atul Prakash Agarwal, Kolkata (IN)

(73) Assignee: Albeado, Inc., Saratoga, CA (US)

( * ) Notice: Subject to any disclaimer, the term of this patent is extended or adjusted under 35 U.S.C. 154(b) by 235 days.

(21) Appl. No.: 14/477,815

(22) Filed: Sep. 4, 2014

(65) Prior Publication Data
US 2014/0380488 A1 Dec. 25, 2014

Related U.S. Application Data

(63) Continuation of application No. 13/652,229, filed on Oct. 15, 2012, now Pat. No. 8,856,936.
(Continued)

(51) Int. Cl.
*H04L 29/06* (2006.01)
(52) U.S. Cl.
CPC ...... *H04L 63/1433* (2013.01); *H04L 63/1408* (2013.01); *H04L 63/20* (2013.01)

(58) Field of Classification Search
CPC .. H04L 63/1433; H04L 63/20; H04L 63/1408
See application file for complete search history.

(56) References Cited

U.S. PATENT DOCUMENTS 6,643,832 B1 11/2003 Ray et al.
6,792,546 B1 9/2004 Shanklin et al.
(Continued)

OTHER PUBLICATIONS

"Guidelines for Smart Grid Cyber Security: vol. 1, Smart Grid Cyber Security Strategy, Architecture, and High-Level Requirements", The Smart Grid Interoperability Panel—Cyber Security Working Group; NISTIR 7628, Aug. 2010, 289 pages.
(Continued)

*Primary Examiner* — Matthew Smithers
(74) *Attorney, Agent, or Firm* — Perkins Coie LLP

(57) ABSTRACT

Real time security, integrity, and reliability postures of operational (OT), information (IT), and security (ST) systems, as well as slower changing security and operational blueprint, policies, processes, and rules governing the enterprise security and business risk management process, dynamically evolve and adapt to domain, context, and situational awareness, as well as the controls implemented across the operational and information systems that are controlled. Embodiments of the invention are systematized and pervasively applied across interconnected, interdependent, and diverse operational, information, and security systems to mitigate system-wide business risk, to improve efficiency and effectiveness of business processes and to enhance security control which conventional perimeter, network, or host based control and protection schemes cannot successfully perform.

22 Claims, 21 Drawing Sheets

Related U.S. Application Data

(60) Provisional application No. 61/547,610, filed on Oct. 14, 2011.

(56) References Cited

U.S. PATENT DOCUMENTS

| | | | |
|---|---|---|---|
| 7,020,589 | B1 | 3/2006 | Datta Ray et al. |
| 7,246,156 | B2 | 7/2007 | Ginter et al. |
| 7,665,119 | B2 | 2/2010 | Bezilla et al. |
| 7,743,421 | B2 | 6/2010 | Cosquer et al. |
| 7,761,920 | B2 | 7/2010 | Bezilla et al. |
| 7,779,119 | B2 | 8/2010 | Ginter et al. |
| 7,854,005 | B2 | 12/2010 | Lyle et al. |
| 7,893,830 | B2 | 2/2011 | Anand et al. |
| 7,904,959 | B2 | 3/2011 | Sidiroglou et al. |
| 7,926,107 | B2 | 4/2011 | Amoroso et al. |
| 7,930,256 | B2 | 4/2011 | Gonsalves et al. |
| 7,934,253 | B2 | 4/2011 | Overcash et al. |
| 7,934,254 | B2 | 4/2011 | Graham |
| 7,941,855 | B2 | 5/2011 | Sung et al. |
| 7,953,839 | B2 | 5/2011 | Sim et al. |
| 7,992,203 | B2 | 8/2011 | Relyea |
| 7,992,204 | B2 | 8/2011 | Shraim et al. |
| 8,504,979 | B2* | 8/2013 | Gella .................. G06F 8/20 717/101 |
| 8,856,936 | B2* | 10/2014 | Datta Ray .......... H04L 63/1408 726/25 |
| 8,881,288 | B1* | 11/2014 | Levy .................. G06F 21/577 709/225 |
| 9,083,748 | B2* | 7/2015 | Monahan .............. H04L 63/20 |
| 9,258,321 | B2* | 2/2016 | Amsler .............. H04L 63/1425 |
| 9,305,106 | B1* | 4/2016 | Wang ................ G06F 17/30893 |
| 2005/0131828 | A1 | 6/2005 | Gearhart |
| 2005/0132225 | A1 | 6/2005 | Gearhart |
| 2005/0165636 | A1 | 7/2005 | Jabbour |
| 2005/0256735 | A1* | 11/2005 | Bayne ................ G06Q 10/0639 705/7.38 |
| 2007/0061125 | A1 | 3/2007 | Bhatt et al. |
| 2008/0077474 | A1* | 3/2008 | Dumas .................. G06Q 10/00 705/7.12 |
| 2008/0140484 | A1* | 6/2008 | Akerman .............. G06Q 10/06 705/7.11 |
| 2008/0167920 | A1* | 7/2008 | Schmidt ............ G06Q 10/0637 705/7.36 |
| 2009/0281864 | A1* | 11/2009 | Abercrombie ......... G06Q 10/04 705/7.37 |
| 2010/0153156 | A1* | 6/2010 | Guinta .................. G06Q 10/10 705/7.28 |
| 2011/0039237 | A1* | 2/2011 | Skare ................ G05B 23/0267 434/118 |
| 2011/0125548 | A1 | 5/2011 | Aharon et al. |
| 2011/0126111 | A1* | 5/2011 | Gill ................... G06F 21/55 715/736 |
| 2011/0184901 | A1* | 7/2011 | Lommock ............. G06F 21/55 706/47 |
| 2012/0011077 | A1* | 1/2012 | Bhagat ................ G06F 21/554 705/317 |
| 2012/0084843 | A1* | 4/2012 | Hernoud .............. G06F 21/32 726/5 |
| 2012/0096549 | A1 | 4/2012 | Amini et al. |
| 2012/0180133 | A1* | 7/2012 | Al-Harbi ............ H04L 63/1433 726/25 |
| 2012/0224057 | A1* | 9/2012 | Gill ..................... G06F 21/55 348/143 |
| 2012/0304300 | A1 | 11/2012 | LaBumbard |
| 2013/0086376 | A1* | 4/2013 | Haynes ................. G06F 21/577 726/25 |
| 2013/0091539 | A1* | 4/2013 | Khurana .............. G06F 21/552 726/1 |
| 2015/0229651 | A1* | 8/2015 | Nicodemus ........... G06F 21/55 726/1 |

OTHER PUBLICATIONS

"Recommended Security Controls for Federal Information Systems", National Institute of Standards and Technology, U.S. Dept. of Commerce, Special Publication 800-53 Revision 3, Aug. 2009, 237 pages.

Chang, Naehyuck, "Concept of Logic Synthesis", Computer Systems Design, Seoul National University, Presentation,, Oct. 2007, 41 pages.

Clark, et al., "Strata-Gem: Risk Assessment Through Mission Modeling", ACM QoP '08, Oct. 2008, pp. 51-57.

Kumar, R. et al., "Induced Chaos for an Agile Smart Grid", IEEE PES Innovative Smart Grid Technology Conference, Washington DC, Jan. 2012, 4 pages.

Mell, P. et al., "The Common Vulnerability Scoring System (CVSS) and Its Applicability to Federal Agency Systems", Nat'l Institute of Standards and Technology, U.S. Dept. of Commercer, NIST Interagency Report 7435, Aug. 2007, 33 pages.

Ray, P. D. et al., "Smart Power Grid Security: A Unified Risk Management Approach", IEEE Int'l Carnahan Conference on Security Technology, San Jose, CA, Oct. 2010, 10 pages.

Ryan, D. J. et al., "Risk Management and Information Security", Presented at the 11th Computer Security Applications Conference, New Orleans, LA, retrieved online from url: http://www.julieryan.com/riskmgt.htm, Dec. 1995, 6 pages.

Sheng, S. et al., "Wind Turbine Drivetrain Condition Monitoring—An Overview", Presented at the Mechanical Failures Prevention Group: Applied Systems Health Management Conference 2011, Virginia Beach, VA, retrieved online from url: http://www.nrel.gov/docs/fy12osti/50698.pdf, May 2011, 21 pages.

Stoneburner, G. et al., "Risk Management Guide for Information Technology Systems", National Institute of Standards and Technology, Technology Administration, U.S. Dept. of Commerce, Special Publication 800-30; Recommendation of the National Institute of Standards and Technology, Jul. 2002, 55 pages.

Stouffer, K. et al., "Guide to Industrial Control Systems (ICS) Security", National Institute of Standards and Technology, U.S. Dept. of Commerce, Special Publicaton 800-82, Jun. 2011, 155 pages.

Stranjak, A. et al., "A Mulit-Agent Simulation System for Prediction and Scheduling of Aero Engine Overhaul", Proc. of the 7th Int. Conf. on Autonomous Agents and Multiagent Systems (AAMAS)—Industry and Applications Track, Estoril Portugal, May 2008, 8 pages.

Tashi, et al., "Inforamtion Security Management is not only Risk Management", IEEE Computer Society; 2009 Fourth International Conference on Internet Monitoring and Protection, May 2009, pp. 116-123.

\* cited by examiner

| Control Posture (CP) | Standard Control Function_a | Standard Control Function_b | Macro Control Function_j | Composite Control Function |
|---|---|---|---|---|
| Security Control Posture_1 (High level functions, Topological locations, function strength, constraints) | SCF_11, TL_SCF11, FS_SCF11, CS_SCF11(latency, bandwidth, ...) | SCF_1n, TL_SCF1n, FS_SCF1n, CS_SCF1n(latency, ...) | Functional Device XY (Firewall), TL_MCF11, Configuration_MC11, latency of 4mSec for protection relay | $CCF((W_{11}, SCF\_11), ... (W_{1n}, SCF\_1n), ... (W_{1m}, MC11)), ...)$, $W_{ij}$ is the weight of the composition |
| Business Process Control Posture_2 (Rule set and parameters for business processes) | Decrease thermal tolerance bound for the asset for improved efficiency (tighten Rule) | Decrease frequency of replacing coolants since weather is cooler than normal for enhanced effectiveness of asset maintenance (relax Rule) | Avoid critical asset ($CA_{1m}$) outage based on real time operating conditions and trends | Add/modify Rules and parameters with optimized weight to avoid critical asset outage as well as avoid unneeded maintenance to make the process more efficient and effective |

PERVASIVE, DOMAIN AND SITUATIONAL-AWARE, ADAPTIVE, AUTOMATED, AND COORDINATED ANALYSIS AND CONTROL OF ENTERPRISE-WIDE COMPUTERS, NETWORKS, AND APPLICATIONS FOR MITIGATION OF BUSINESS AND OPERATIONAL RISKS AND ENHANCEMENT OF CYBER SECURITY

CROSS REFERENCE TO RELATED APPLICATIONS

This application is a continuation of U.S. patent application Ser. No. 13/652,229, filed Oct. 15, 2012 and claims priority to U.S. provisional patent application Ser. No. 61/547,610, filed Oct. 14, 2011, each of which application is incorporated herein in its entirety by this reference thereto.

BACKGROUND OF THE INVENTION

Technical Field

The invention relates to enterprise business risk management. More particularly, the invention relates to pervasive, domain and situational-aware, adaptive, automated, and coordinated analysis and control of enterprise-wide computers, networks, and applications for mitigation of business and operational risks, including efficiency and effectiveness of business processes and enhancement of cyber security.

Description of the Background Art

Ubiquitous deployment of IT systems, as well as business and regulatory demands, are driving interconnection of operational technology (OT) domains with information technology (IT) and security technology (ST) domains. Increasing interactions among all these elements within and between enterprises allows new types of risks to emerge and allows risks from one domain to reach others.

These emergent and cross system risks allow adverse impacts to propagate from one system to others, requiring coordination among OT, IT, and ST systems to prevent and/or mitigate such events. Whether caused by natural disasters, deliberate attacks, equipment malfunctions, or process failures, the result is increased reports of security and operational events, thus raising the importance of cyber security and business risk management for enterprises and critical infrastructures, based both on business and regulatory compliance demands.

Security and risk properties of OT, IT, and ST systems today are typically assessed through sub-domain specific expertise of individuals. These ad hoc decisions are based on personal experience, as well as guidelines and alerts issued by government agencies and third parties. Current methods are inherently informal, based on subjective perceptions of risk. They are also unable to consider the numerous complex relationships between all the relevant security and risk concepts in a systemic fashion. The result is a non-holistic and fragmented OT and IT security and risk management approach which becomes less and less effective as system connectivity and complexity increases. Additionally, increasing flexibility of business processes and rising integration of OT, IT and ST systems require continuous risk assessment which cannot be satisfied by the response time of existing methods. To improve the integrity, repeatability, effectiveness, and timeliness of security and business risk analysis from various sources, reliance on formal and automated methods is required.

Most enterprise managers require a complete understanding of their business, operational, and information security risk exposures and needed postures. While IT staff may be competent in implementing security tools, they often do not have the expertise in business or operational modeling of domains such as power systems, financial systems, or health care systems and attendant risk management. Enterprises are concerned that revealing security and risk incidents attracts other malicious hackers to exploit vulnerabilities or leads to regulatory scrutiny and loss of brand value. This reluctance to disseminate security incident information results in poor quality of data on threats and vulnerabilities.

Although IT organizations are responsible for protecting the IT and ST systems, it is difficult for the enterprises to get a clear picture of security and operational postures without a formal risk analysis. Lack of automated processes is hindering wider adoption of enterprise wide security and business risk management, and is exposing the enterprises to disruptive risk events. Automated risk management with collection, collation, and correlation of data would enable reasonable statistical analysis to estimate risks, infer effective security and risk control measures, evaluate impact of threats on various assets deployed to support the myriad business process services on which the enterprise business functions are built, and allow self healing of the system through dynamic reconfiguration to achieve heightened security, improved efficiency and enhanced effectiveness.

Unified methodologies for automated risk management, freeing enterprises from reliance on subjective analysis based on checklists and guidelines, are needed to enhance security analysis comprehensively and systemically mitigate the operational and information security risks facing an enterprise. Because threats and vulnerabilities to existing and emergent services are continuously evolving, automated and adaptive methodologies to monitor situational contexts and refine their control postures as responses to such changes are required to improve the integrity of such dynamic and interconnected risk management system. To identify, predict, and offer resiliency for, and recovery from, such security events whose origin and manifestation could be very diverse, systems of analysis and inference must be distributed throughout the domains of operation. Additionally, security, business risk and optimization controls must be pervasively applied, rather than being dictated by a centralized security manager. Such systems also allow organizations to start with a small initial data set and gradually refine and improve the analysis as high fidelity data becomes available. Such systems would also allow organizations to perform qualitative analysis on a broad scope, and then perform a more detailed quantitative analysis based on a critical subset of the problem.

Unified risk management approaches are also critically needed to guide resource allocations effectively, identify implementation of best practices on the basis of practical and meaningful benchmarks, and demonstrate various regulatory and business compliances for all domains of an enterprise. Such approaches must provide frameworks which can consider all the dynamic and interconnected vulnerabilities, system optimizations, different performance requirements, and security and risk priorities of the various data and control flow through the entire information system without adversely impacting various performance requirements and implementation limitations within the domains.

Unified security and risk analysis can offer opportunities to adapt domain specific solutions that have been used for decades to manage risks in one domain to other domains of an enterprise or to other business segments altogether different. Existing monitoring and response methods and technologies deployed to protect against inadvertent security and risk problems, such as equipment failures, operational errors, risky or sub-optimal business processes and natural disasters could be leveraged and extended to include deliberate cyber attacks and security compromises resulting from the emerging convergence of the OT, IT, and ST systems in different business domains.

A unified risk model can take advantage of a correlated view of IT security and OT reliability consequences, based on unified event detection models and deep contextual understanding of the various operational and business process interdependencies in the enterprise to analyze significant events, predict correlated consequences, and provide intelligent, systematic, and coordinated responses on a real-time basis. Such integrated risk management should be based on consistently standardized security metrics and objective risk analysis processes, along with historical vulnerability and threat data, e.g. anomaly in traffic, attack signatures, information forensics, etc., that would enable domain specific statistical analysis and characterization of attack probabilities and risks.

Coordinated risk management requires secure automated information exchange among all domains of an enterprise to support analysis and intelligent decision making distributed throughout the enterprise. Adaptive orchestrations of situational awareness, domain knowledge including malware intelligence, inference engines and decision systems and, finally, control activations could ensure that the entire enterprise operates much more efficiently while enhancing end-to-end security and mitigating overall risk. Multiple domains with increasing interdependence among diverse functions, e.g. sensing, measuring, consuming, processing, controlling, interacting adaptively to situational and governance changes transform the enterprise-wide risk management into a complex system of activities.

SUMMARY OF THE INVENTION

In contrast to the state of the art, and as discussed in detail below, in the common framework of the herein disclosed invention, in any domain of an enterprise, e.g. OT, IT, or ST, engaged in diverse business segments, such as power utility, financial services, or health care, risk assessment starts with identifying the business functions of the enterprise and the business process services needed for supporting those functions, as well as the assets enabling those services. The vulnerabilities of the assets or groups of assets are identified along with the threats that can exploit those vulnerabilities. Risk control mechanisms that can be effective against the threats are identified. The above information is augmented by analytical capabilities to evaluate the effectiveness of each control mechanism in mitigating the enterprise-wide risks. The results of such evaluation can be used to subsequently prioritize and refine available security and risk control mechanisms on an ongoing basis.

An enterprise can analyze and mitigate myriad risks in the common framework. Risks can be categorized according to the vulnerabilities of the various assets or groups of assets. In this context, an entire enterprise can also be considered as an asset. Assets can be physical or logical, e.g. brand equity, intellectual property, machineries, computers. etc. For example, a supply chain may be vulnerable to route flooding, political unrest at the source or transit paths, ordering information blocking, or computer equipment failures, all with distinct sources such as weather, geopolitics, or computer network robustness. In this sense, cyber security relates vulnerabilities of the assets of the IT system to likely threats which could be known, evolving, or emergent. The objective of the risk analysis then becomes assessment of potential damage to business functions that could be caused by various threats that exploit vulnerabilities of the assets deployed to support various business process services which, in turn, support the affected business functions. It should be noted that a given business function or service thus can be vulnerable to several different types of risks including security, efficiency and effectiveness.

In such a coordinated risk management system formulated for multiple domains, it is necessary to use various weighting factors to the attributes relevant to each domain to trade-off costs and benefits properly in the different domains. For example, if the probabilities of threats in one and only one domain are given non-zero weighting factors, e.g. IT or security domain, then the system essentially behaves as a dedicated risk management system of that domain, e.g. IT or security domain, while analysis and information of other domains are zeroed out of the process. Thus, cyber security enhancement can be viewed as a specific function within an enterprise-wide risk management system. In addition, for all practical purposes security and risk in any operational domain is very closely intertwined with the security of the associated IT and ST systems.

Traditional security measures are often point solutions applied to each target system, e.g. computers, networks, or applications. These methods, e.g. Intrusion detection systems (IDS) or intrusion prevention systems (IPS), end point device security, and firewall protection of LAN, are usually implemented in an uncoordinated isolation, without the context they need to distinguish an event from a non-event reliably and prioritize security protection based on criticality of business rules.

Traditional security measures can take on many forms, such as:

(a) Perimeter, host, or application security based on passwords and digital certificates for authorization and authentication checks at an entry point, e.g. gateway to a network, port of a computer, or a remote call to an application;
(b) Host, storage, and application security based on scanning for signatures of known malware, e.g. viruses, worms, etc., either at the entry point or after the fact scan of various memory and storage elements;
(c) Perimeter security based on filtering out unwanted sources and destinations; and
(d) Data security based on cryptographic measures and key managements.

With little knowledge of each others' functions and capabilities, such point solutions lack the correlated domain and situational awareness needed to analyze events and inputs and respond with right-sized situational security by adapting their control postures to evolving situations and transitions. The resulting drawbacks include the following:

Data deluge and false positives. By treating attacks as isolated individual events, with no consideration of the operational network's state at any given time, traditional solutions may not differentiate between deliberate intrusions, operational errors, accidents, or normal events, resulting in false positives. Such false alarms keep administrators or automated tools focusing on less important or derivative issues. Aggregating and correlating available information pervasively with the domain and situational contexts with automated guidelines, e.g. majority voting from distributed monitoring points, validation through differences in peer nodes, proactively soliciting evidence (confirmation/refutation) from additional sources etc., will minimize false positives. Situational and domain specific context can be helpful in determining when an event indicates a security incident, such as a deliberate remote buffer overflow exploit attempt, versus false positives such as forgetful users attempting recurrent unsuccessful logins or poorly configured applications sending out broadcast packets rather than more targeted destinations.

Perimeter or point rather than pervasive security. Inadequately configured perimeter protection might protect systems from external attacks but have severe limitations when faced with attacks from within, perpetrated by implanted Trojan horse malware or malicious insiders. Additionally, once the perimeter security is compromised, the malware is free to inflict various data and control damage until the damage is so severe that the node is incapacitated, resulting in denial of service. The malware can also infect a number of networked elements in rapid succession. Collaborative and adaptive configurations of perimeter security across connected networks with situational awareness of trust boundaries resulting in coordinated overall security control through pervasive monitor and control, enhances true end to end security and risk management.

Novel attacks. While detecting and blocking well characterized attacks and errors, existing state of the art measures often fail to detect intrusions with new, unknown, and emergent signatures in time for effective counter measures. They often cannot differentiate an unfamiliar new attack from normal behavior or an operational error. Further they reject suspicious events and fail to learn more about the source or cause of the suspicious events and their consequences.

Onerous and demanding administrative intervention. Existing traditional solutions are often static and rely on periodically defined rules and analysis which do not adapt to situational changes. They also demand considerable administrative effort to respond to situational changes in the OT, IT, and ST system environments. Such tuning and interventions suffer from having a local and immediate problem solution focus rather than overall reduction of business risk.

There is a clear and long standing need for an integrated adaptive security and risk management system based on business process OT, IT and ST context to deal with the ever-changing threat environment in which networks, devices, and applications operate. The next generation security and risk control systems should adapt in real-time to domain and situational contexts. They also need security and risk governance drivers such as security and risk management blueprint, processes, and policies to adapt and evolve by learning from the analysis of patterns of short term risks, countermeasures, and their effectiveness in an automated way.

Also, interconnections of operational (OT), informational (IT), and security (ST) domains create rich variety of dynamic and structural interactions producing exploitable vulnerabilities and threat likelihood associated with each subsystem. This is due to emergence of new vulnerabilities resulting from the combined systems. These vulnerabilities may be dormant in an isolated system but become exploitable in the combined system.

Because threats cannot be eliminated altogether and always evolve, the risk management process is best served by focusing on vulnerabilities and countermeasures. The level of security impact or equivalently the level of acceptable risk is a policy decision, which must evolve with regulatory and business environments.

Accordingly, the inventors have discovered that all such demands dictate that future security and risk control solutions should perform the following tasks:

1. Successfully recognize anomalous behavior and differentiate potentially harmful (both previously known and novel) events from benign or non-events through correlation of diverse situational inputs and analysis results with operational domain contexts. For example, shortly after an exogenous source alerts the utility company (or the financial institution or the health care provider) to a new threat, corporate IT identifies inbound attacks to the security perimeter, the control network for the utility power network (or the trading exchange network of the financial institution or the health information exchange network of the care provider) sees a failed login attempt, and later a breaker opens (or a corporate bond derivative starts a stunning pace of deleveraging affecting unusually large set of counterparties). Coordinating information about events taking place across physical, cyber, and operational domains in the context of business processes supports determination of whether the event is an attack or not.

2. Enable enterprises to monitor and control the bi-directional information flow between various business and operational assets, especially in cases where user interaction and partner connectivity conjoin. On the operations network (OT) side, this includes the data flow for operations such as inter-control center communications protocol (ICCP) of a utility enterprise, or brokerage-exchange networks for a financial enterprise. Understanding other business process flows, such as user interaction and authentication into an operation network interface, or a partner connection, also is important. This constitutes situational knowledge of transactions flow to and from every edge point in the network and to each internal system with authorized access. This is critical to assess impact of detected events, track down affected users, processes, computers, networks, and applications.

3. Provide service resiliency by taking commensurate defensive and corrective action against the detected events on an ongoing basis, correlated with situational contexts, followed with a fine tuned change of control postures consistent with various security and operational blueprints, policies, and processes, as well as security and business rules. For example, once IT systems have been given a criticality rating, e.g. 1 for mission-critical database servers storing sensitive operational and customer information and 5 for Web servers with transient content, and a continuous stream of contextual environment data is gathered, then intrusion prevention solutions can begin to take actions dynamically and proactively to reduce operational overhead. Thus intrusion prevention rules that are not applicable to certain systems and applications in a particular IP range can be disabled, significantly reducing false positives. If new data indicates that a certain system has become vulnerable to known attacks, rules can be re-enabled. Additionally, changes in system or network behavior can be linked with defined system criticality to elevate the need for additional investigation through proactive solicitation of information and evidence from additional resources, helping analysts look for possible zero-day attacks or unidentified malware. For truly situational responses, IPS devices can trigger short-term network access control modifications to block malicious traffic immediately.

4. Provide systemic inference and implementation of coordinated control measures in the most effective, efficient, and secure way for real time and longer intervals. In an embodiment, the synthesis process for security control measures comprises exploration of best composition of available standard security functions, such as authentication, encryption, etc., along with reconfiguration or installation of macro security functions, such as a Web application filter, firewall, etc. All such functions can be pre-characterized in a library in terms of performance and various cost attributes, such as latency incurred, bandwidth, and processing power available to execute these functions. Other control attributes of business processes, such as efficiency and effectiveness, may be similarly explored for optimality by use of, for example, holistic analysis and synthetic configuration of the rules and parameters implementing the business processes.

Manual approaches for analysis and construction of control implementations are not equipped to address the complexity and response time for an interconnected OT, IT, and ST system. Automated synthesis of systemically appropriate control implementations is hence warranted. Similar automated approaches are used to design integrated circuits, in which computer aided design (CAD) programs can automatically translate a high level hardware specification into a circuit implementation having billions of logic gates.

5. Provide actionable guidance to business and system administrators or automated processes and tools regarding the scope of forensic processes, e.g. what to investigate, when to investigate and where to investigate.

To identify and synthesize appropriate security and control postures automatically, the cyber security and risk management system should be provided with a broad range of contextual information and the ability to process that information. Such continuous and multiply correlated information consists of data from various sources including, but not limited to:

Real-time operating conditions, as well as physical, operational, legal, and regulatory constraints of the enterprise business and operational processes;

Real-time operating conditions, as well as physical, operational, legal, and regulatory constraints of the enterprise IT infrastructure, which also hosts the cyber security infrastructure (ST);

Trends in situational transitions, e.g. traffic flow, performance curves, of the above two;

Prevailing threat environment, as well as security and operational blueprints, policies, processes, and rules of the enterprise;

Pre-characterized libraries of standard and macro control implementations used during the synthesis process;

Active solicitation of information, evidence, and knowledge from internal, e.g. normal operating domain, and external sources; and Actual and forecasted exogenous events affecting the operational, IT, and security systems, e.g. weather forecast and forest vegetation dryness to analyze fire hazard of a transmission system crossing a forested area, authorization changes of personnel and other HR events correlated with insider attack domain analysis, etc.

To be practical, the implementation of such comprehensive and coordinated system requires the use of functionally pervasive and structurally self-similar components distributed throughout the enterprise. They should be hierarchically organized in multiple dimensions in each relevant domain. Examples are organizational (headquarters, division, department, etc.), geographical (global, continental, national, regional, state, county, city, etc.), structural (enterprise-wide, systems, subsystems, equipment, etc.), and temporal (yearly, monthly, weekly, daily, hourly, etc.).

The temporal hierarchy is necessary to handle phenomena of different time scales and asynchronous events. Whereas a specific element's control posture might need to change in real-time as a response to situational changes, security and risk governance elements such as blueprint, policies, processes, etc. change much more slowly and deliberatively. Thus, the number of self-similar components to be managed and their coordination can become extremely large and complex.

The myriad components of the system described above are not only pervasively distributed, but are also interconnected, interdependent, and have diverse capabilities and requirements, i.e. by definition they constitute a complex system. Such complexity renders human intervention or centralized control impractical. For example, consider how telecommunication systems have evolved from rudimentary wired telephone circuits to the pervasive Internet. History shows similar complexity emerging as maritime trades, cultural exchanges, and other human efforts involving diverse, interconnected, and interdependent systems adapt and evolve in response to changes. Such systems, history also instructs us, are better monitored and controlled autonomously through distributed intelligence, rather than a centralized decision system.

Autonomous operation of a large scale complex system requires automated solutions that can adapt to evolving situations and emergent behavior in the various domains, as well as IT and ST systems. This, in turn, requires domain and situational awareness. Armed with real-time situational context, as well as domain specific knowledge of systems, subsystems, and components of both IT infrastructure, operational systems, and the underlying business processes, intrusion sensors and security control elements can dynamically react and respond to changing networks and threats. Such adaptive intrusion detection and prevention systems can be more accurate than their predecessors.

The required adaptive security capability can be realized through integration, correlation, and collaboration among the various information sources, analysis engines, and security controls. This requires knowledge of the business domains, business processes, and applications that identify the characteristics of applications in use and the corresponding expected patterns of traffic flow and/or user activities in the context of normative or anomalous behavior patterns of the whole system to identify and prevent unfolding threat events and to generate actionable alerts.

A coordinated security and business risk management system is disclosed herein. Embodiments of the invention take a systemic approach to consider relevant operational, informational, and security systems comprehensively. An exemplary embodiment of the invention comprises monitoring and controlling elements distributed throughout connected computers, networks, and applications. This creates an innovative business process risk management and security solution which is functionally pervasive and structurally self-similar. The solution adapts to evolving situations in the operational systems (OT) in diverse industry segments or domains, and the associated information systems (IT), as well as the security systems (ST). The situational inputs are correlated to, and analyzed against, structural and functional domain knowledge, known and emergent vulnerabilities, regulatory requirements, industry standards and best practices, and enterprise-specific operating policies and guidelines.

In an embodiment, formal business and security threat prioritization within the security and business risk analysis stage lowers the analysis and control priority of less relevant and less consequential inputs. Akin to the neurological process of filtering out redundant or unnecessary stimuli from the environment, known as sensory gating, this preprocessing significantly improves the analysis process by reducing the information overload and enhances the quality of the result thereof. Embodiments of the disclosed invention, being cognizant of the evolving and emergent nature of the above listed inputs, automatically adapts its security and business risk mitigation postures to such changes in real-time and at other relevant intervals.

The business process and security controls inferred by the disclosed solution are also adaptive to the roles and capabilities of the monitored and controlled elements (MCE) hosting the solution in the enterprise wide OT, IT, and ST networks. Once high level control measures are inferred, the task of implementing such controls in most efficient and effective way falls on a control synthesis process. Similar to logic or a high level synthesis process which transforms design intent and specification into optimized circuit implementation through various mapping and optimization algorithms, this process transforms the high level control requirements to lower level control measures using a pre-characterized library of control implementations specified by capacity, configuration, and performance. The control measure may also be determined to require modifications, additions, or parameter recalibration of a plurality of business process rules comprising any of physical, operational, security, and regulatory processes. Embodiments of the invention include an information, knowledge, and evidence update manager which acts as a proactive requestor of evidentiary reinforcements (corroboration/refutation) and knowledge that is either suspect to be compromised, corrupted, or unavailable in the operating environment, but that is helpful for the analysis and inference process. This occurs in an out-of-band manner, i.e. beyond normal operating domains, methods, and purposes.

BRIEF DESCRIPTION OF THE DRAWINGS

FIG. 13 is a schematic table showing security and business process control postures mapped to overall control functions which are weighted composition of standard and macro control functions according to the invention;

DETAILED DESCRIPTION OF THE INVENTION

Figure 1:
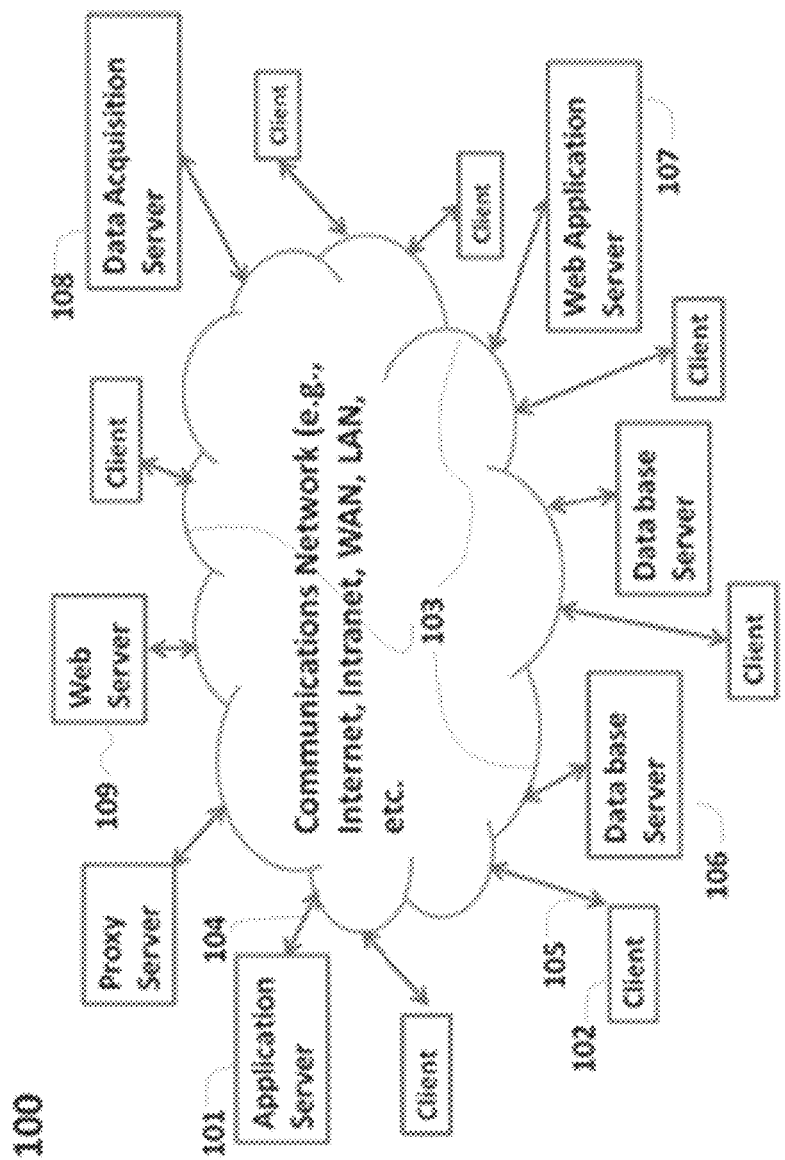
FIG. 1 is a block schematic diagram showing enterprise-wide computers, networks, and applications as the technical domain of the invention.

Most enterprise-wide networks and their systems, subsystems, and elements function as parts of an extended global IT network. Embodiments of the invention analyze and mitigate business risks and enhance cyber security throughout enterprise-wide OT, IT, and ST networks to maintain a high level of integrity and security, even after the conventional control measures in the network are compromised. This is accomplished by providing pervasive risk and security monitoring and control capabilities that adapt to existing security and control postures of target systems, subsystems, and elements at various hierarchical levels of the network based upon the real-time conditions on the network elements, as well as the elements of the underlying enterprise business processes that could be affected if and when the security of an element is breached. The adaptation is based on the enterprise domain knowledge relevant to the entire network, as well as its subsystems and elements in the context of the underlying business processes. Structural self-similarity of the disclosed innovation, adjusted to the roles, capabilities, and topological location of the MCEs contains implementation complexity.

For ease of discussion, an enterprise-wide computer network is considered as the aggregation of hardware and software comprising subsystems that include:

(a) One or more operations technology (OT) systems supporting the various business processes of an enterprise; and (b) One or more information technology (IT) systems supporting all other business and information processing needs of the enterprise.

For instance, the OT system could include an industrial control system (ICS) with embedded devices for monitoring and controlling the performance of other physical process equipment, e.g. power transmission lines or generators in an electric power utility, chemical process equipment in an oil refinery; equity or commodity trading systems in a financial instrument trading house, such as commodity or equity exchange networks and data historians operated by them; or a remote patient monitoring system connected to a patient database and alert system operated by a health care provider. All other parts of the enterprise-wide computer network, e.g. business function support systems such as supply chain, inventory management, HR systems, and financial systems, are referred to as the IT systems. Business process implementation may extend across both OT and IT systems, or it may be contained in one or the other. It should be appreciated that a single enterprise can have more than one OT system, each with its own domain specific capabilities.

Each OT system and the underlying business processes are in a continual flux due to business activities, as well as force majeure. Examples of changes in business activities include, for example, changes in the loading levels of power transmission lines and generators for power system utilities, changes in the volume of commodity or equity trade and transactions generated, unscheduled outages of process equipment for a chemical plant or refinery, etc. Examples of force majeure include, for example, lightning strike causing an electric power outage, trading halt in the commodity or equity exchanges for infrastructural collapse due to unexpected flooding, and other unplanned changes to the business processes. Other changes in the OT systems can result from long-term evolution of the business processes, e.g. addition of new generators and transmission lines, addition of new tradable financial instruments, etc.

Each IT system is in a similar flux due to similar events in business activities and force majeure. Examples include bursts of computational and communication activity following a significant change in the underlying business process, e.g. outage of a large generator or an important transmission line, or failure of a large data center. Other changes in the IT systems can result from long-term evolution of the IT needs, e.g. addition of new data center, technology migrations, etc.

In addition, the security threat environment is also in a continual flux due to changes in control implementations across systems, attackers' motivational events, their access to capital and technologies, and new discoveries of specific weaknesses in the target system, e.g. integer overflow or lack of bounds checking in OT applications, inadvertent or accidental configuration error, etc. Other changes in the threat environment can result from long-term evolution of technologies and changes in security rules, policies, and blueprints.

Embodiments of the invention relate to adapting the security and control posture of the enterprise-wide computer network, its systems, subsystems, and elements in response to situational changes, control implementations, and adjustments thereof, and other transitions in OT systems, IT systems, and the security threat environment. The adaptation is performed at various hierarchical levels and at various time scales. The hierarchical levels can range from the entire enterprise-wide network at the highest level to a single transaction at the lowest level. The temporal hierarchy can range from sub-second time scales at the fastest level to multiple years at the slowest level. Salient characteristics of the invention make it self-similar structurally, pervasive functionally, adaptive across various time scales, and relational analytically based on domain knowledge of the physical operational and IT systems, operating rules, and compliance policies.

Embodiments of the invention adapt security and control postures at various hierarchical levels of an enterprise-wide computer network at various timescales in response to events and changes in the status of OT and IT systems, as well as associated threat environments using domain specific structural and functional knowledge relevant to each OT system and IT system, along with near real-time situational awareness concerning the OT and IT systems.

Embodiments of the invention comprise a threat and vulnerability analysis module that is a computational engine which performs a formal computational algorithm to derive a ranked list of threats correlated to prioritized business functions. The system receives and processes dynamic input from other systems described herein. The dynamic output from this module may be used stand-alone for enterprise management of risks and/or it may be integrated into the pervasive framework to provide real-time and dynamic input back into learning and rules engines.

A formal business and security threat prioritization method within the security and business risk analysis stage significantly reduces the priorities of irrelevant and inconsequential situational inputs, thus improving the scalability of the analysis process and enhancing the quality and usefulness of the result thereof. Information exchanges among computer applications, along with state information about the devices and infrastructure controlled by them, are monitored. Relevant situational awareness information, including exogenous security incidents or state transition alerts are analyzed and correlated with business processes for automated security and business risk analysis. Should any change in the security and business control blueprint, process, rule, or real time or longer interval control postures be warranted, a control synthesis process is used to implement the needed changes.

Changes in control postures include, for example, lower level security control changes through modifications in encryption strength or number of authentication tokens, changes in macro level control functionalities, and configurations of security control methods and devices, such as firewalls, network demilitarized zones (DMZs), or service connectivity. In embodiments, a pre-characterized library of security control functions is used to construct optimal implementations of controls at appropriate strengths, locations, and other qualities. In some cases, security process changes, such as single sign-on across a cluster or categories of systems, filtering outbound traffic for specific information leakage, or deployment of more secure protocols, could be the control measure recommended by the inference and synthesis engine, some of which may need administrative intervention and a longer response time than the near real time feedback of the previous set of control measures. Recommendations and alerts to reconfigure or install new devices, protocols, and processes, where management involvement is called for can be part of the control measures recommended by embodiments of the invention.

Adding or modifying business process rules and/or their parameter settings to control business functions security, efficiency, and effectiveness are other control measures that the synthesis engine can coordinate with rule and learning engines by using various machine learning techniques. As an example, the embodiments of the invention can analyze a case of anomalous power loss in a power distribution system and trigger a statistically out-of-range alert for the relevant business process rule. The formal risk analysis engine prioritizes this particular analysis process highly because it has a high business impact of revenue loss and high security impact on the high priority meter-to-cash business function. Analyzing that the anomalous power loss may be as a result of malware attacks in the form of meter data spoofing, a malfunctioning meter, or unauthorized power diversion resulting in significant business impact, the control synthesis engine may implement control measures that enhance security of meter reading, e.g. through stronger meter data encryption and authentication in near real time. Forensic and proactive analysis of possible unauthorized power diversion (non technical loss) is another control posture initiated by the control synthesis engine, which may involve longer response time and additional non-automated cause-consequence analysis.

Embodiments of the invention comprising these control posture synthesis techniques provide a pervasively applied, enterprise-wide approach to enhancing security and control against deliberate attacks, natural disasters, sub optimality of business processes, and other anomalous situations on business processes, applications, services, and infrastructure.

In embodiments of the invention, a proactive information acquisition, as well as a knowledge and evidence solicitation feature proactively communicates with various other services, applications, and resources outside the normal domain of operation of the organization (out-of-band) in as-needed and ad hoc fashion. Risk analysis support information in the form of corroboration of, or evidence for, an inference reached by the analysis engine or updates of domain knowledge about new processes, emergent functions, regulatory evolution, and so on is proactively solicited, thus enhancing the scope of analysis beyond the domain of natural input monitoring. In another significant aspect of the proactive information acquisition feature, some of the information solicited and collected may not have been intended for such a use by the authors of the applications.

Embodiments of the invention contribute to systemic enhancement of business risk management, including cyber security of computers, networks and applications using automated risk management models for distributed monitoring and control elements. An exemplary computer network (100) is presented in FIG. 1 and comprises of two or more computers commonly designated as server (101) or client (102) connected (104, 105) through one or more communications networks (103). Typically a client sends a request for information or other services to the server via the communication network. The server provides the requested information or services to the client via the network. The designation of any given computer as a server or client is not absolute and can change depending on its role in the transaction at hand. Depending on the main function, a server may be designated by various names such as application server (101), database server (106), Web application server (107), data acquisition server (108), Web server (109), proxy server, enterprise message server, etc.

The communication network (103) comprises one or more elements commonly known as the Internet, intranet, LAN, WAN, etc. These networks may use various protocols to manage the movement of messages, i.e. requests and responses, between the appropriate source and destination computers. The computers should be capable of sending and accepting messages in the relevant protocols.

Figure 2:
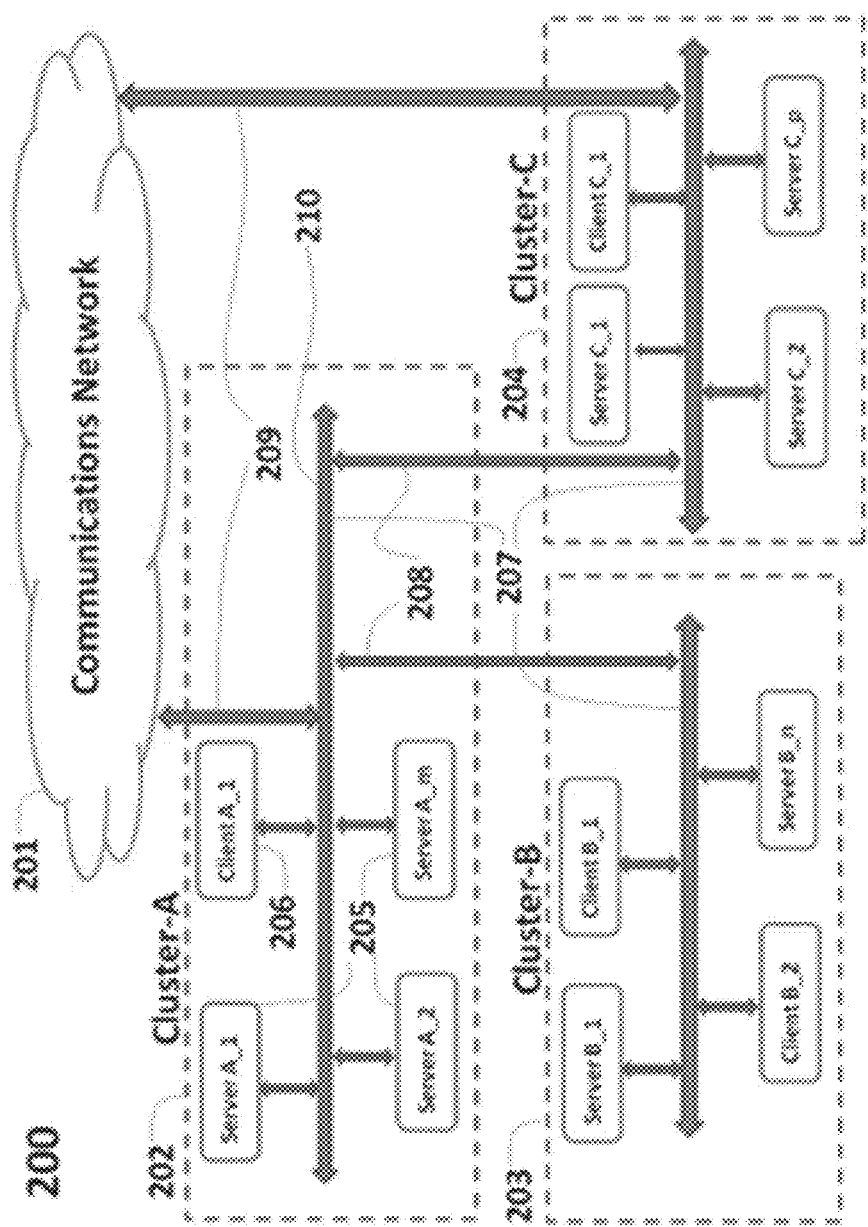
FIG. 2 is a block schematic diagram showing hierarchical structure of an enterprise-wide computer network according to the invention.

FIG. 2 depicts an exemplary enterprise-wide computer network (200) that may or may not be connected to the Internet (201). The computers in such network are organized into clusters (202,203,204), each cluster containing one or more computers designated as a server (205) or client (206). Computers within each cluster can communicate with each other through various physical network configurations and logical messaging structures, such as an enterprise service bus (ESB) (207) dedicated to that cluster.

The communication and messaging structure of a cluster is connected to the communication and messaging structure of another cluster to facilitate inter-cluster communications (208,209). Each such communication and messaging structure may be connected to the global Internet either directly (209) or indirectly (208) through enterprise-wide networks and gateways interconnecting various ESBs (207, 210). A computer (server or client) may be a real computer or a virtual computer. A computer may have numerous peripheral devices for various functions, e.g. input, output, communication, data storage, etc. Each computer may host a number of computer programs, e.g. applications, which interact with each other through various messages that could be as large as the largest file being exchanged and as small as few bit-wide command codes to turn a system on or off, which are herein referred to generically as messages.

Figure 3:
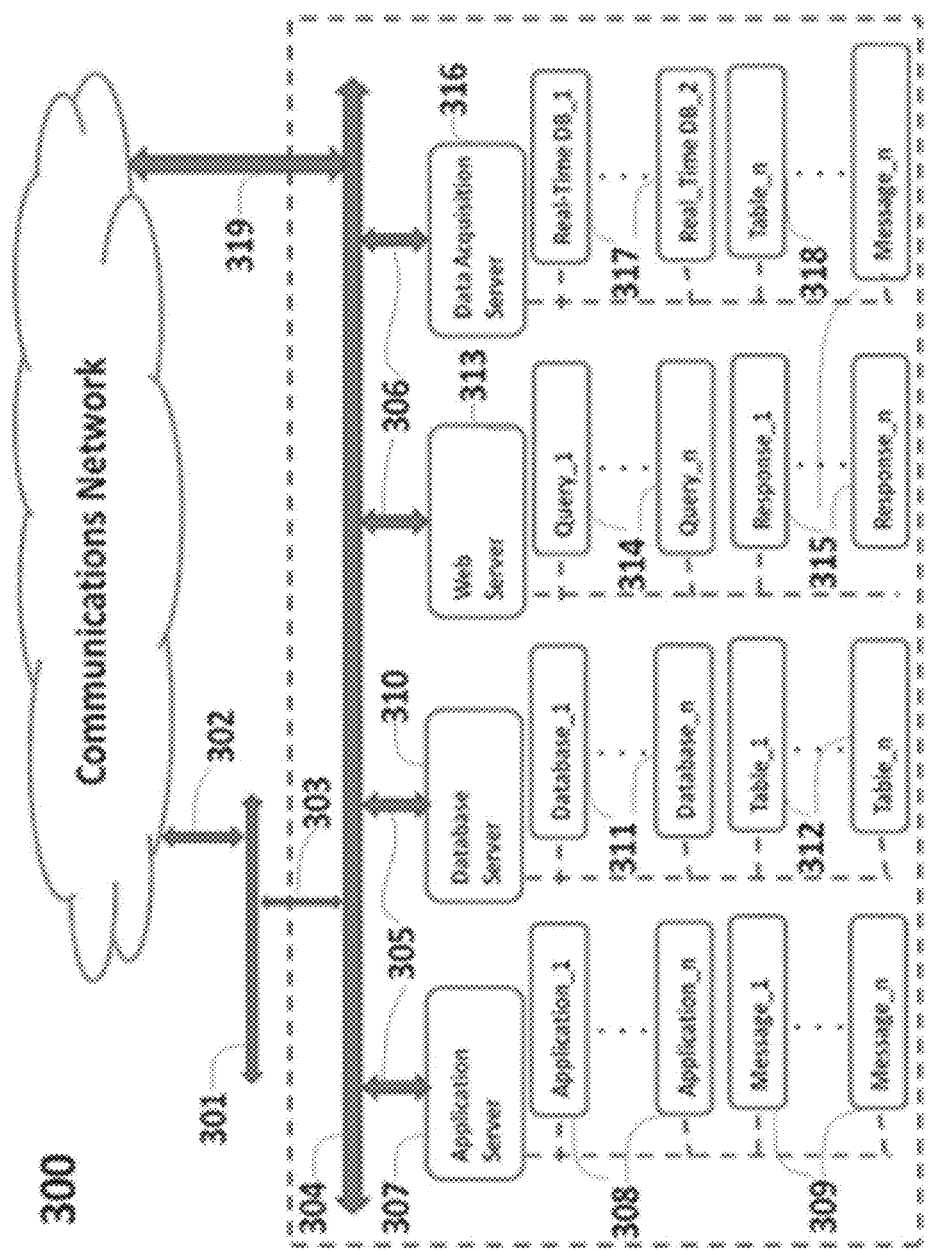
FIG. 3 is a block schematic diagram showing a list of monitored and controlled elements (MCE) at various hierarchical levels of an enterprise-wide computer network according to the invention.

FIG. 3 shows the elements of the enterprise-wide network that are monitored and controlled according to an embodiment of the invention. Examples of monitored and controlled elements (MCE) include, but are not limited to:

An entire enterprise-wide IT network (300) comprising hardware, firmware, and/or software applications and systems distributed within diverse geographical locations, such as data centers, control centers, substations, power plants, branch offices, headquarters, trading exchanges, backup centers, etc., and/or in the 'cloud' in which the necessary hardware and software is temporarily assigned to any specific task on an as-needed basis all the way down to smaller end point devices such as a smart meters, IEDs, or smart phones, e.g. supporting mobile field engineering or trading in a financial exchange or reviewing patient radiological information. Typically, such networks are connected to external networks (302,319).

Any subsystem of the enterprise-wide IT network, e.g. datacenter, control center, etc., with components typically connected to an ESB (301, 304) through communication network elements (305,306). ESBs themselves may be connected to each other through network elements (303).

Any information or data processing device, e.g. computer application server (307), database server (310), Web server (313), data acquisition server (316), various types of mobile devices (not shown in FIG. 3), etc.

Any peripheral devices (not shown in FIG. 3), including information and data storage device, e.g. disk, removable storage, etc. and embedded information devices in an operational system such as a power transformer or a CT scanner.

Any software element within such devices (308, 311, 312, 317, 318), e.g. domain specific applications, Web applications, databases, tables, etc.

Any message, represented by a collection of information and data elements, exchanged between such elements, devices, subsystems, and systems (309, 314, 315).

Any message exchanged between of the enterprise-wide network or its elements with any elements external to the monitored network (302,319).

Figure 4:
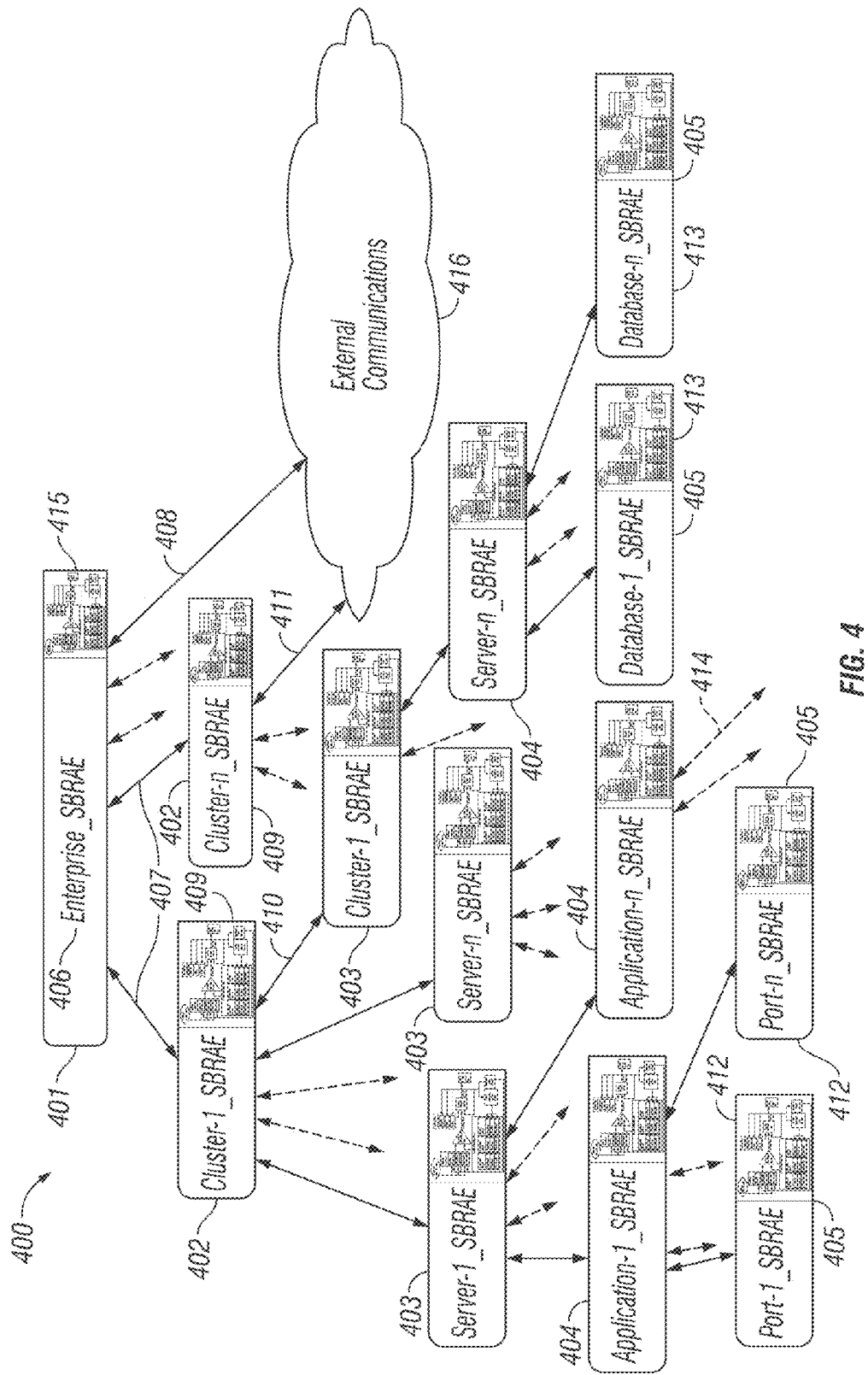
FIGS. 4 and 4A are block schematic diagrams showing security monitoring and control hierarchy for the enterprise-wide pervasive implementation of the invention.
Figure 4A:
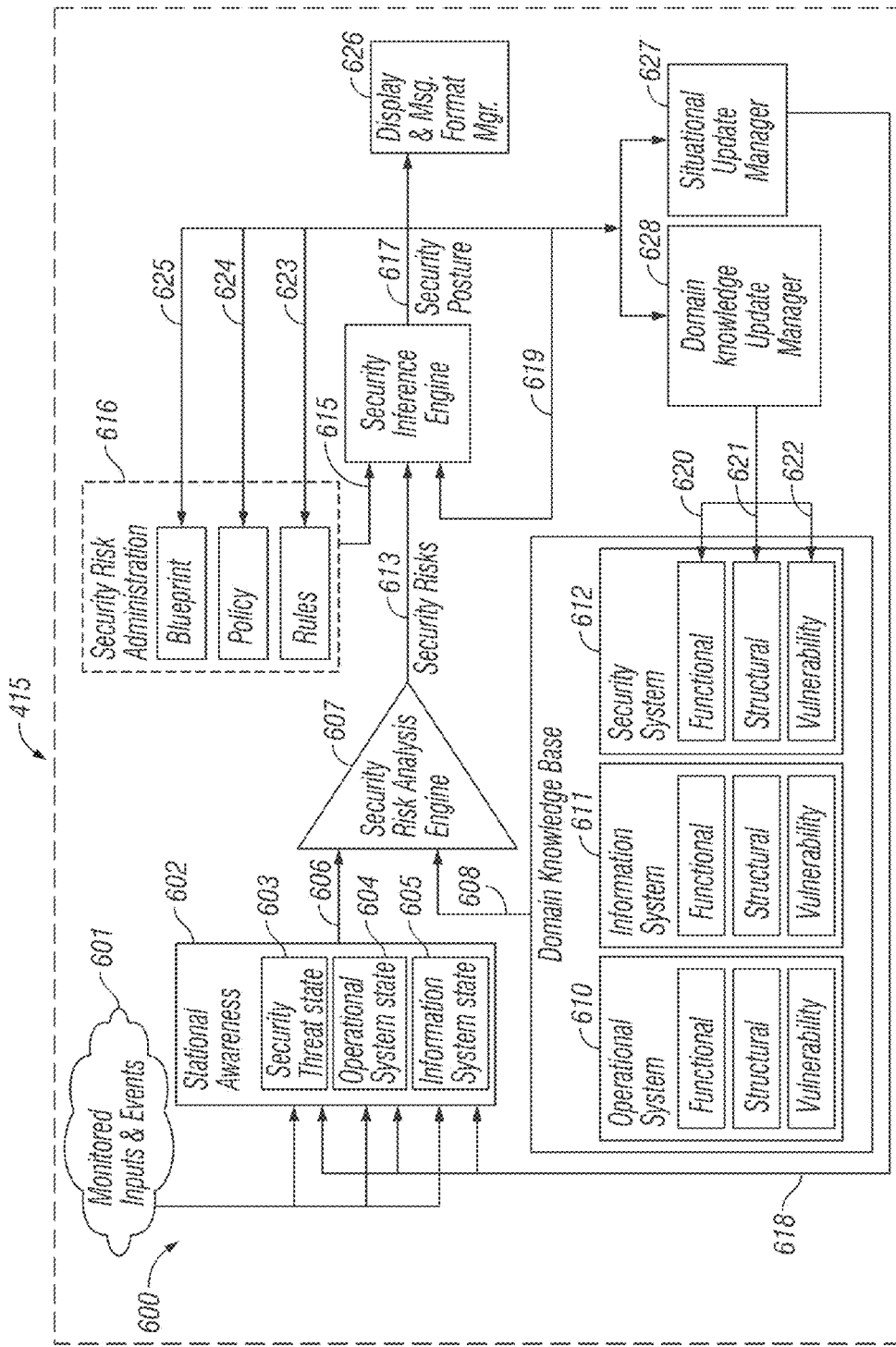

FIG. 4 shows an embodiment (400) of the invention in terms of the control hierarchy (401,402,403,404,405) associated with the monitored and controlled elements (MCE) of the enterprise-wide network. At each MCE (401, 402, 403, 404, 405), all of the messages relevant to that MCE are monitored and analyzed and control posture information is sent to all subscribing MCEs. This capability for monitoring, analyzing, and adjusting security and control postures is pervasively implemented for each MCE as a set of conceptually and structurally self-similar components (415). The functional pervasiveness and structural self-similarity and distributiveness of this embodiment are indicated by showing one of these components (415) on every MCE in FIGS. 4 and 4A. Exemplary implementations of these components is presented in FIG. 6.

The entire enterprise-wide network is at the highest level of the control hierarchy. Embodiments of the invention that are implemented at this level are designated as enterprise security and business risk analysis engines (SBRAE) (406). The enterprise SBRAE monitors and analyzes the collection of all messages going through the message infrastructure, such as the designated enterprise-wide enterprise service bus (ESB). These messages include those among computers directly connected to that ESB (not explicitly shown in FIGS. 5A and 5B) and also messages to and from other clusters (407), as well as external computer network systems, e.g. partners, customers, regulatory authorities, markets, etc. through dedicated networks or the global Internet (408). The enterprise SBRAE sends security control posture information for all subscribing MCEs.

A cluster (409) with its ESB connected to the enterprise-wide network ESB is at the next level of the hierarchy. Embodiments of the invention that are implemented at this level are designated as cluster SBRAEs (402) in FIG. 5A. The cluster SBRAE monitors and analyzes the collection of all messages going through the designated cluster-wide ESB. These include not only messages among computers directly connected to that ESB (not explicitly shown in FIGS. 5A and 5B), but also messages to and from other clusters (410), as well as external computer network systems, e.g. partners, customers, regulatory authorities, markets, etc., through dedicated and/or private networks (408, 411) or the global Internet (416). In some embodiments, there may be as many hierarchical levels of clusters and sub-clusters as needed (401,402, 403, and so on) to cover the entire enterprise-wide network. The cluster SBRAE sends security control posture information for all subscribing MCEs.

Below the levels of the above discussed enterprise-wide and cluster-wide hierarchies lie the individual computers, applications, and local networks. Embodiments of the invention that are implemented at this level (403, 404, 405, and so on) are designated as server SBRAEs (403, 404) in FIG. 4. The server SBRAE monitors and analyzes the collection of all messages going through the various ports (412) of the computer, including all inputs and outputs, including reads and writes to its databases (413). The server SBRAE sends security control posture information for all subscribing MCEs.

Each of the monitored and controlled elements (MCE) at the lower hierarchy levels of applications, databases, and messages can have its own security engines (SBRAE) for monitoring and analyzing all relevant messages, and for providing the security control posture information for all subscribing MCEs. These SBRAEs, for example, play the roles of intermediate store, process and forward nodes, or end devices, such as a meter or a smart phone.

Figure 5A:
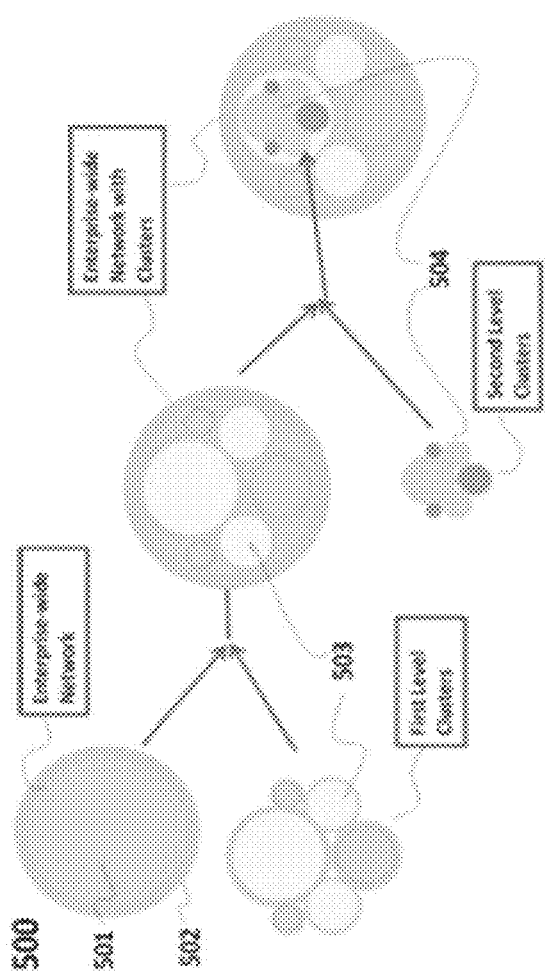
FIGS. 5A and 5B are schematic diagrams showing functional pervasiveness and structural self-similarity and distributiveness as disclosed herein implemented over various hierarchical levels of the network.
Figure 5B:
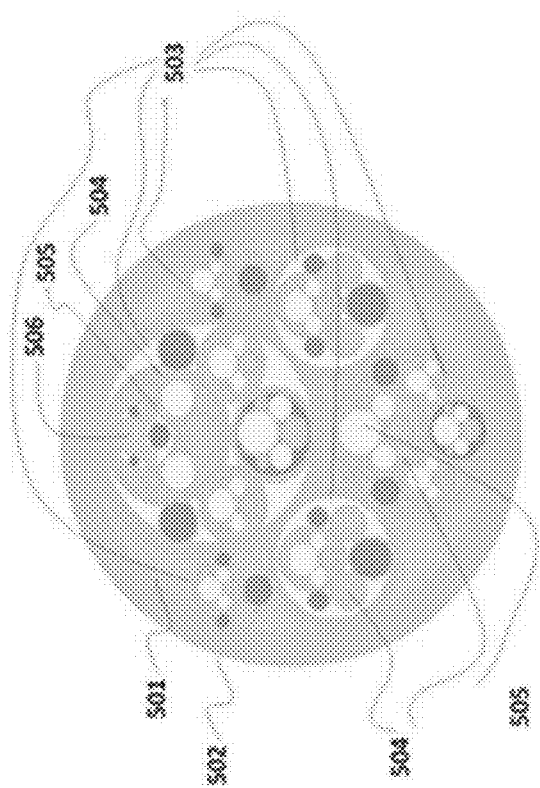

An exemplary enterprise network is depicted in FIGS. 5A and 5B, which show a pervasive implementation of an embodiment of the invention. The largest all encompassing circle (501) represents an enterprise-wide computer network to be protected. It can be seen conceptually as embedded in a computer network of a larger global set of enterprises (not shown in FIGS. 5A and 5B) and protected by an evolving perimeter system (502) from external malicious agents and adverse events. It also encompasses smaller circles (503) representing clusters of subsystems within the enterprise. Some subsystems are large and others are small. Each subsystem encompasses other yet smaller circles (504) representing lower level subsystems and individual computers, and so on. The computers, in turn, encompass other smaller monitored and controlled elements (MCE). This hierarchical representation can be carried up, down, or sideways to as many levels as necessary (505, 506, and so on) to include all MCEs and the underlying business processes. The self-similarity in elements and their composition greatly contributes to the simplicity of the system herein disclosed.

The security analysis and inference engines (SAEs and SIEs) dedicated to a particular MCE do not necessarily reside on the same host as the MCE itself. They can reside anywhere on the network as necessary to meet requirements on performance, reliability, e.g. redundancy, and ease of implementation, or they may reside across multiple hosts. On the other hand multiple SAEs and SIEs can be hosted in a single server.

The self-similar structure depicted in FIGS. 5A and 5B is not limited to the IT network alone. Typically, an enterprise comprises many business processes spread over several domains, such as operational systems including power, water, sewage, gas, chemical processes, supply chains, trading and other financial systems, etc., as well as IT systems and security systems. In each domain, the most elemental business processes can be represented as a network supporting exchange of value. Thus, all elementary business processes in various domains can be conceptually and logically similar to each other. More complicated processes can be represented by networks of the elemental processes. Each subunit, e.g. department, of an enterprise can be represented by a collection of such networks which are connected to each other. A higher level subunit of the enterprise, e.g. division, is similarly a network of the subunits, i.e. departments. Similarly, every enterprise and/or organization can be represented as a part of a global network containing all enterprises, where each enterprise is connected to others. In enterprise process networks, this self similarity can be extended to many layers until the smallest element becomes a single transaction between two elemental nodes. The elemental processes in an enterprise can be based on either a physical network, e.g. gas pipelines, electric transmission lines, railroads, highways, trading platforms, health care data exchanges, etc., or conceptual, e.g. account structures within a bank, organizational structures, etc. In general, an element however small or large can be represented by a node, and each of its interactions with other elements can be represented by an edge.

The IT systems that simulate, monitor, and control the enterprise processes also emulate the business process network in their own organization. Conceptually, behind each component of the IT system, a corresponding enterprise business process component could potentially exist, and vice versa. Thus, an enterprise comprised of n business domains can be modeled as n+2 networks with one network for each of the n business domains, one for the supporting IT network and another for the security system (ST). Each network has a self-similar structure as shown in FIGS. 5A and 5B and consists of monitored and controlled elements (MCE).

In embodiments of the invention, the security monitor is deployed pervasively, as indicated by the (gray) filled area in FIGS. 5A and 5B, around each of the MCE (however small or large the MCE may be) for monitoring and analyzing its interactions with other MCEs. The security monitor also provides control posture information from each MCE with other subscribing MCEs.

Embodiments of the invention take advantage of this self-similar nature to monitor, analyze, and adjust the control postures of all MCE corresponding to various geographical, organizational, and temporal hierarchies in a pervasively distributed architecture. The MCEs are considered fractal objects, i.e. similar in structure and procedures on all scales, and polymorphic, i.e. overloaded to take on different context-dependent inputs and operate accordingly by appropriate selection of available functions and scales, with each other. They differ only in the scope of the input data and output results.

When a large amount of data, e.g. from the entire enterprise or a large subsystem thereof, is to be collected and analyzed, the corresponding MCE may require wider coordination and, hence, a longer turnaround time. Conversely, when a fast response is required only a subset of very important data may need to be considered. Thus, depending on the elapsed time requirements of the relevant analytical needs, each MCE is assigned to a particular security cycle. A number of standardized security cycles are defined to cover all time scales of the domain specific business processes. For example, the cycles may be daily, hourly, 5-minutes, 1-minute, 10-seconds, 1-seconds, 100-milliseconds, etc. This is conceptually similar to a best-fit algorithm, such as using a standard currency denominations to facilitate a broad range of payment amounts. In addition, both analysis and subsequent security enhancement measures are implemented for each MCE throughout the IT infrastructure wherever and whenever needed. More often than not there is a mix of local and wide area situational awareness (structural) correlated in different time-scales (temporal) across diverse dimensions, such as geographical, organizational, regulatory jurisdictions, and so on.

In general, conventional security measures are agnostic about interactions between the nodes on which they are implemented. In contrast, embodiments of the invention focus on the nature of such interactions among the MCEs to enhance the security of all MCEs involved in an interaction. In principle, embodiments of the invention are implemented pervasively in the sense that each and every interaction among all nodes can be subjected to inspection and analysis for the purpose of message security enhancement. Given the increasing probability of targeted attacks, as well as an explosion in the volume of communications with external devices, e.g. mobile users, network guests, and business partners, ubiquitous smart devices, etc., all elements in the enterprise-wide network are potentially harmful. In fact, the default presumption is that every interaction is suspect. Then, by associating each interaction with a corresponding message in the IT system, through promiscuous listening in time and space and deep message inspection and analysis, each interaction is assigned a confidence measure. The confidence measure, in turn, is used to adjust the control posture over the next security cycle. In this way, system performance is traded off flexibly with required security management.

Figure 6:
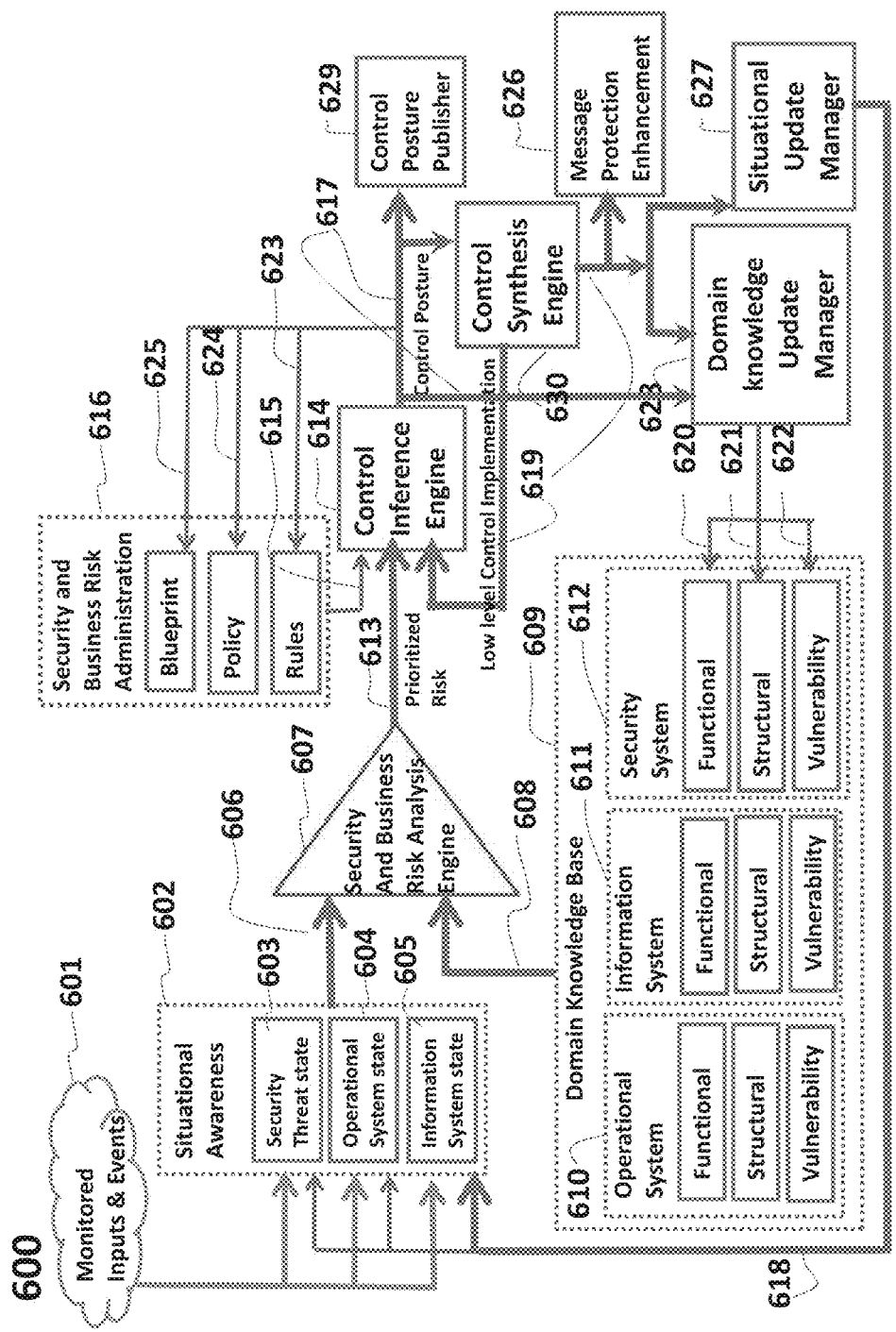
FIG. 6 is a block schematic diagram showing an adaptive monitoring, analysis, and control process at a particular monitored and controlled element (MCE) according to the invention.

FIG. 6 presents an overview of the functional process of an embodiment of the invention for a single monitored and controlled element (MCE) in a particular security cycle. In practice, the system can be implemented pervasively for all of the MCEs, such that each MCE can share information with the others as needed. The analysis is based on domain awareness, in particular about the knowledge of the nature of each interaction. The domain awareness comes from a mix of physical laws, e.g. governing power flows for power transmission networks, or the minimum resolution needed to transmit a MRI scan across networks so that loss of fidelity does not affect radiological diagnosis, or the minimum exponent and mantissa size of a floating point number representing the bid-ask value in a financial trading system so that the required decimal accuracy is supported; predefined knowledge bases, e.g. HIPAA laws applicable to electronic health care information, SOX or Dodd-Frank law governing financial exchanges, GAAP conventions for accounting systems; rule bases defined by various subject matter experts (SMEs), e.g. distribution factors in power transmission, cost allocation factors in cost accounting, trading rules in ETFs, etc.; or through automated learning based on historical data, e.g. pattern recognition, regressive analysis, neural networks, etc.

Events in the real world (601) drive the inputs to one or more security monitors. Knowledge of these events is referred to as situational awareness (602) and consists of data describing the state of the world external to the security monitor. Situational awareness (602) may comprise several categories of data, e.g. security threat state (603), operational system state (604), including all business domains of the enterprise, and information system state (605).

Security threat state (603) describes the threat environment in which the MCE is operating and can be represented as data in several different ways. A few examples are described herein. For example, it can be represented by categories that can be ordered, e.g. extremely mild, very mild, mild, normal, somewhat severe, severe, very severe, extremely severe, etc. These categories may be determined using human experience and judgment from various real world events, e.g. warnings from the Department of Homeland Security, US and other Computer Emergency Response Team (CERT)s, enterprise Human Resource (HR) system events such as staff role and/or affiliation change, McAfee/Symantec events or reports, threatening letters from potential miscreants, general social unrest, bad weather such as thunder storms, floods, conducive for fire, etc., and based on probability of the specific event types and severity of attack types, e.g. denial of service and other availability attacks, social engineering based authorization or authentication compromise, integrity attacks, and confidentiality attacks. It is also possible to use sophisticated and elaborate threat modeling tools to evaluate all available threat information and reduce it to a real number, probabilistic distribution, a computable program, or a category. If this data is a real number it may be normalized within a value range of 0 to 1 with 0 signifying no threat or extremely mild threat, and 1 representing either normal or, alternatively, extremely severe threat.

Operational system state (604) describes the operational environment in which the MCE of the operational system can be represented by data in several different ways. A few examples are described herein. For example, they can take binary values (0 or 1) to indicate switch closed or switch open, energized or not energized, trading open, trading extended, or trading closed, etc. It can be represented as categories that can be ordered, e.g. in power systems loading levels of a component can be categorized with respect to its load carrying capability as ultra low, very low, low, normal, somewhat high, high, very high, ultra high, etc.; and in trading systems the categories can be based on trading volumes or price fluctuations over a specified period of time. It is also possible to express loading levels or trading volumes by real numbers, such as % of loading carrying capability or % of trading platform capacity.

Information system state (605) describes the IT system environment in which the MCE of the information system can be represented by data in several different ways. A few examples are described herein. For example, they can take binary values (0 or 1) to indicate packet filtering capability available or unavailable. It can be represented as categories that can be ordered, e.g. traffic filtering levels of an element can be categorized with respect to its capability as extremely low, very low, low, normal, somewhat high, high, very high, and extremely high, etc. It is also possible to express traffic filtering levels by real numbers, such as % of traffic processing capability.

The various categories (603, 604, and 605) of the state information (602) can be obtained in real-time and subjected to analysis at appropriate time intervals periodically. For each MCE, the desired time interval between successive execution cycles can be determined in various ways. For example, they can be determined based on experience, learning instituted in embodiments of the invention, other sources and tools, and expert judgment.

Security threat state (603) can be updated once a day in quiescent periods, and can be once in every five minutes or more often when there are imminent threats.

Operational system state (604) can be updated as frequently as necessary to monitor the underlying business process. For example, in electric power systems it is common to monitor system frequency and associated variables every few seconds and transmission line loads every few minutes.

Information system state (605) can be monitored every five minutes or more often as deemed necessary. In addition, an execution cycle can be started whenever a significant event occurs, e.g. receipt of news or warnings about actual or potential security threat, transmission line redundancy level changes, servers or data centers became unavailable, etc.

In each execution cycle, the real-time state of the situational awareness (602) relevant to each relevant MCE is analyzed (606) by the security and business risk analysis engine (SBRAE) (607) together with the domain knowledge (608, 609). Domain knowledge (609) can be encoded as data concerning the operational system (610), including all business domains of the enterprise, information system (611) and security system (612).

Operational system (610) knowledge can comprise of one or more categories of data, e.g. functional, structural, and vulnerability.

Functional knowledge in the operational domains (610) includes, but is not limited to, both physical laws pertaining to the operational system and operating rules governing the business functions and business processes. As an example, physical laws governing the power loss across a distribution line, transformers, and other stray losses may constitute the corresponding functional knowledge. Accounting processes for power purchases and pricing may also be part of the functional knowledge. The rules may include legal and operational requirements affecting the operation of the business processes. For example, in power system domain, local generation in area A should be greater than 50% of the load in that area, and every node must have at least two paths connecting it to the rest of the network. In the financial instrument trading domain, operational, legal rules affecting the usage of the accounts are included. For example, an option pool should be at least 40% of underlying securities.

Structural knowledge in the operational domains (610) includes information about the operational components, their topology, and their semantic relationships. They include, but are not limited to, descriptions about how equipments in OT are connected electrically, devices in IT and OT communicate electronically, or business processes build up a business functions. For example, in the power systems domain it contains information about the breakers and switches, transmission lines, transformers, generators, loads, shunt capacitors, and other devices, along with their topological connectivity and, when needed, their geographical locations, network connectivity through embedded Intelligent Electronic Devices (IEDs), and transceivers along with capacities of individual equipment. In the domain of trading systems, it may contain the list of order origination brokerages and their relationship to the trading exchange, etc.

Vulnerability knowledge in the operational domains (610) includes information about the structural, functional, or performance weakness of individual MCEs or groups of MCEs in the operational domains. For example, in power systems domain it may include data concerning its physical environment's security, e.g. presence or absence of infrared cameras, condition based age of equipment and dynamic rating limitations, vulnerability to fire, flood, tsunami, melt down, explosion, thunder storm, solar activity at the physical location, etc., as well as vulnerability to malicious attacks of various types, such as using aluminum foil to compromise wireless communication or using a metal piece to short a live power circuit. Vulnerability can be analyzed in the context of specific hardware, operating system or application trust boundaries, as well as their interplay and transformation when interconnected in various configurations and contexts. Examples in power systems domain include: when the ambient temperature is too high, the right-of-way for transmission line A is vulnerable to fire or a transformer is vulnerable to overheating and derated thermal performance; during a thunder storm, line B is vulnerable to lightning; or during heavy rains, substation C is vulnerable to flooding. In the domain of financial instrument trading systems, the example vulnerabilities include server virtualization bottlenecks when trading volume spikes in a very short time, a lot more trades from various sources are performed within the regular hours of trading getting time-stamped as extended hour trading if real time clock skew vulnerabilities are exploited. The associated IT systems might have vulnerabilities such as protocol weakness, e.g. SCADA using clear text, lack of validation while accepting Web client inputs leading to SQL injection, firewall misconfiguration leading to checking only incoming traffic often hiding insider attack, or Trojan horses for damagingly longer time.

Information system (611) knowledge can comprise of similar categories of data, namely functional, structural, and vulnerability related to the IT systems including the computers, networks, and applications.

Functional knowledge in IT systems (611) includes functional and configurability knowledge of the SW or HW and operational rules and settings affecting the usage of the MCEs of the IT system. For example, whether a firewall can perform the function of packet filtering based on incoming and outgoing addresses or has the application and protocol specific knowledge to act as application firewall would be considered functional knowledge of the firewall.

Structural knowledge in IT systems (611) includes information about all MCEs of the IT system and their hierarchical relationships along with their capabilities, such as CPU, RAM, storage, access times, connection bandwidth, etc.

Vulnerability knowledge in IT systems (611) includes vulnerabilities of MCEs, their interfaces, their hosts, and connecting networks, and so on. For example, applications running on operating system A suffers from SQL injection or buffer overflow weakness; or SCADA Server B is likely to crash when clear text communication is encrypted and monitored data is sent every 100 mSec.

Security system (612) knowledge can comprise of one or more categories of data, e.g. functional, structural, and vulnerability.

Functional knowledge in the security system (612) includes information regarding the operational and legal rules relevant to the MCEs and the functional and performance information about the security and risk system. For example, poorly configured firewalls monitor only incoming traffic thus missing evidences of what information is being sent out (data leakage) from the server by a malware callback attack or an insider attack, or data transmission using a protocol is always in clear text, are elements of such functional knowledge.

Structural knowledge in the security system (612) includes the mapping of various MCEs of the operational domains to the corresponding MCEs of the IT system and MCEs of the security system, as well as how they are interconnected to provide, for example, intrusion prevention, intrusion detection, and intrusion response across host computers, networks, and applications.

Vulnerability knowledge in the security system (612) includes vulnerabilities of MCEs as a result of security system weakness, such as under- or un-encrypted wireless transmission, weakness of authentication tokens, such as passwords, or security question-answer pairs or digital certificates from suspect authorities.

For each MCE, in each execution cycle, the security and business risk analysis engine (607) uses its inputs comprising of the relevant situational awareness (602, 603, 604, 605, and 606) and domain awareness (608, 609, 610, and 611) to identify and analyze the overall prioritized risks (613) of the element. To minimize the computational requirements, the security and business risk analysis engine (607) executes only upon changes in at least one of its inputs (606, 608). If there is no change in situational awareness (602) or domain knowledge (609), then no changes are made to the prioritized risks (613) for that MCE. Prioritized risks can be expressed as a set of binary values (0 or 1 implying coarse grained risky or risk-free state), discrete values (finer grained enumerations), ordered lists (prioritized enumeration), statistical distribution of loss impact, categories, real numbers, suggested further analysis, and the like.

Risks can be quantified by a variety of metrics. Examples of some generic metrics include: average interruption duration index (AIDI), average interruption frequency (AIFI), service impact per interruption index (SIII), average service availability index (ASAI), mean time between failures (MTBF), and mean time to restore (MTTR). When necessary, appropriate parameters for the probability distributions of these indices can also be quantified from historical data. These indices may take slightly different forms in different domains. For example, in the case of power utilities, AIFI can be calculated either for the entire system or for individual customers, and (SIII) can take the form of either MW of demand not met or Mwah of energy not delivered. Similar indices can be defined either for overall operational availability of the IT system components or for cyber security aspects alone.

Large values of security risks may indicate either actual security risk or erroneous data. In either case, a high value signifies the need for corrective action in the control posture of the MCE, e.g. reallocation of the resources in the relevant operational domain or in the IT system or using more stringent security checks within the security system.

The overall objective of the security and business risk analysis engine (607) is to evaluate its outputs, e.g. prioritized risks (613) as needed for input by the control inference engine (614). An exemplary implementation of the security and business risk analysis engine can be expressed in a mathematical notation. For example, given a list of business functions and a list of threat profiles as inputs, the risk due to threat profile ($TP_j$) for a business function ($BF_i$) can be the output and is expressed as the function risk due to threat on business function:

$$(BF\_TP_{ij}) = f_0(i,j)$$

where $f_0$ is a function in the most general definition of function. For example, it can be a look up table, a mathematical expression (closed form or probabilistic), a computer program or any other means of relating two input values ($BF_i$ and $TP_j$ in this case) to an output ($BF\_TP_{ij}$ in this case). The values of the output ($BF\_TP_{ij}$) can take a variety of forms. For example, a string, a binary value, a category that can be ordered, or a real number which could indicate the damage index business function $BF_i$ suffered should the threat profile $TP_j$ affect it or even the probability that $BF_i$ suffers from a threat $TP_j$. The methods used in defining these values can vary based on the specific input data and desired output result relevant to the MCE and the relevant execution cycle.

Figure 7:
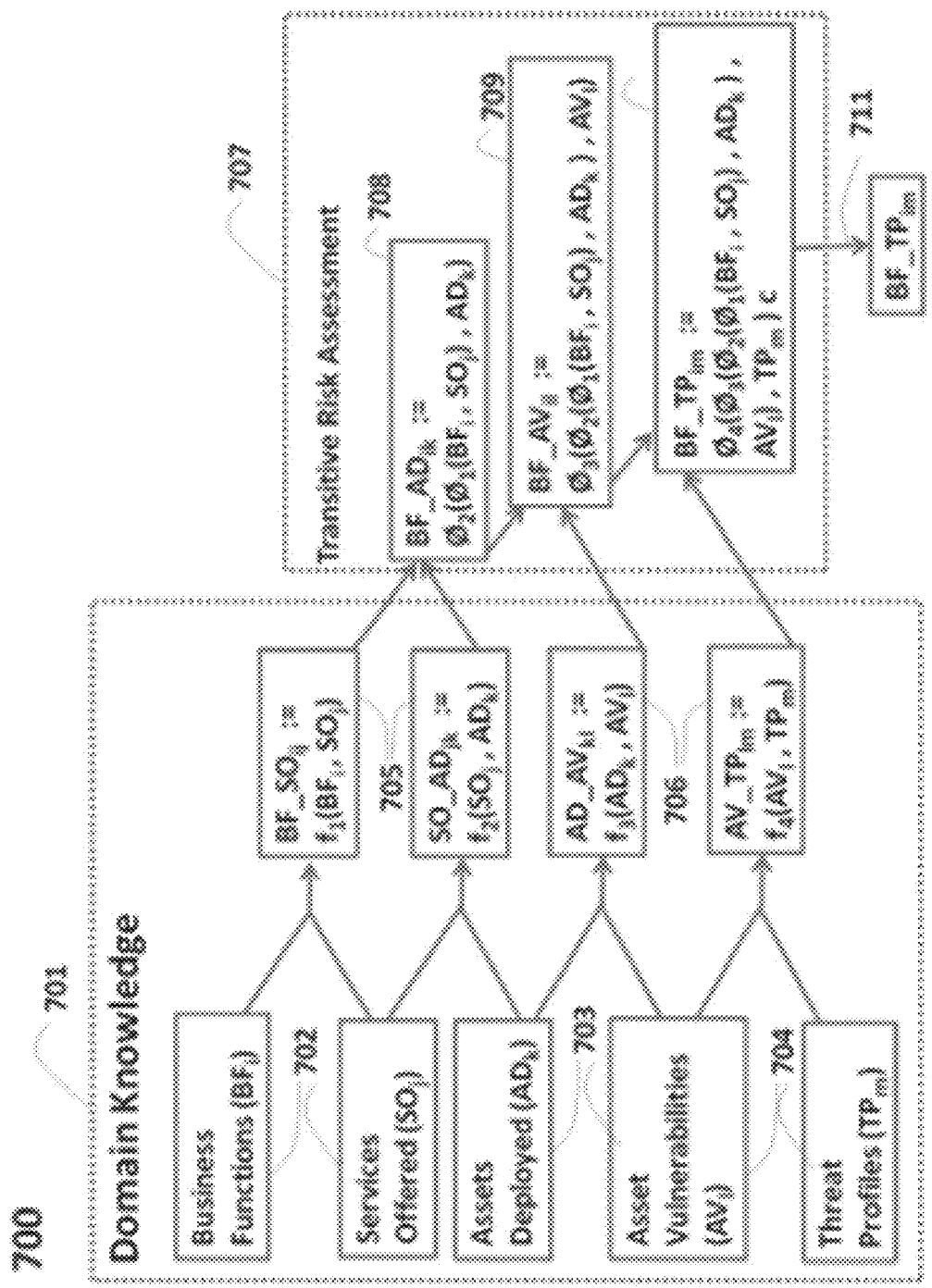
FIG. 7 is a block schematic diagram showing an analysis approach in a business risk analysis engine according to the invention.
Figure 8:
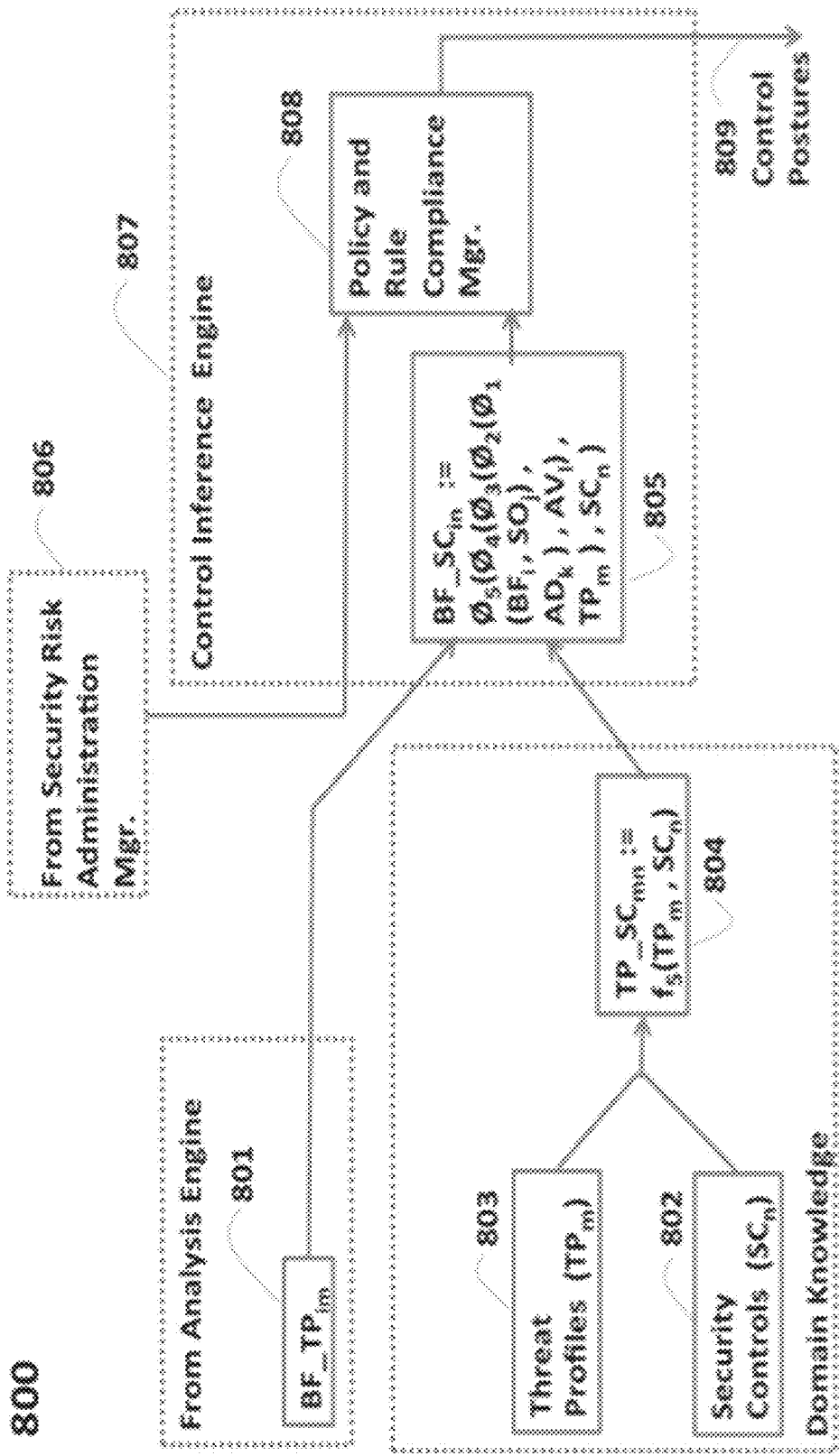
FIG. 8 is a block schematic diagram showing a control inference approach in a security and risk inference engine according to the invention.

Considerable amount of domain expertise can be embedded in the definition of the function "impact of threat on business function ($BF\_TP_{ij}$)" appropriately. In many cases, the function "risk due to threat on business function ($BF\_TP_{ij}$)" can be too complex to define in a single step. In such cases, an embodiment of the invention provides the flexibility to decompose the definition process into as many coarse (larger) or fine (smaller) grained steps as necessary. Whereas the specific steps depend on the domain of the business process, exemplary aspects of such steps are illustrated in FIG. 7.

Each step consists of defining the domain knowledge (701) as functional relationships (705,706) between two successive lists (702, 703, 704) of related business components/attributes/elements in a list of many such lists. For example, the following lists may be considered in order:

Business functions (702): This list can be based on enterprise revenue or cost organization and/or or individual job descriptions.

Services offered (702): These are services offered to various customers, internal personnel and business partners and can be based on individual business process descriptions. A business function may depend on more than one service and a single service may support several business functions. Service criticality functions ($BF\_SO_{ij}$) are defined in the domain knowledgebase to relate the criticality of any given service to any given business function.

Assets deployed (703): These are the business assets that enable the owners of business functions to deliver the above defined services. A service may require more than one asset and a single asset may support several services. Asset criticality functions ($SO\_AD_{jk}$) are defined in the domain knowledgebase to relate the criticality of any given asset to any given service.

Asset vulnerabilities (704): These are weaknesses often inherent to each asset or a group of assets. An asset may have several vulnerabilities and a single vulnerability may be shared by several assets. Asset damage potential functions ($AD\_AV_{kl}$) are defined in the domain knowledgebase to relate the degree of damage that could be inflicted by any given vulnerability to any given asset. Examples of vulnerabilities include susceptibility to floods, fire, etc., instability and/or chaos, cascading failures, etc.

Threat profiles (704): These are threats that can exploit one or more vulnerabilities. A threat can be either a deliberate attack from inside or outside of the enterprise, inadvertent human error, or erroneous operation of devices and/or systems. A single vulnerability can be exploited by more than one threat, and a single threat can exploit more than one vulnerability. Exploitability functions ($AV\_TP_{lm}$) are defined in the domain knowledgebase to relate the exploitability of any given vulnerability by any given threat. Examples of potential threats include:

Tamper with measurements (integrity)
Tamper with pricing (integrity)
Tamper with event times or clock skews (integrity)
Tamper with equipment, e.g. switching devices or trading platforms) (availability)
Tamper with account numbers, account balances (privacy and integrity)
Message flooding (denial of service or availability)
Inhibiting required messages (availability)
Proliferating unnecessary messages (availability)
Disabling security measures (integrity, confidentiality)
Spoofing (authorization, authentication lead confidentiality, and potential privacy attacks)

Given the above functional relationships, one could define rules necessary to evaluate one or more composite functions as needed, as shown in FIG. 7. For example, given the service criticality functions (BF_SOij) (705) relating services to business functions, and asset criticality functions (SO_ADjk) (705) relating assets to services, one can develop rules (707) to evaluate the transitive functional relationship (BF_ADik) (708) between assets and business functions. Carrying this transitive process one step at a time (706, 709, 710), one can evaluate the overall risk due to threat on business function (BF_TPim) (710). These results are passed (711) on to the security inference engine (614, 807).

The resulting security and business risks (613) should account for the importance of the monitored elements and components to the overall performance of the subject systems and subsystems. For example, the impacts of loss of a specified amount of electric power for individual residences, emergency responders, hospitals, and traffic lights are not all equal. In addition, evaluations of business function values, threat probabilities, impact (loss or resulting derating) of potential damages, trustworthiness of information sources, etc. can be incorporated into the calculations by defining appropriate functional relationships among appropriate pairs of attributes. For example, in the context of cyber security or business risk, operational and IT system equipments and processes essential for maintaining the continuity of business should be given high importance. The equipments and processes relevant to service quality should be treated as of mid-level importance. Equipments and processes relevant to financial profitability can be treated as of a lower-level importance.

The above methods are only exemplary and are among the simplest examples. It should be appreciated that thousands or more varieties of additions, modifications, and derivatives to the above lists, methods, and categories of methods are apparent to the various domain experts, IT system experts, security systems experts, and the like. Analogous methods and features can readily be defined for all domains, e.g. power systems, financial trading systems, IT systems and security systems, by the respective domain experts.

For each monitored element, in each execution cycle, the risk inference engine (614) infers, calculates, and adjusts the control postures (617) for the relevant MCE and sends the information to other subscribing MCEs.

In its inference analyses and calculations, the control inference engine (614) uses prioritized risks (613) coming from the security and business risk analysis engine along with security and business risk administration knowledge (615, 616) and the current low level control implementation (619) as inputs. To minimize computational effort, the control inference engine (614) compares the current security risks (613) to the previous security risks and skips further inference effort for the relevant MCE in the relevant execution cycle if there is no significant change.

In the security domain knowledgebase (612), a list of security and risk controls (802) is defined along with their relationships with the various threat profiles (704, 803). A single threat may require more than one security control and a single security control can mitigate more than one threat. Control effectiveness functions (TP_SCmn) (804) are defined in the security domain knowledgebase to relate the effectiveness of any given security control against any given threat. Control effectiveness functions (TP_SCmn) combined with the overall risk due to threat on business function (BF_TPim) (613, 711, 801) evaluated by the security risk analysis engine (613) can yield a set of control improvement to business function (BF_SCin) (805). The control inference engine (614) uses this information along with information from the security and business risk administration (806, 616) to make sure that control postures consistent with applicable control policy and rules (808). In addition, parameters such as monetary value of business functions, cost of controls, etc. can be incorporated into the calculations by defining appropriate functional relationships among appropriate pairs of attributes. The resulting security latches (809) are passed on to message protection enhancer (1400, 1401).

Control postures (617) are used to set the figure of merit parameters for each of the available security controls. Examples of figures of merit include, but are not limited to:

Values of various security control measures, such as degree of encryption, number of authentication tokens needed etc. under the given real-time operating conditions and threat environment.
Cost/benefit ratio of implementing a security control.
Security metrics of the current settings and possible improvements.

Control postures (617) can be used for multiple purposes. Some exemplary purposes are discussed herein.

For every MCE and every execution cycle, control postures (617) can be used by situational update manager (627, 618) to generate security latches for the MCEs in the operational system state (604) and information system state (605). There is one security latch assigned to each MCE and vice versa. A Security latch comprises of information about itself and any other rules and parameters (dials, switches, levers) necessary for enhancing the security and risk protection of the relevant MCE. Information concerning itself may include security control and category, host location, MCE identification, time of last update, and time of next required update. In addition, it includes security control instructions, e.g. encryption level, authentication tokens (password, secret questions, digital certificates from authorized sources, biometrics, etc.), role based authorization, access control lists, privileges (read, write). It should be appreciated that with pervasive monitoring, analysis and controls, for a given MCE, there may be inconsistent security instructions issued from different organizational, geographical, and temporal hierarchical levels. If any such instructions are in conflict with operating rules, etc., such instructions are highlighted with warnings and relaxed. In general, the most restrictive, but feasible with respect to the prevailing operating rules, of all instructions to the MCE should be implemented at any given time.

Control postures (617) and low level control implementations (619) can be used by domain knowledge update manager (628) to adjust/update domain knowledgebase (620, 621, 622) periodically or on significant changes in the domains. Functional knowledge adjustments (620) may include new operating rules in each domain, while structural knowledge adjustments (621) may include new equipment, e.g. a new transformer, a new account number, a new computer, etc. Vulnerability adjustments may include newly identified vulnerabilities for existing or new equipment or groups of equipment.

Control postures (617) may be used to adjust and/or update security and business risk administration knowledge (616) either periodically or on occurrence of a significant event. Updates to security rules (623) may take place once an hour or once a day. Updates to security policies (624) may take place once a day, a week, or a month. Updates to security blueprints (625) may take place once a year or two.

Control postures (617) as produced and adjusted by the control inference engine (614) are passed on to message security enhancement (626, 1405). Each monitored message (1402) is subjected to deep message inspection (1403) to determine if the message is trustworthy or not by checking both headers and payload content. Then suspect messages are quarantined (1407) and archived for reporting and audit (1407). In addition, message related statistics are saved in the domain and security knowledgebase (1406). Security verified messages (1404) are passed on to security enhancer (1405) where they are secured to the level required by the security latch (1401), e.g. levels of encryption, number of authentication tokens, etc. The messages can be archived (1408) for later analysis.

Figure 14:
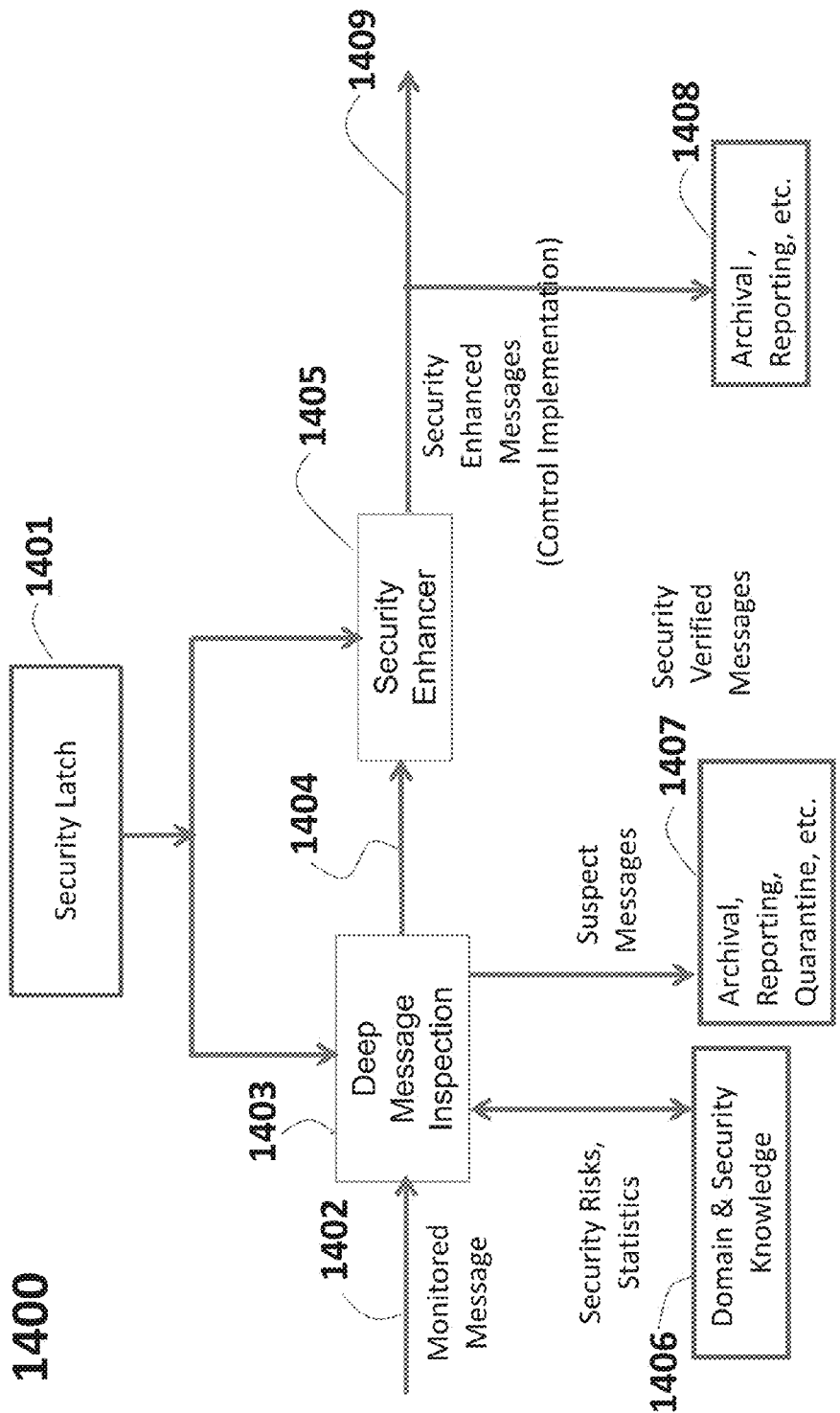
FIG. 14 is a block schematic diagram showing a protection enhancement approach based on deep message inspection in a message security enhancement engine according to the invention.

Each security latch (1401) assigned to each MCE in each security cycle is used to enhance the messages (1400, 1402) to and from the corresponding MCE in the operational domain, IT systems, and security systems. The deep message inspectors (DMI) (1403) implemented at each MCE for this purpose are structurally and functionally self-similar. Here, a message is defined very broadly to represent a coherent set of information. It may consist of only a few bits or bytes or may include entire tables, files, or databases. Hence, FIG. 14 represents a single exemplary implementation. Typically, messages (1402) are intercepted by the SME (1400) at an ESB or an I/O port of a server or client. The messages can be represented in various customized or generic formats, e.g. XML, HTTI, or ASCII, etc.

If the message passes the vetting process, then it is passed along (1409) to subsequent subscribing MCEs, along with additional security information indicating the trustworthiness of that message. The relevant logs and other displays (1408) for security administrations are also provided as needed.

Control postures (617) as produced and adjusted by the control inference engine (614) are passed on to control posture publisher (629) for publishing to all subscribers and to inform personnel responsible for cyber security of the entire enterprise-wide OT and IT systems or portions thereof about the current security status and security postures. The information presented can take many forms, in addition to the security control measures taken by the publishing MCE. For example, graphical displays to show quantitative, geographical and temporal information at a glance, highlight MCE that need extra attention, to archive logs sorted and classified according to various specified criteria, provide summaries as needed to support the generation of various compliance reports, history of significant security events along with their actual and potential adverse impacts on business processes, and corresponding remedial actions to help minimize probability or impact of similar future events, and methods of recovering or maintaining business continuity.

Figure 9:
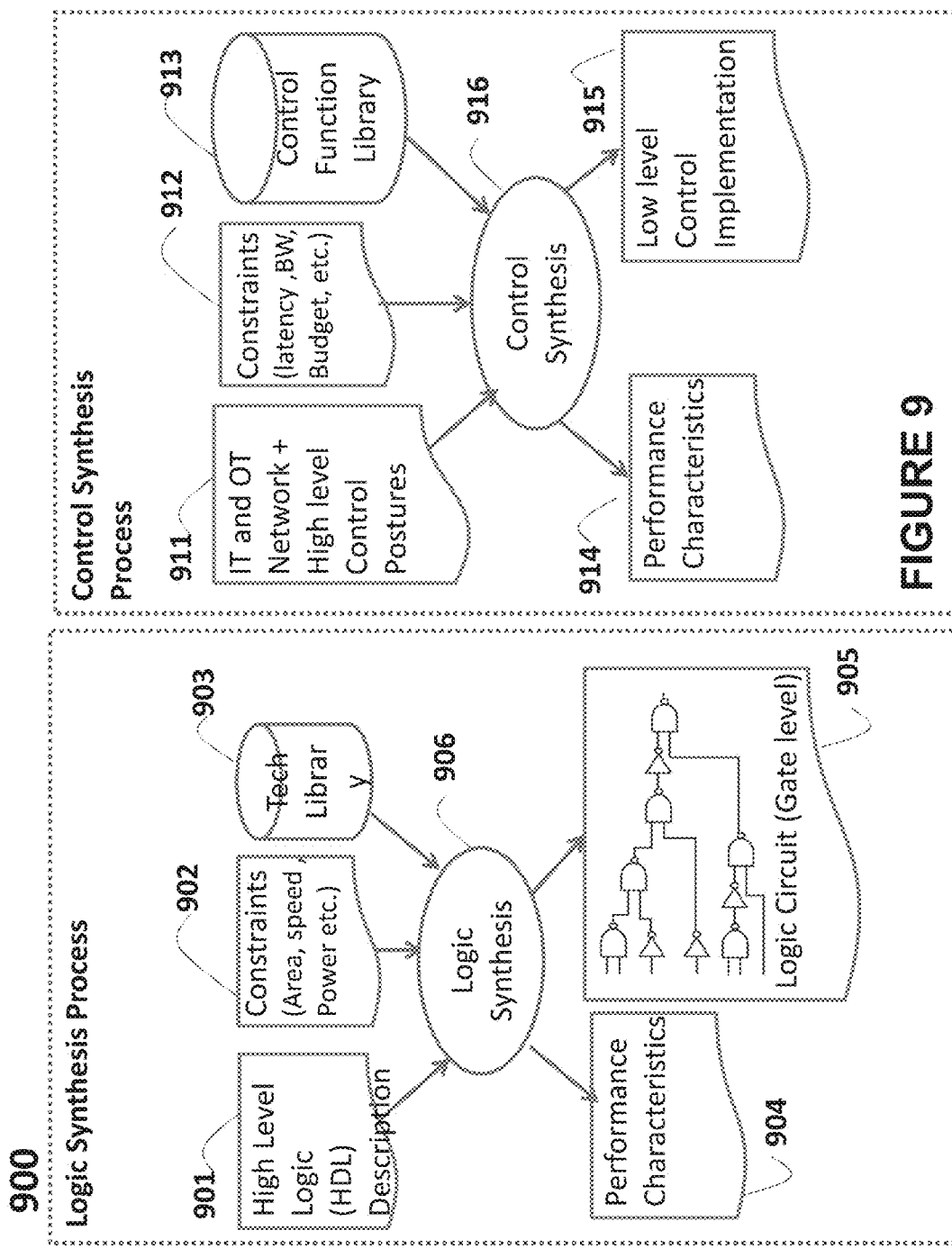
FIG. 9 is a block schematic diagram showing automated generation (synthesis) of an adaptive risk control approach in the risk synthesis engine according to the invention.
Figure 10:
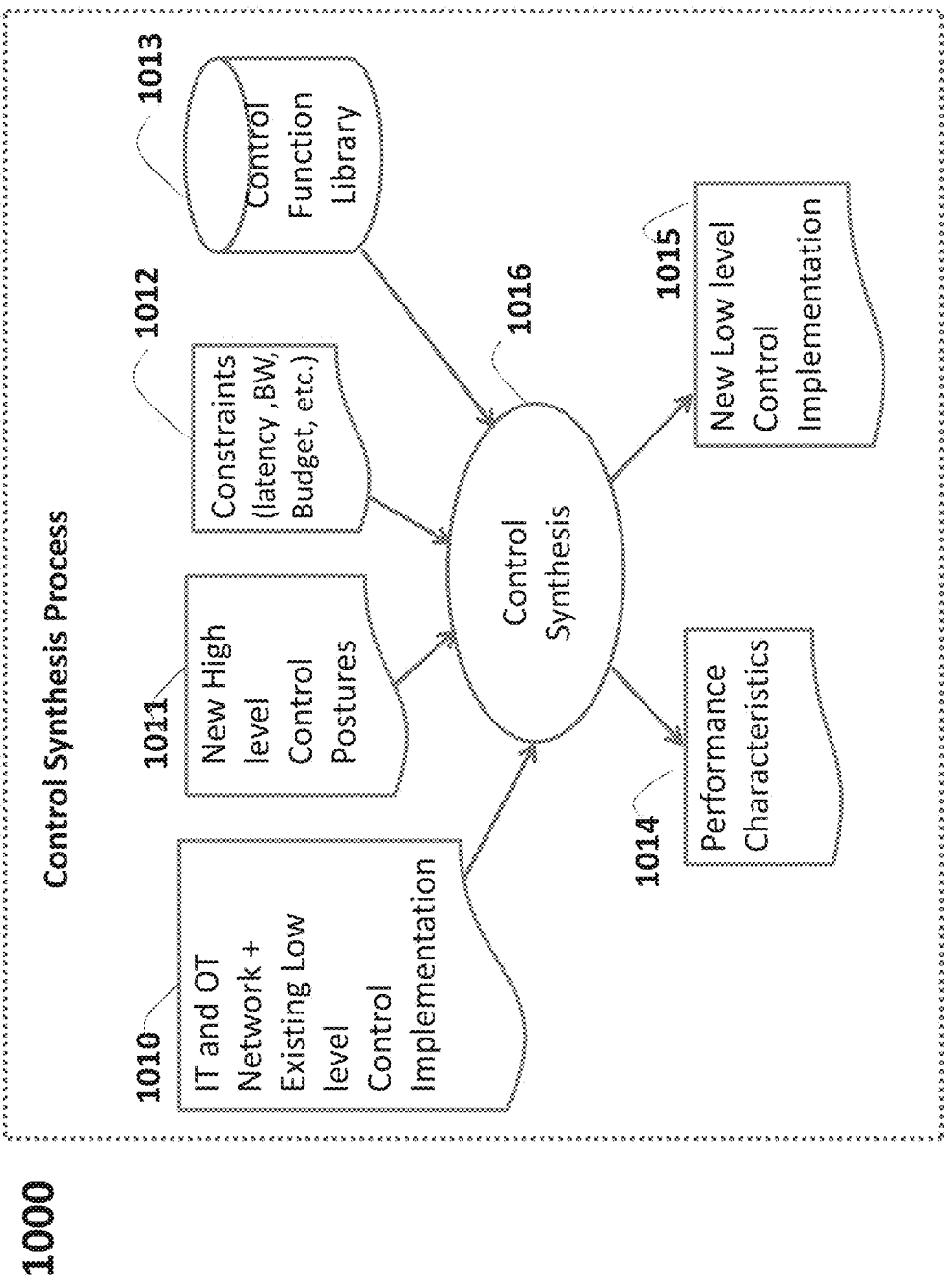
FIG. 10 is a block schematic diagram showing the automated generation (synthesis) of the adaptive risk control approach with existing control implementations already in place according to the invention.

The control synthesis process flow, which is analogous to the behavioral and logic synthesis process used in integrated circuit (IC) design, has been depicted in FIGS. 9 and 10. As shown in FIG. 9, the synthesis process (916) automatically constructs the control measures needed to be implemented throughout the OT, IT, and ST systems. Among the inputs to the system is a high level behavioral description of control postures needed at specific OT and IT network elements (911), determined by the control inference engine (614, 807). These may be in the form of control postures (809) which may include high level control inferences, such as "increase encryption strength at system_sss to 128 bits with latency less than N milliseconds" or "decrease authentication strength (token counts) to 2 for accessing element_eee with bandwidth not exceeding 10 MB" or "increase range for message field_fff name-value pair integrity check."

Performance requirements, such as maximum acceptable latency, available band width, or processing power at the MCE, are the constraints (912) which guide the implementation space exploration. A pre-characterized library (913) of available standard security functions, such as authentication, encryption, etc., along with reconfiguration or installation of macro security functions, such as IPS, firewall, etc. in terms of different capacity, configuration, and performance and various cost attributes, such as latency incurred, bandwidth, and processing power needed to execute them provides the exploration space for optimal composition of such functions at appropriate strength and locations to achieve the most effective low level control synthesis. The synthesis process (916) transforms the high level requirements specified in the inputs (911) into optimized control implementations (915) by deploying algorithms which explore different control functions in the library (913) to compose the low level implementation, guided by the objectives and constraints (912). The performance characteristics (914) report the performance, capacity, and constraints that the implementation achieved. For cases where manual intervention is called for, this report acts as the blueprint and recommended process for the implementation. The synthesis process (916) could be triggered if control inference engine (614) determines such actions are warranted because it predicts the onset of risk increase or reactively institutes such changes because of a determination through SBRAE (607) that the system is facing increased risk through specific adverse analysis in the form of natural disaster, operational error, equipment or program malfunction, deliberate attacks, suboptimal business processes, etc.

FIG. 10 depicts the control synthesis process when automated adjustments of low level control implementations are warranted, rather than synthesizing new ones as a response to situational intelligence, domain knowledge, or other changes relevant to the prioritized risks on which the MCE is focusing. Along with new high level control postures (1011), the process needs existing low level implementation information in the context of the OT and IT system (1010). The other two inputs, i.e. constraints (1012) and the pre-characterized library (1013), play the same roles as in the previous synthesis process (916). The algorithms used for this control synthesis process (1016) conduct the implementation exploration guided by the constraints and existing control functions in place to achieve optimized modifications of new control implementations. In this way, networks with existing low level controls avoid the need to perform a full synthesis process over again for changes in the control postures. Instead, a smaller, incremental synthesis adjusts the low level controls more optimally and efficiently to respond to the changes in the control posture.

Figure 11:
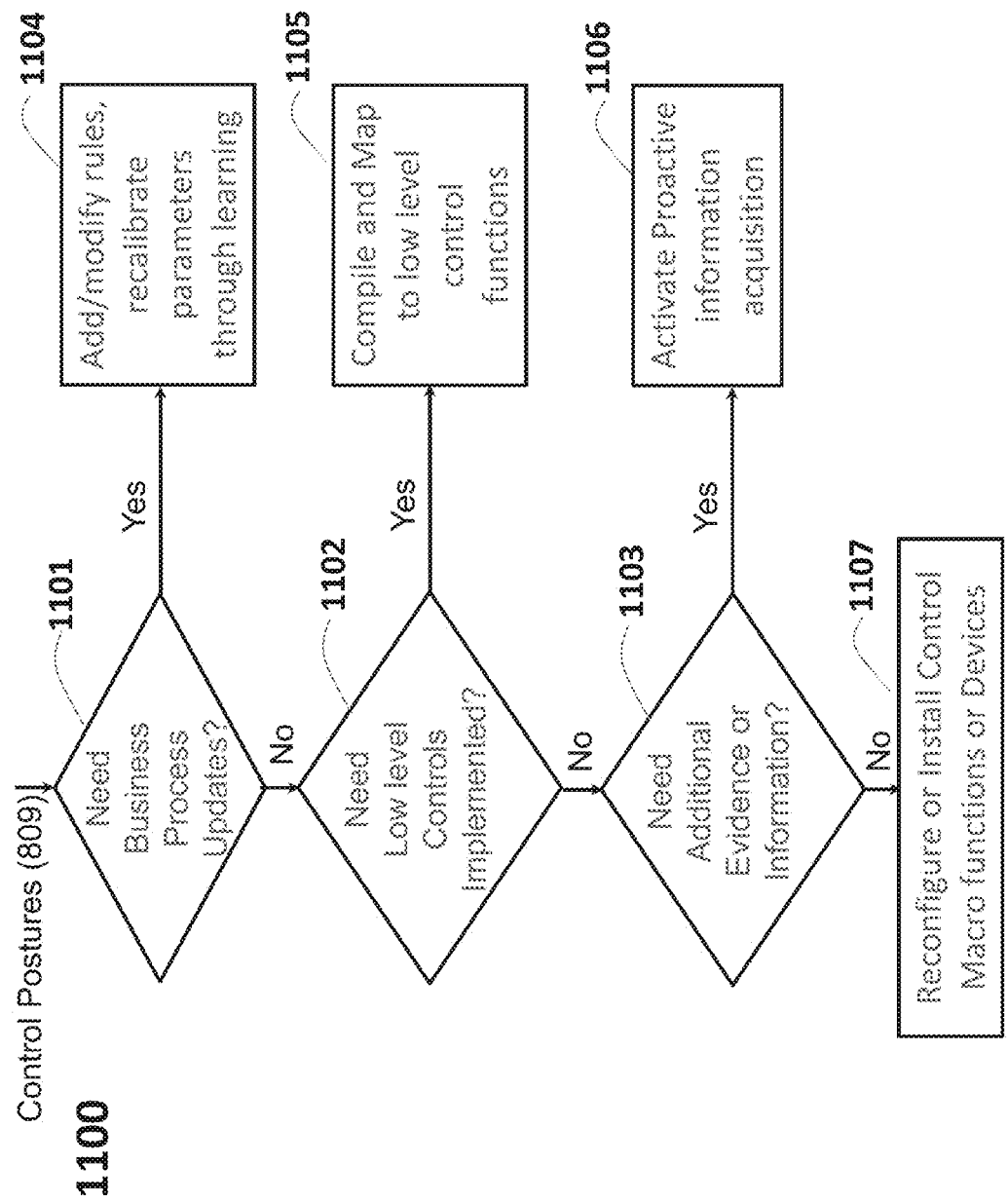
FIG. 11 is a flowchart showing synthesis flow of business process and security control postures according to the invention.

FIG. 11 shows the algorithmic flow detailing the different transformation techniques the control synthesis process deploys to transform high level control postures into low level security and other business process control implementations. Depending on the control posture (809), one or more (although such cases not shown in the flow chart for simplicity's sake) of the methods, viz., modifying business processes, rules, and/or recalibrating parameters (1104), compiling and mapping to lower level control functions (1105), triggering the proactive information acquisition application (1106 and 1718, which is explained in more details in FIG. 17), or installing new devices and processes (1107) with the help of the performance characteristics report (914, 1014). To control business functions security, efficiency, and effectiveness, the control measure may require modifications, additions, or parameter recalibration of a plurality of business process rules comprising any of physical, operational, security, and regulatory processes (1101). The synthesis engine can coordinate with rule and learning engines using various machine learning techniques (1104) to bring that about. In other cases, security process changes, such as single sign-on across categories of systems, filtering outbound traffic for specific information leakage, or deployment of more secure protocols could be the control measure recommended by the inference and synthesis engine (1107).

Figure 12:
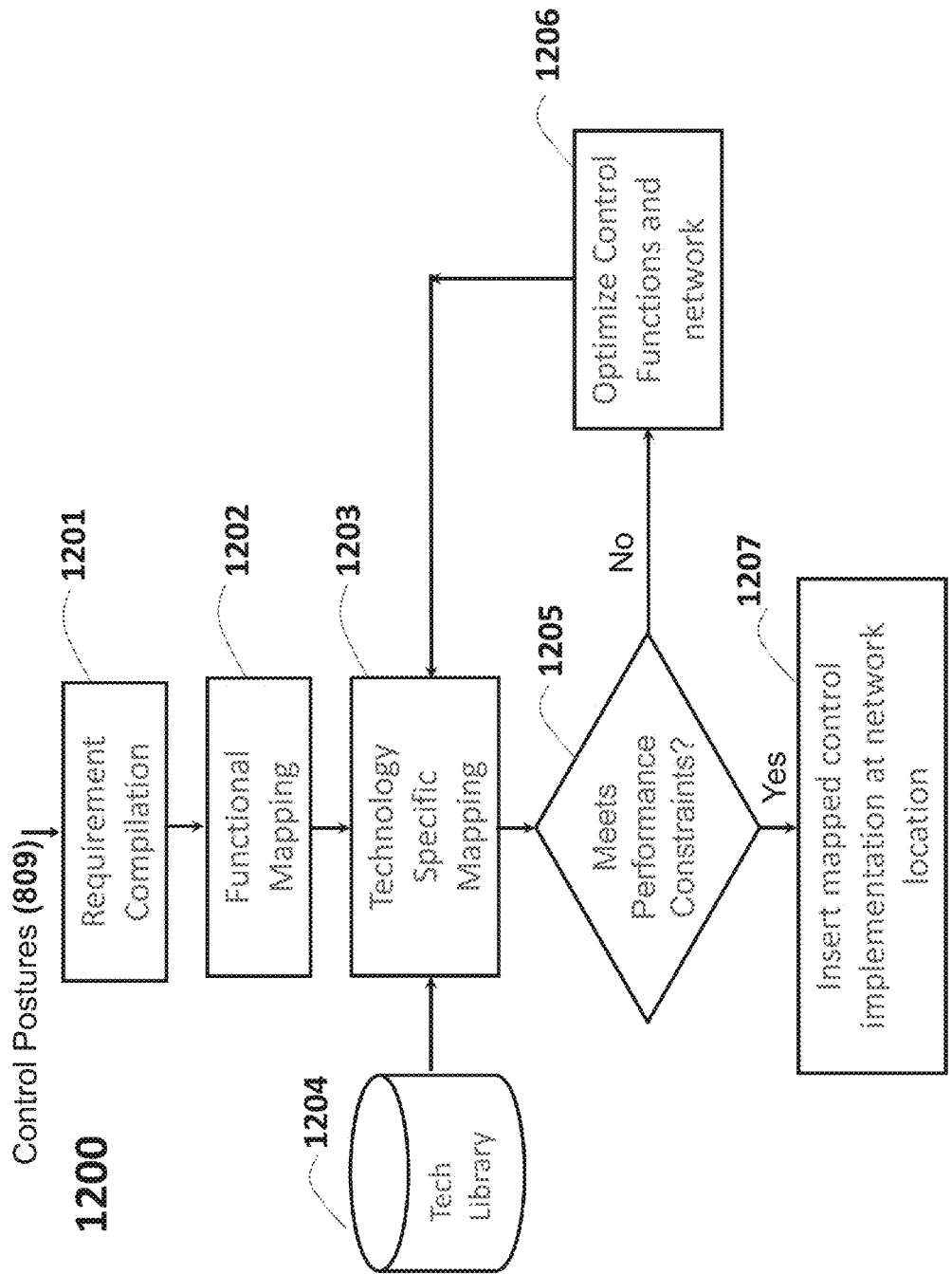
FIG. 12 is a flowchart showing low level control function synthesis flow of security control postures according to the invention.

FIG. 12 shows the detailed algorithmic flow of the compilation and mapping process (1105) that transforms high level control postures (809) to low level security control implementations using pre-characterized technology dependent libraries (1204) of control functions, such as encryption and authentication. Similar to logic or high level synthesis process which transforms design intent and specification into optimized circuit implementation through various mapping and optimization algorithms, or the process of a high level language compilation into low level machine code, this process transforms the high level control requirements to lower level control measures by compiling (1201) the control posture and then mapping (1202) them to combination of functions by using a pre-characterized library of control implementations. The library may consist of generic standard security control functions, such as encryption, authentication, etc., as well as macro control functions, such as network firewall, Web application filter (WAF), etc. Such functions are often characterized by capacity, configuration, and performance and may vary widely depending on specific technology used, i.e. a 3DES encryption from vendor X varies in many characteristics from an AES encryption from vendor Y, thus making the use of technology library (1204) imperative.

FIG. 13 presents a schematic table showing security control posture (the upper row) and business process control posture (the lower row) mapped to overall control functions which are weighted composition of standard and macro control functions (the last column) according to the invention.

Figure 15:
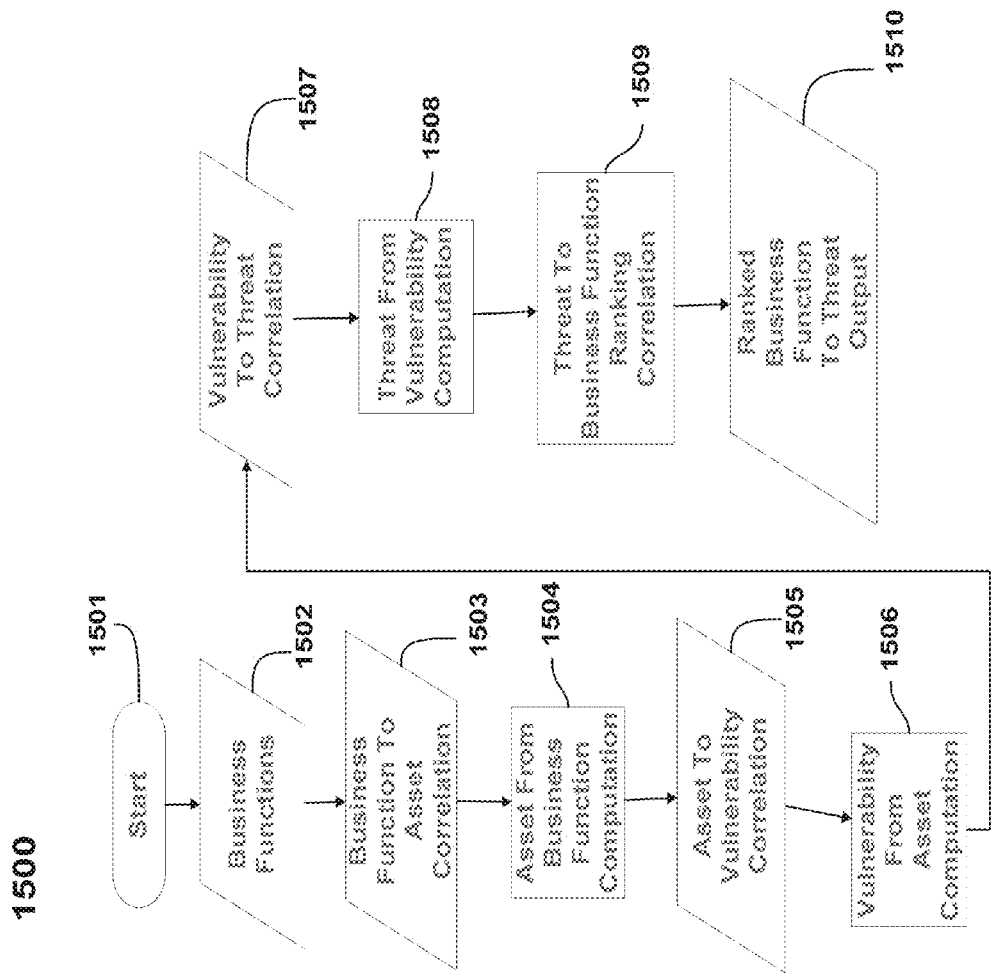
FIG. 15 is a flowchart showing risk analysis and computation flows according to the invention.

The control flow for the formal business function to threat ranking engine is depicted in FIG. 15. The process is either a stand-alone process or a collection of self similar modules at all MCEs. If this is implemented in a distributed fashion, then the process is self similar at all MCEs. Therefore, FIG. 15 presents implementation at one generic MCE. The scope of the input data and output results depends on the scope of the MCE and the relevant process cycle.

As shown in FIG. 15 (1501), domain knowledge relevant to the enterprise is gathered using automated discovery processes and complimented by industry specific templates, along with requirements gathering with domain experts. The relevant business functions are determined. In these embodiments, collections are abstract groupings of behaviors, where a collection may be a group of behaviors and data. A cell is an abstract container for a collection, and a cell may be a group of behaviors and data.

Three use cases are examined to illuminate the self-similar nature of the Threat and Vulnerability module. Use Case 7 examines a Security Risk profile and is described by Table 1 through Table 7. Use Case 8 examines a Natural Disaster risk profile and is described by Table 8 through Table 14. Use Case 9 examines an Asset Management risk profile and is described by Table 15 through Table 21. These use cases relate to an embodiment of a systematic computational approach to assigning rank order to essential business functions with respect to specific threats. This is a specific embodiment of the risk analysis engine (607) shown in FIG. 6. The formal computational model performs a series of computational steps by associating business functions to assets and then correlating business function and/or asset result set to vulnerabilities, computing the asset to vulnerabilities result set, and then correlating this to threats and computing the vulnerability to threat result set. This is an embodiment of the calculation specified in FIG. 7 (700). The interrelationship of this computational model as described in FIG. 6 (600) provides a prioritized funneling to help reduce the scope of expected big-data and allows situational awareness with domain specific knowledge. The ranked threat profiles are then reverse correlated back to the originating business functions to output a formal ranked threat to business function cells.

Figure 16:
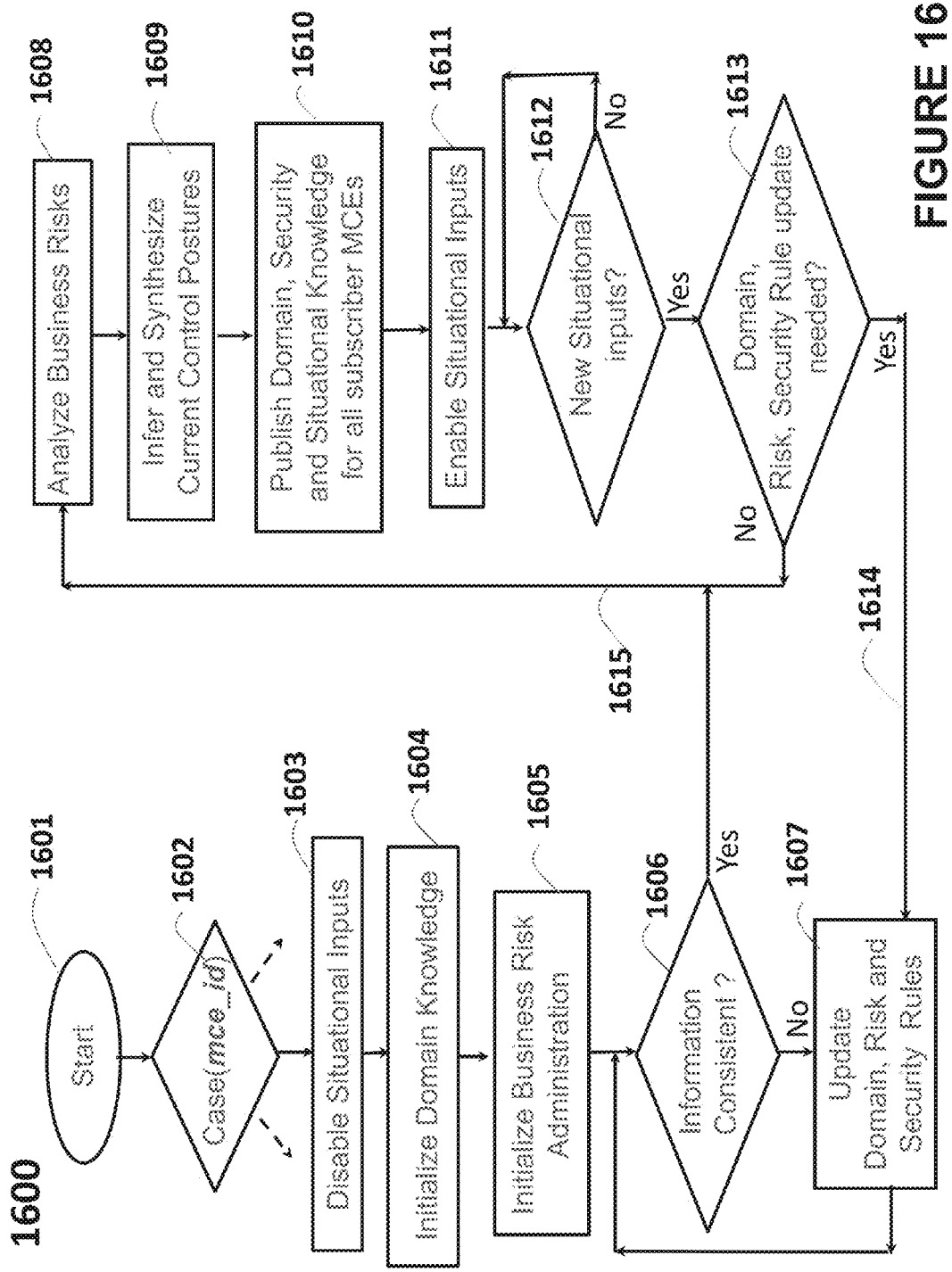
FIG. 16 is a flowchart showing risk analysis and control flows at one or all the MCEs according to the invention.

The overall risk analysis and control flow across one or more MCEs in the process of the invention is depicted in FIG. 16. The process is self similar at all MCEs irrespective of whether the embodiment consists of one standalone MCE or multiple coordinating MCEs. Therefore, FIG. 16 presents implementation at one generic MCE, designated as mce_id (1602). The scope of the input data and output results depends on the scope of the MCE and the relevant security cycle. Initially, the situational inputs are turned off (1603) so that appropriate values for all required domain knowledge (1604) and security risk administration (1605) entities are initialized.

As shown in (1604) domain knowledge relevant to mce_id is initiated for each domain relevant to the enterprise. This may include lists, tables, parameters, etc. representing topology, functional relationships, and rules relevant to operational domains, IT systems, and security systems.

Then, security risk administration knowledge is initialized (1605). This may include lists, tables, parameters, etc. representing security blueprint, security policies, and security rules.

Then, a consistency check is performed (1606) to verify that all domain rules and security risk blueprints, policies, and rules are mutually consistent. If not consistent, the relevant data is corrected (1607).

Upon assuring consistency, security risks (1608) are analyzed and then control postures (1609) are determined. The relevant domain knowledge and situational awareness is published for all subscriber MCEs (1610). One of the subscriber MCEs may or may not be the current MCE (mce_id).

At pre-specified security cycle time or upon occurrence of significant events, new situational inputs (1611) are obtained and analyzed to determine if any updates are needed for the knowledgebase. If no updates are needed, control is passed (1615) to the process of analysis of business risks (1608), inference of control postures (1609) and updates of domain knowledge and situational awareness (1610) for subscriber MCEs. If updates are needed, then control is passed (1614) to update knowledge (1607).

Figure 17:
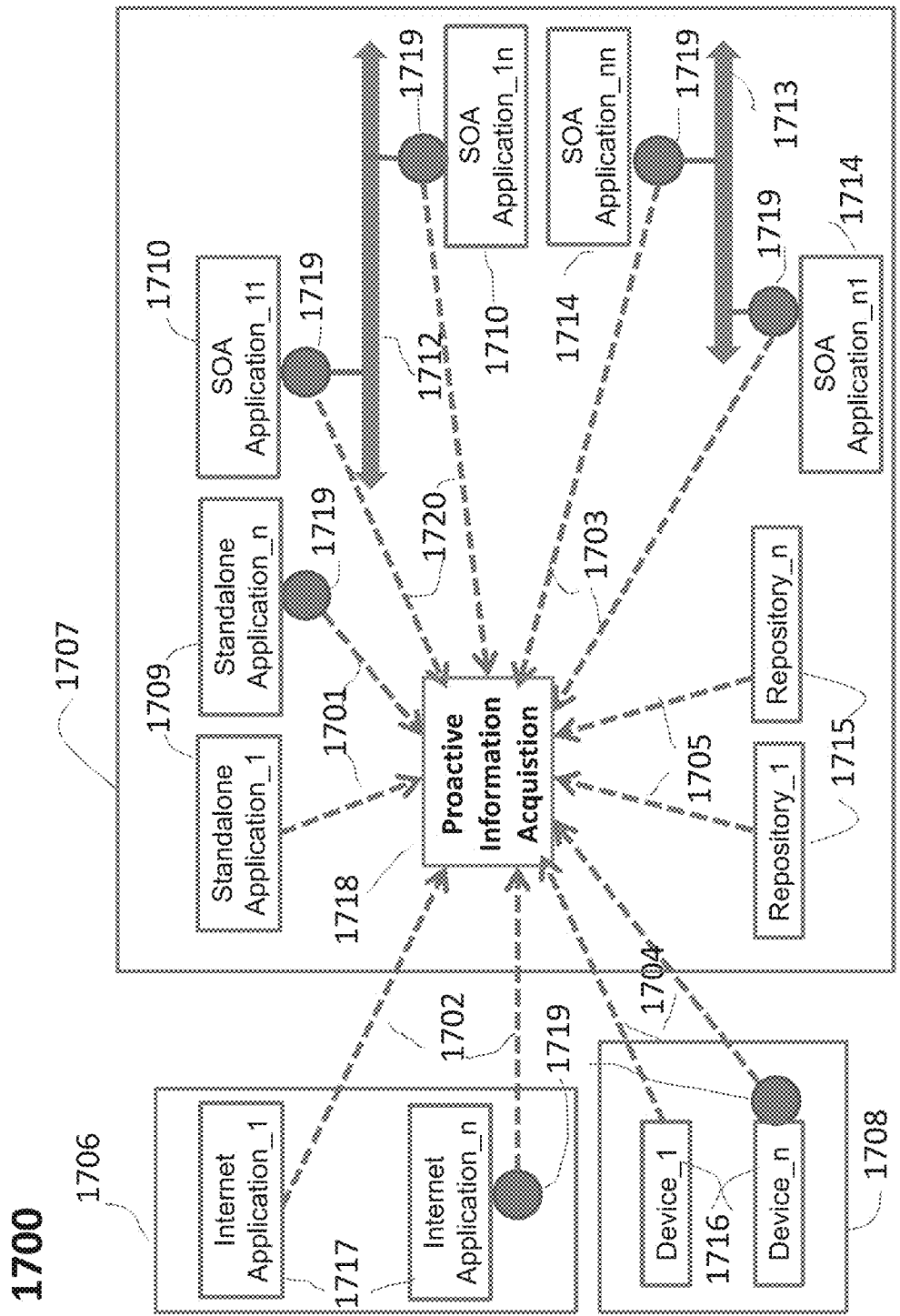
FIG. 17 is a block schematic diagram showing a proactive information, evidence, and knowledge gathering approach according to the invention.

FIG. 17 depicts an exemplary enterprise-wide computer network (1707) that has applications (1709, 1710, 1714) deployed on computers within the network. This enterprise network may connect to the internet (1706) where there are other applications (1717) deployed on accessible computers. This enterprise network may also connect to a field network (1708) that hosts field devices that may also have applications deployed (1716) on them. Some of the applications (1710, 1714) satisfy a Service Oriented Architecture (SOA) and run on one or more enterprise wide software buses (1712, 1713). These applications can interact with each other through various messages. Other applications (1709) may be standalone enterprise applications which may not conform to SOA architecture. Some of the applications will have a well known and published interface (1719) while others may have a proprietary interface. There can be various data repositories within an enterprise network (1715) containing a wide variety of data, such as premise access logs, email exchanges, phone call or video records.

The proactive information acquisition application (1718) may be triggered by inconclusive control inference (807) or control synthesis process (916). Evidentiary reinforcements in the form of confirmation or negation of inference could also start the application to communicate with the various external and internal services and applications and gather information and collect evidence for the purpose of Risk Analysis. The significant aspect of the application is that some of the information provided by the server applications for Risk Analysis may not have been originally intended for such a use by the authors of the applications. However, the application (1718) is able to extract that relevant information which it can utilize to satisfy the unmet needs of Risk Analysis.

The proactive information acquisition application may communicate (1720, 1703, 1701 respectively) with the SOA and non-SOA applications within the enterprise and may interact (1704) with the field devices to get situational/operational information relevant for risk analysis. It may also communicate (1702) with applications hosted publicly on the internet to obtain external context relevant to risk analysis (such as weather data, threat data, regulatory updates etc). It also accesses (1705) repositories within the enterprise to obtain relevant historical and real-time data on premise access, email access, phone calls, network logs etc.

Figure 18:
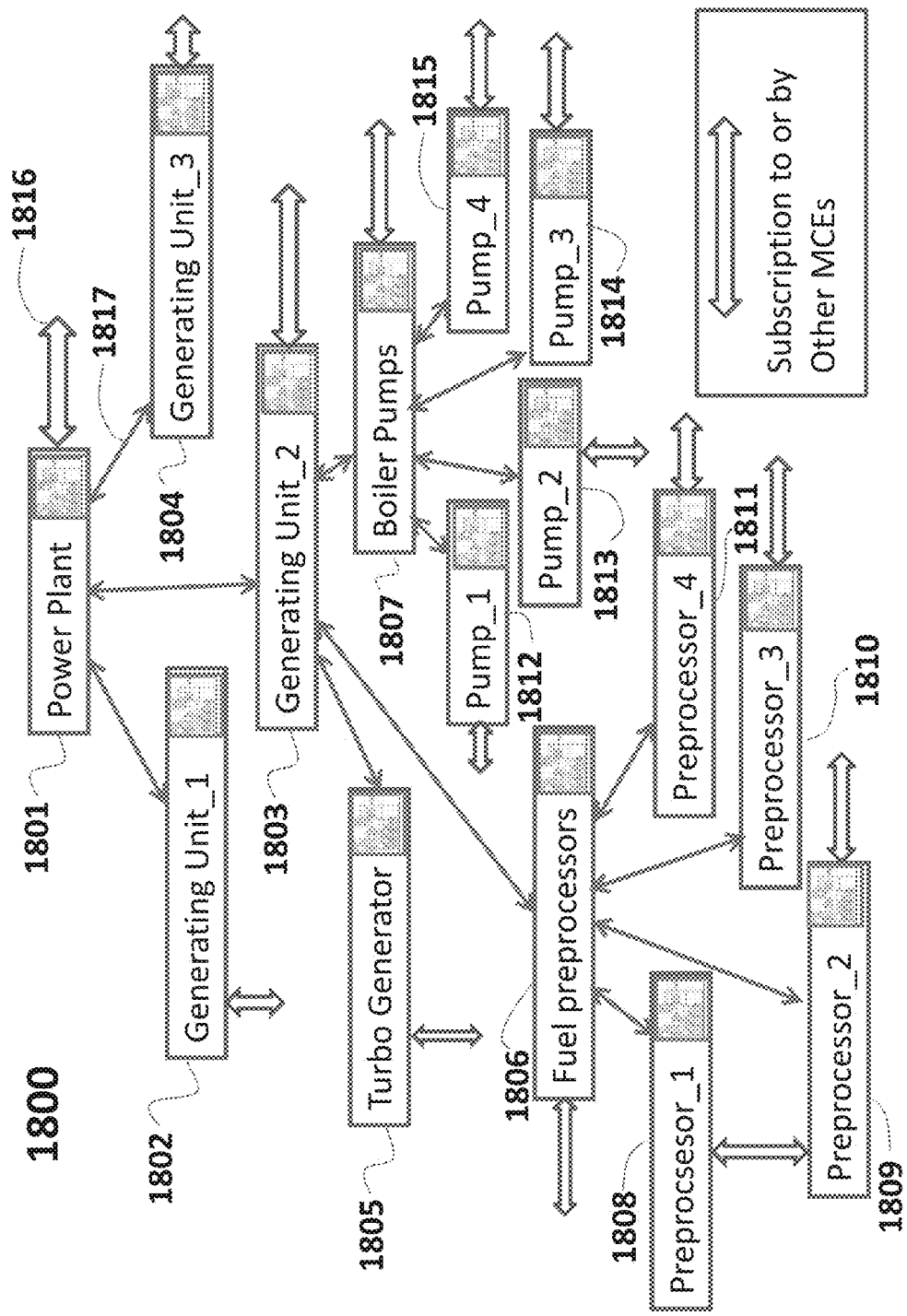
FIG. 18 is a block schematic diagram showing a pervasively distributed and coordinated analytical environment of a monitored and controlled element (MCE) according to the invention.

The schematic diagram (1800) of FIG. 18 depicts the pervasiveness and self-similarity of the analytical environment of the monitored and controlled elements (MCE). In FIG. 18, each rectangle refers to an MCE (1801 through 1815). They mostly act as publishers of their control postures and decisions, as well as subscribers of other MCE element control postures and decisions. The arrows depict the direction of the flow of subscribed data and information from the publishers and to the subscribers, which often would be self-inclusive. The block arrows represent subscriptions to, or by, other MCEs not explicitly shown in FIG. 18. As already described, any MCE can in principle subscribe to any other connected MCE, but practically they do so only for the data and information that they need. Each MCE publishes each of its own output data items only to the MCEs that subscribe for that information.

The MCEs are similar to each other in terms of their architecture. Each MCE is imbued with the capability to discover the input data items it needs based on its role, location, and other configuration information, as well as enumerate the source MCEs for such data items. It can subscribe to the input data it needs. The MCE includes the security risk analysis engine required to process the input data items into the required output data items for publication to relevant subscribers which might include security analysis and inference outputs, including security latch settings. An MCE can subscribe to its own output to apply its own analysis and inference, in addition to multicast it to other subscribing MCEs.

This pervasively self-similar architecture is further illustrated using a power plant MCE (1801) as an example for calculating the total available generating capacity at the plant in light of operational and security risks to which the systems and subsystems are exposed. This MCE discovers that it needs information from three generating unit MCEs and enumerates them as such (1802, 1803, 1804) based on the configuration information that it is located in a power plant, what its role is in the context of plant-wide monitoring and control, and that it is connected through publish-subscribe model with the three generating unit MCEs. It also knows as part of domain knowledge (609) that it needs to sum up the available capacity from each generating unit and subscribes for that data. Each of the generator MCEs (1802, 1803, and 1804) publishes its own available capacity whenever its value changes though input (subscription) notifications through 601 and 602. The power plant MCE (1801) calculates the sum whenever one of the three inputs changes. Note that the calculation engine could reside in 607.

The generator unit MCEs (1802, 1803, 1804) themselves subscribe for data from other MCEs. For example, the generating unit 1 (1802) may subscribe to the status of its own unit transformer MCE (not explicitly shown in FIG. 18). If the status changes from available to unavailable, then the unit transformer calculates its own available capacity as zero MW and publishes that information to the generating unit MCE (1802), which then determines that the available capacity from that unit to the power plant as zero MW. Thus, a change in information is processed in the relevant MCEs, the resulting impact on relevant attributes are analyzed in the risk analysis engine (607), and the resulting readjustment of security and risk controls are computed and validated in the risk inference engine (614) before being sent out to all subscribing MCEs throughout the enterprise network for which the changes would have some impact.

This, in turn, might trigger similar analysis and computation along with other monitored input change notifications at their monitored input points (601). This is how the impact of a change propagates through the subscription network of MCEs in appropriate hierarchy so that each affected MCE can determine its own security risk posture. This avoids both communication and processing capacity bottlenecks that a central security risk manager would have had to face. Such pervasively coordinated MCEs, distributed throughout the enterprise network can better analyze, infer, and control security risks in their appropriate domain and situational contexts.

The available capacity of generating unit 2 (1803) can be computed as the minimum of the three available capacities from its own turbo-generator MCE (1805), fuel pre-processors MCE (1806), and the boiler pumps MCE (1807). The turbo-generator (1805) may be rated 100 MW, the four preprocessors (1808, 1809, 1810, and 1811) may support 30 MW each and the four boiler pumps may support 30 MW each. If initially all these components are available, then the available capacity of generating unit 2 (1803) is 100 MW, i.e. a minimum of 100, 120, 120. Then, if preprocessor_2 (1809) becomes unavailable, the available capacity is 90 MW, i.e. a minimum of 100, 90, 120. This change is propagated from the preprocessor_2 (1809) to preprocessor MCE (1806) to generating unit 2 (1803) to the power plant MCE (1801). If boiler pump 3 becomes unavailable, then the available capacity remains 90 MW, i.e. a minimum of 100, 90, and 90. This change propagates from boiler pump 3 (1814) to boiler pumps MCE (1807) but no further. Subsequently, if boiler pump 4 becomes unavailable, then the available capacity becomes 60 MW, i.e. a minimum of 100, 90, and 60. This change propagates along the subscription chain all the way to the generating unit 2 (1803).

Any other attributes relevant to business risk or security risk can be similarly, correlated and analyzed so that security risk and control can be composed to quantify the risk or security at any MCE throughout the enterprise. Any change in an attribute propagates along the subscription chains either up (parent), down (children), or sideways (peer level) as needed for distributed processing through the relevant hierarchies.

The above procedure can be extended to apply to any domain of any enterprise by experts in the relevant domain and/or business segment.

Use Cases

Embodiments of the invention can be applied for any scale of enterprise and various operational systems they rely on to carry out their business functions, be they the electric power or water grid for a utility enterprise, financial instrument trading exchanges for a financial services institution, or the patient radiological information database for a large healthcare provider. In addition, each enterprise may depend on processes in more than one operational domain.

To illustrate that embodiments of the invention can be applied to any enterprise in any and all domains of interest, exemplary use cases are provided in three operational domains, i.e. electric power, financial trading, and health care, as well as the associated IT domain and the security domain. In addition, use case 6 is provided to illustrate operational sequence of embodiments of the invention in the event of a security breach.

The use cases provide few illustrative lists of only a few selected exemplary inputs considered to help experts in various industry domains to understand how the embodiments of disclosed invention can be applied to their own domains. It should however be appreciated that there can be thousands of inputs in each domain and they cannot be exhaustively listed here in all the richness and diversities of their volumes and variations.

Use Case 1: Application in the Electric Power Domain

Examples of monitored inputs and events (electric power domain):

Security threat state (603)
 Heightened terrorism alert level from the Department of Homeland Security. A specific power grid security event occurred in California. DHS advises to tighten the security postures for all nuclear power plants.
 Increased flood probability at a substation because an upstream dam received unusually heavy rainfall.
 Increased fire probability along a transmission right-of-way because there has not been any recent forest fire or manual effort in clearing the dry undergrowth.
 Possible power system security breach reports where breakers behaved inexplicably because audit trails did not record any corresponding root causes.

Operational system state (604)
 Breaker state (open or closed).
 Loading levels (generators, transformers, transmission lines).
 Partial or full outages of equipment, scheduled and unscheduled.
 Individual load magnitudes.
 Service criticality: The hospital's backup generator is being repaired.
 Least recently overhauled power transformers and their redundancy.

Examples of domain knowledge (electric power domain):

Operational system knowledge (610)
 Functional
  Loss of one equipment should not cause disruption of service (operating guidelines).
  Total power into a node should be equal to total power out of the node (physical law).
  Total generation in a specific area should be more than 50% of the load in that area (operating constraints for maintaining stability).
  Each load should have at least two independent paths for supply (operating redundancy).
  Statistics about typical loading levels (normative patterns to identify anomalies).
 Structural
  Specific topological and geographical information about the power system components.
  Capacity of equipment.
 Vulnerability
  Flash flood can cause short circuit in a substation.
  Wild fire can affect some transmission lines.
  Thunder storm can strike and disable a transmission line.
  Loss of right-of-way can affect a set of transmission lines.

Examples of security risks to be evaluated (607, 613) (electric power domain):

Impact on safety.
Occurrence or probability of load shedding.
Occurrence or expected amount of unserved energy.
Impact on service quality (low voltages, harmonics, etc.).
Impact on revenue.
Cost of restoration.
Impact on stakeholder relationships (reputation).

Examples of security risk administration knowledge (616) (electric power domain):
  Blue print
    Procedure to identify and classify critical equipment.
    Procedure to identify appropriate security measures for critical equipment.
    Chain of command for monitoring security events and conditions (alert recipients).
  Policy
    Physical security of all 500 KV substations should be monitored via remotely controlled video and/or infrared cameras.
    Data from all 500 KV equipment should be monitored once every second.
    Data from all 500 KV equipment should be monitored through at least three independent data paths.
  Rules
    Loss of load probability (LOLP) should be less than a specific threshold.
    Expected amount of unserved energy should be less than a specific threshold.
    Loss of load probability (LOLP) at a hospital should be less than a specified threshold.
Examples of control postures (614, 617) (electric power domain):
  Re-dispatch generation to improve reliability and/or stability as a result of specific localized threats.
  Reconfigure substation to decrease expected unserved energy in the event of attack or fault (load balancing, redundancy).
  Reconfigure feeders to reduce loss of load probability at a hospital.
  Sample for anomalous events more frequently.
  Monitor 500 KV substation' health parameters, e.g. messages to other substations using ICCP) more frequently.
  Require more stringent role based authorizations for manual breaker operations (interplay of OT and IT security controls).
Business functions (702) (electric power domain):
  Supply electricity at each node with specified service quality (reliability, stability).
  Customer billing and payment processing.
  Demand response.
  Time-of-use, peak and off-peak based power tariff for CIR customers.
Services offered (702) (electric power domain):
  SCADA based monitoring and control of devices and equipment.
  Customer and other meter reading.
  Invoicing.
  Remote connect and disconnect of services.
  Pre-paid metering.
  Outage management.
  Workflow management.
  Asset management.
  Inventory management.
Assets deployed (703) (electric power domain):
  Power plants.
  Generators.
  Transformers.
  Transmission lines.
  Circuit breakers.
  Substations.
Asset vulnerabilities (703, 704) (electric power domain):
  Empty fuel tank at a power plant.
  Frozen coal at a power plant.
  Transformers overloaded.
  Phase angle across a transmission path too large.
  Wild fire on right of way.
  Stuck circuit breakers.
  Substation is vulnerable to physical attack.
  Flood at a substation.
Threats (704) (electric power domain):
  Attack on a fuel tank at a power plant.
  Bad winter weather at a coal plant.
  Hot summer weather increasing load on a transformer.
  Tampering with SCADA measurement data.
  Wild fire on right of way.
  Stuck circuit breakers.
  High probability of physical attack on a substation.
  Flood at a substation.
  Tampering with meters.
  Attacks on maintenance crew.
Security controls (802) (electric power domain):
  Check fuel inventory more often.
  Re-dispatch generators to survive bad winter weather at a coal plant.
  Reconfigure feeders to decrease load on a transformer.
  Get important SCADA data more often and on redundant paths.
  Re-dispatch generators to survive wild fire on right of way.
  Perform fault-analysis for back-up breaker operation.
  Re-dispatch generators to survive flood at a substation.
  Check quality of meter data more often, audit all loads on a feeder.
  Provide security to maintenance crew.
Examples of proactive information acquisition (business processes in power domain):
  The proactive information acquisition application queries meter data from meter data management (a SOA application)
  The proactive information acquisition application queries substation meter data from a SCADA system (a SOA application)
  The proactive information acquisition application queries network topology from the engineering analysis system (a SOA application)
  The proactive information acquisition application is able to perform the necessary analysis to verify whether the substation meter data reading is consistent with the power consumption reported by the downstream service point meters after accounting for reasonable line and other losses. It can then elevate the risk of a possible revenue leakage in the form unusually high non technical losses or a possible security attack spoofing meter readings or physical tampering of meters by evidentiary reinforcement of information acquired on meter location security.
Use Case 2: Application in the Financial Services Domain
  Examples of monitored inputs and events (financial services domain):
    Security threat state (603)
      Heightened hacker alert level based on news reports.
      Human resource events (strikes, layoffs, etc.).
      Probability of power outage to essential equipment.
      Security breach reports.
    Operational System State (604)
      Trading positions held as % of all assets.
      Probabilities of gains (or losses) for each position.
      Availability of supporting equipment (forced outage or maintenance outage, etc.).
      Availability of supporting personnel (vacations, sick leave, etc.).

Examples of domain knowledge (610) (financial trading domain):
  Operational System Knowledge
    Functional
      Loss of one equipment should not cause disruption of service.
      Sum of assets should be equal to sum of liabilities.
      Credits and debits in reconciliation accounts should be less than pre-specified thresholds.
      Amount of a single trade should be less than a pre-specified threshold.
      Daily trade volume target.
      Statistics about typical trading volumes.
    Structural
      Dependencies of trading positions on macroscopic economic parameters.
      Constraints on trading positions in a given industry.
      Hedging relationships among industries.
      Dependency on microscopic financial data.
      Target volumes for positions.
    Vulnerability
      Certain stock prices depend on treasury bond rates.
      Bad winter weather may increase orange juice prices.
      Explosion at a refinery may increase price of gasoline.
      Explosion at a refinery may decrease price of crude oil.
Examples of security risks to be evaluated (607, 613) (financial trading domain):
  Occurrence or probability of losses.
  Occurrence or expected amount of gain.
  Impact on service quality (time to execute a buy or sell order).
  Impact on revenue.
  Impact on stakeholder relationships.
Examples of security risk administration knowledge (616) (financial trading domain):
  Blue print
    Procedure to identify and classify critical equipment.
    Procedure to identify appropriate security measures for critical equipment.
    Chain of command for monitoring financial security events and conditions.
  Policy
    Physical security of trading equipment.
    Frequency of automated audits.
    Frequency of balance sheet calculations.
  Rules
    Probability of loss should be less than a specific threshold.
    Amount of loss should be less than a specific threshold.
    Trading volume should be more than a specific threshold.
Examples of control postures (614, 617) (financial trading domain):
  Sell certain positions to decrease volatility.
  Buy certain positions to hedge against certain other risks.
  Buy certain positions to improve long-term gain.
  Look for anomalous events more frequently.
  Require more stringent authorizations for trades.
Business functions (702) (financial trading domain):
  Attract customer deposits.
  Investing.
  Billing.
  Enforce regulations.
Services offered (702) (financial trading domain):
  Receiving customer deposits.
  Paying out customer withdrawals.
  Accounting.
  Public domain financial data.
  Private analyses.
  Customer oriented news letters.
  Real-time performance monitoring.
Assets deployed (703) (financial trading domain):
  Buildings.
  Dedicated process computers.
  Customer service representatives.
  Traders.
Asset vulnerabilities (703, 704) (financial trading domain):
  Power outage at a building.
  Computer overloads.
  Data link overloads.
  Errors and omissions by overloaded traders.
  Errors and omissions by overloaded customer representatives.
Threats (704) (financial trading domain):
  Attack on a building.
  Hacker attack on computers.
  Spam directed at traders or customer representatives.
  Tampering with incoming data.
  Tampering with outgoing announcements.
Security controls (802) (financial trading domain):
  Hire more security guards.
  Check for spam more often.
  Check for quality of incoming data more often.
  Acquire incoming data by redundant paths.
  Scrutinize trades more often.
  Require more stringent authorizations based on trade volume.
Examples of proactive information acquisition (financial fraud monitoring and analysis—business processes in financial services domain):
  A credit card user informs the credit card company about upcoming foreign travel plans.
  The proactive information acquisition application receives information about a credit card transaction (by the user in the native country) from a SOA application on the ESB
  The proactive information acquisition application accesses the user profile from a local database.
  The proactive information acquisition application notices that the user is supposed to be in a foreign country
  The proactive information acquisition application accesses the user's travel profile from an application on the Internet
  The proactive information acquisition application observes that the user was indeed scheduled to be in a foreign country at this time but did not actually travel
  The proactive information acquisition application hence deems the transaction as safe.
Use Case 3: Application in the Health Care Domain
Examples of monitored inputs and events (602) (health care domain):
  Security threat state (603)
    Heightened terrorism alert level from the Department of Homeland Security.
    Highway shutdown due to a traffic accident.
    Disease outbreak warnings from CDC.
    Human resources (strikes, layoffs, etc.).

Operational system state (604)
  Partial or full outages of equipment.
  Bed occupancy level.
  Availability of personnel (doctors, nurses, pharmacists, other support personnel).
  Outages of intensive care equipment.
  Surgery rooms availability.
  Stocks of medical supplies.
Examples of domain knowledge (health care domain):
Operational system knowledge (610)
  Functional
    Loss of one facility should not cause disruption of service.
    Emergency patients should be checked in and assigned to a physician in ten minutes.
    Statistics about typical volumes of various supplies used.
    Statistics about typical volumes of various services provided.
  Structural
    Specific location information about the facilities.
    Capacity of each facility and equipment.
  Vulnerability
    Failure of refrigeration can damage certain medical supplies.
    Loss of power can affect some services.
    Intruders can cause accidents.
Examples of security risks to be evaluated (607, 613) (health care domain):
  Impact on safety.
  Occurrence or probability of mistakes (using wrong medicines/operating on wrong patient or wrong part of the body).
  Probability of running out of beds.
  Impact on service quality (time to respond to an in-patient request).
  Impact on revenue.
  Impact on stakeholder relationships.
Examples of security risk administration knowledge (616) (health care domain):
  Blue print
    Procedure to identify and classify critical equipment.
    Procedure to identify appropriate safety measures for critical equipment.
    Chain of command for monitoring safety events and conditions.
  Policy
    Physical security of all in-patient areas should be monitored via remotely controlled video and/or infrared cameras.
    An emergency patient should be seen by a physician within ten minutes after arrival.
    There should always be two nurses available to attend to the next task in the ICU patient area.
  Rules
    Safety metric should be more than a specific threshold
Examples of control postures (617) (health care domain):
  Re-dispatch personnel to improve safety.
  Re-dispatch personnel to improve service quality.
  Perform automated inventory more frequently.
Business functions (702) (health care domain):
  Provide health care.
  Billing.
  Collecting revenue.
Services offered (702) (health care domain):
  Outpatient examination.
  Outpatient follow-up.
  In-patient care.
  Intensive care.
  Invoicing.
  Insurance claims.
  Inventory management.
Assets deployed (703) (health care domain):
  Intensive care rooms.
  Private rooms for in-patients.
  Shared rooms for in-patients.
  CATSCAN equipment.
  X-Ray equipment.
  Pharmacy.
Asset vulnerabilities (703, 704) (health care domain):
  Run out of anesthetics.
  Accidental mix-up of prescriptions.
  Mischief by Intruders.
  Power outage in the building.
Threats (704) (health care domain):
  Tampering with medical supplies.
  Tampering with surgical supplies.
  Tampering with food of patients.
  Tampering with prescriptions of individual patients.
  Tampering with bills.
  Loss of privacy of patients.
  Loss of privacy of personnel (doctors, nurses, etc.).
  Fire in the building.
Security controls (802) (health care domain):
  Have more security guards.
  Check medical inventory more often.
  Reassign personnel.
  Require more tests, scan images in critical cases.
Use Case 4: Application in the IT Domain
  Examples of Monitored Inputs and Events (602) (IT Domain):
    Security threat state (603)
      Heightened hacker alert level based on news.
      Ping flooding.
      Failed logins.
      Password cracking.
      Power outage in the building.
      Fire in building.
      Security breach reports from computer emergency response team (CERT).
      Anomalous sequence or information exchange which might betray attacks.
    Information System State (605)
      Outages of computers.
      Infection of firewall.
      Outages of intelligent embedded devices and sensors unavailable.
      Loading levels on the data links, and computers/BW and congestion.
      Latency of data/performance degradation.
  Examples of domain knowledge (611) (IT domain):
    IT system knowledge
      Functional
        Loss of one server or router should not cause disruption of service (robustness).
        Statistics about data transactions such as DB read/write frequency and volume.
        Performance degradation of applications with volume and types of information.
        Statistics about various message types (volume, frequency, mean-time-between-messages, etc.).
      Structural
        Specific topological and geographical information about the IT system components and the underlying operational system components, if any; e.g. IED at a transformer. Capacity of equipment (processing power, memory size, band width, etc.).
        Logical relationships among IT devices (firewalls, backup computers, storage devices, communication links).
        Logical relationships between IT devices and operational components, such as transformers, etc.
        Protocols (ICCP, XML over HTTP over TCP/IP over Ethernet, MutliSpeak, CIM, Financials HFT, etc.)

Vulnerability
> Operating System weakness for cached memory protection.
> Network transmission: medium and protocol, e.g. wireless and clear text.
> Susceptibility to buffer or integer overflow errors.
> SQL injection and input validation (trust boundary validation).
> Access control failure.

Examples of security risks to be evaluated (607, 613) (IT domain):
> Impact of IT on operational safety.
> Occurrence or probability of crash of equipment (denial of service) and consequent damage potential.
> Impact on service quality (latency in response).
> Confidentiality breaches and impact on personally identifiable Information (PII), if any.
> Impact on revenue.
> Cost of restoration.
> Impact on reputation.

Examples of security risk administration knowledge (616) (IT domain):
> Blue print
>> Procedure to identify and classify critical IT devices and operational equipment being controlled.
>> Procedure to identify appropriate security measures for critical equipment.
>> Chain of command (prioritized alert recipient list) for monitoring security events and conditions.
>
> Policy
>> Physical security of all servers.
>> Heartbeats from servers checked for latency once every second.
>> Passwords changed every week and on events.
>> Role based authorization.
>> Monitoring privilege upgrades.
>> Encryption required for certain data/messages.
>> Access tokens.
>
> Rules
>> Request to response time delay should be less than a threshold.
>> Number of packets dropped should be less than a threshold.
>> Loss of service probability should be below a threshold.
>> Field staff access to critical equipment need complex but quick authentication.

Examples of security postures (IT domain):
> Reallocate functions to different computers, storage devices, communication links.
> Reconfigure system environment, e.g. retargeting virtualization.
> Reconfigure firewall protection.
> Look for anomalous events more frequently.
> Start an audit process.
> Increase required encryption levels.
> Ask for more authentication tokens.

Business functions (702) (IT domain):
> Integrated OT and IT view, improved asset management, supply chain efficiency, etc.
> Condition based checking of all equipment and functions.
> Automated non-intrusive performance testing of systems, subsystems, and components.
> Backup archival maintenance locally when backup providers network down.
> Upgrade and maintenance of systems.

Services offered (702) (IT domain):
> Collaborative workplace.
> Location independence and virtual office.
> Cost efficiency in procurement, maintenance, etc.
> Remote operational systems maintenance.
> IT system maintenance (new equipment, functions, patches, upgrades, etc.).
> Resource planning through adequacy analysis.

Assets deployed (703) (IT domain):
> Computers.
> Routers.
> Firewalls.
> Storage devices.
> Communication links.
> ESB.
> Software applications.

Asset vulnerabilities (703, 704) (IT domain):
> Web server to SQL injection.
> Firewall not checking outbound traffic, missing a bot or a malicious insider attack.
> Fire or thermal failure of rack.
> Power outage.
> Infected new software installation.
> Trojan horses through social engineering.

Threats (704) (IT domain):
> Physical attack (pull the plug).
> Spoofing.
> Human resource events (strike, layoff).
> Denial of service.
> Tampering with data.
> Tampering with access controls.

Security controls (802) (IT domain):
> Change passwords more often and have stronger passwords.
> Change encryption key more often if needed.
> Perform periodic audit; adapt frequency and extent to situations.
> Add more honey pots.
> Perform non-intrusive performance tests more often.

Examples of proactive information acquisition (IT domain):
> The proactive information acquisition application queries a SOA application for the observed authentication failures on the ESB
> The proactive information acquisition application queries the human resource management system (HRMS, a non SOA application) for the user role and security authorization details of the user with the failed credentials
> If the user is no longer authorized to perform the operation, the proactive information acquisition application flags the usage of expired credentials within the organization Use Case 5: Application in the Security Domain Examples of monitored inputs and events (602) (security domain):
> Security threat state (603)
>> Heightened hacker alert level based on news.
>> Power outage in the building.
>> Fire in building.
>> Security breach reports.
>> Unfamiliar attacks.
>> Occurrence of anomalous (suspicious) events (including those discovered during the operation of the system).
>
> Security system state (603)
>> Occurrence of various anomalous (suspicious) events (including those discovered during the operation of the invention) including:
>>> Occurrence of spurious messages.
>>> Absence of expected messages.
>>> Anomalous data I/O (volume, frequency, mean-time-between-messages, etc.).

Examples of domain knowledge (612) (security domain):
> Security system knowledge
>> Functional
>>> Breach of one security measure, e.g. access control) should not cause disruption of service.

Importance of the security latches.
Statistics about typical loading levels, message volumes, etc.
Structural
Specific topological and geographical information about the security latches and corresponding IT system equipment and operational system equipment.
Capacity of equipment.
Vulnerability
Tampering with security latch attributes.
Examples of security risks to be evaluated (607, 613) (security domain):
Impact on safety.
Occurrence or Probability of disabling security latch.
Impact on service quality (latency of messages, etc.).
Impact on revenue.
Cost of restoration.
Impact on stakeholder relationships.
Examples of security risk administration knowledge (616) (security domain):
Blue print
Procedure to identify and classify minimal security latches.
Procedure to identify appropriate security measures for legacy systems.
Triggers for modifications in monitoring security events and conditions.
Policy
Security latches with high importance should be audited once every second.
Information related to changes to security latches should be encrypted.
Rules
Probability of breach of a security latch should be less than a specific threshold.
Defense-in-depth composition from point security.
Examples of control postures (617) (security domain):
Reassign security latches (analogous to changing padlocks) more often.
Create additional latches to protect the same operational or IT equipment or function.
Require more stringent encryption.
Business functions (702) (security domain):
Monitor each operational or IT equipment or function.
Calculate the criticality of the monitored equipment.
Services offered (702) (security domain):
Deep message inspection.
Message security enhancement.
Message audits at multiple granularity, multiple time scales.
Assets deployed (703) (security domain):
Authentication tokens.
Crypto processors.
ESB.
Message archives.
I/O ports.
Storage devices.
Honey pots.
Asset vulnerabilities (703, 704) (security domain):
Slow crypto processing; unacceptable performance.
No remote patch management port.
Security controls (802) (security domain):
Enhanced encryption level.
Additional latches or fields in latches or values in fields.
More frequent audits.

Use Case 6: Pervasive, Distributed Intruder Detection

This use case describes a scenario in which an intruder breached the security of a system with conventional security measures, such as SQL injection through a Web form. Thousands of such scenarios are possible in various domains. This is an exemplary case to illustrate the operation of embodiments of the invention in the electric utility domain.

Event 1: An intruder injects a SQL breach into a system and gets unauthorized access to a certain table that includes customer move out information. The intruder changes data for several customers to mark them as moved out. This can happen in the following four different ways:

Case (a): The change is accomplished through due process and protocol of move out with consequent messages indicating the changes.

Case (b): The change is accomplished thorough silent attack, i.e. a direct change in the table without any accompanying messages.

Case (c): After the move out change, the intruder makes additional changes in other tables, e.g. customer details in both customer relations management (CRM) and meter data management (MDM) table.

Case (d): The change is made only for one customer.

Event 2: This invasion can be detected in these four cases as follows:

Case (a): The volume of the move-out messages is too high for that type of message when compared to historical statistics in the domain knowledge database. This fact is highlighted as a suspicious event.

Case (b): The volume of changes to the particular table is too high for that table when compared to historical statistics in the IT domain knowledgebase. The event is marked as suspicious. A request is made to perform an audit of all changes in the suspicious time periods.

Case (c): The volume of changes to the affected two tables (CRM and MDM) is too high for those tables when compared to historical statistics in the IT domain knowledgebase. The event is marked as suspicious. A request is made for audit of changes in both tables.

Case (d): The detection of this intrusion does not happen until the next periodic audit required by security policy specified in the security administration knowledgebase. However, because the number of affected customers is small, the resulting damage may be tolerable.

Event 3: Relevant historical, possibly tainted, data updates made to knowledgebase are marked as suspicious. An audit is requested to check for intrusion. The audit process compares the relevant changes in several tables based on domain knowledge and detects and analyzes inconsistencies and confirms the event as intrusion, erroneous operation or legitimate, although not normative, event.

Event 4: The security incident situational awareness data is updated with this finding.

Event 5: The security analysis engine analyzes the impact of the intrusion. It identifies business risk severity, affected IT equipment and tightens the control postures for the affected equipment and types of messages and data updates.

Event 6: If the severity calculated in event 5 is intolerable, a quarantine of the affected system components is requested.

Event 7: If the severity is high enough, the frequency of periodic audits is increased in the security policy.

Use Case 7: Security Risk Assessment in the Electric Power Domain

Examples of security risks to be evaluated (1502, 1510) (electric power domain):
NOTE: The following is generic to all the cell values (1502, 1510)
Each Cell contains the following three values:
I—Impact: The impact of the asset to the business function.
W—Weight: The weight ratio determining the overall relative weighting.
C—Confidence: The confidence in the impact and weight ratios.
T (1502)
A list of relevant business functions is determined using a template and by interviewing domain experts.
Note: These are generally ranked as their relative dollar impact to the business.

TABLE 1

Security Risk related Business Functions

| | A | B | C | D | E | F | G | H |
|---|---|---|---|---|---|---|---|---|
| 1 | Business Function | | | | | | | |
| 2 | Description | Weight Value (Dollar Valuation) Valuation in Millions of | $ Value Range | Owner | Duration | Start Date | End Date | Notes: |
| 3 | Billing | I = AA % <br> C = BB % <br> W = CC % | | | N | Past | Future | All billing operations |
| 4 | Power Purchase Operations | I = AA % <br> C = BB % <br> W = CC % | | | N | Past | Future | Can purchase power but penalty 30% of wholesale price (wholesale price is 50% of actual) |
| 5 | Customer Relationships | I = AA % <br> C = BB % <br> W = CC % | | | N | Past | Future | Phone lines/customer support operations |

Security risk related business function to assets correlations are associated (1503) (electric power domain):

This is a collection of cells which shows the assets as correlated to a specific business function. There is one row for each asset. There is an asset correlation of each asset to each business function.

In this use case, it is determined that billing and market software and database systems are determined to correlate to the business functions determined in (1502).

An asset may have zero correlation to a specific business function.

The value of the asset to business functions is a relative ranking. This is a value between 0 and 1 where 0 represents no correlation and 1 is a 100% correlation.

Describes how performance of each business function is dependent on different assets.

Asset Valuation:

$F(x) = \Sigma_{\forall \text{ consequential adverse events}}(\text{Asset Cost}, \text{time}*\text{impact of derating}, \text{time}*\text{revenue loss})$ Note: All durations are determined based on the domain starting with business function to asset.

TABLE 2

Security Risk related Business Function to Assets Correlations

| | A | B | C | D | E | F | G | H | I |
|---|---|---|---|---|---|---|---|---|---|
| 1 | Business Function To Asset Correlation | | | | | | | | |
| 2 | Description | Billing | Power Purchase Operations | Customer Relationships | Asset Value Includes per time loss | Owner | Start Date | End Date | Notes: |
| 3 | Billing Database | I = AA % <br> C = BB % <br> W = CC % | I = AA % <br> C = BB % <br> W = CC % | I = AA % <br> C = BB % <br> W = CC % | | | Past | Future | |
| 4 | Billing Software | I = AA % <br> C = BB % <br> W = CC % | Null | I = AA % <br> C = BB % <br> W = CC % | | | Past | Future | |
| 5 | Market Database | Null | I = AA % <br> C = BB % <br> W = CC % | I = AA % <br> C = BB % <br> W = CC % | | | Past | Future | |
| 6 | Market Software | Null | I = AA % <br> C = BB % <br> W = CC % | I = AA % <br> C = BB % <br> W = CC % | | | Past | Future | |
| 7 | Trading Platform | Null | I = AA % <br> C = BB % <br> W = CC % | I = AA % <br> C = BB % <br> W = CC % | | | Past | Future | |

Security Risk related asset from business function valuation is calculated: (1504) (electric power domain):
  Computing the business function collection (1×n) with asset score collection (N×M) results in a 1×N collection. This intermediate collection represents relative valuation of each of these N assets for the given set of business functions.
  This is an intermediate computational collection.
  The value is in dollars based on %'s and $ values from business functions.

Security Risk related vulnerability from asset valuation is calculated: (1506) (electric power domain):
  Computing the vulnerability collection (1×n) with asset score collection (n×m) results in a 1×N collection. This intermediate collection represents relative valuation of each of these N vulnerabilities for the given set of assets.
  This is an intermediate computational collection.
  The value is in dollars based on %'s and $ values from business functions.
  Size: A (1×N) collection where: N=vulnerabilities for the given set of asset functions.

TABLE 3

Security Risk related Asset from Business Function Valuation

| A | B | C | D | E | F | G |
|---|---|---|---|---|---|---|
| 1 Asset From Business Function Calculation | Asset From BF Correlation | | | | | |
| 2 Description | Asset From Business Function Correlation | Confidence Factor | Owner | Start Date | End Date | Notes: 1. |
| 3 Billing Database | Calculated $$ Value | AA % | | Past | Future | |
| 4 Billing Software | Calculated $$ Value | AA % | | Past | Future | |
| 5 Market Database | Calculated $$ Value | AA % | | Past | Future | |
| 6 Market Software | Calculated $$ Value | AA % | | Past | Future | |
| 7 Trading Platform | Calculated $$ Value | AA % | | Past | Future | |

Security Risk related asset to vulnerability correlations are associated (1505) (electric power domain):
This is an N×M collection which shows the vulnerabilities as correlated to a specific asset. There is one row for each vulnerability item. There is a vulnerability correlation of how the specific vulnerability correlates to each given asset.
  Each cell shows how vulnerability is present on a particular asset (relative values).
  Any relative score in a pre-determined scale of points would work.

TABLE 4

Security Risk related Asset to Vulnerability Correlations

| A | B | C | D | E | F | G | H | I | J |
|---|---|---|---|---|---|---|---|---|---|
| 1 Asset To Vulnerability Correlation | | | | | | | | | |
| 2 Description | Billing Database | Billing Software | Market Database | Market Software | Trading Platform | Owner | Start Date | End Date | Notes: |
| 3 Disk Failure | I = AA % C = BB % W = CC % | I = AA % C = BB % W = CC % | I = AA % C = BB % W = CC % | I = AA % C = BB % W = CC % | I = AA % C = BB % W = CC % | | Past | Future | |
| 4 SQL Injection | I = AA % C = BB % W = CC % | I = AA % C = BB % W = CC % | I = AA % C = BB % W = CC % | I = AA % C = BB % W = CC % | I = AA % C = BB % W = CC % | | Past | Future | |
| 5 Power Outage | I = AA % C = BB % W = CC % | I = AA % C = BB % W = CC % | I = AA % C = BB % W = CC % | I = AA % C = BB % W = CC % | I = AA % C = BB % W = CC % | | Past | Future | |
| 6 Telecommunications Failure | I = AA % C = BB % W = CC % | I = AA % C = BB % W = CC % | I = AA % C = BB % W = CC % | I = AA % C = BB % W = CC % | I = AA % C = BB % W = CC % | | Past | Future | |

TABLE 5

Security Risk related Vulnerability from Asset Calculation

| A | B | C | D | E | F |
|---|---|---|---|---|---|
| 1 Vulnerability From Asset Function Calculation | | | | | |
| 2 Description | Vulnerability From Function Correlation | Owner | Start Date | End Dae | Notes: 1. |
| 3 Disk Failure | Calculated $$ value | | Past | Future | |
| 4 SQL Injection | Calculated $$ value | | Past | Future | |
| 5 Power Outage | Calculated $$ value | | Past | Future | |
| 6 Telecommunications Failure | Calculated $$ value | | Past | Future | |

Security Risk related vulnerability to threat correlations are associated (1507) (electric power domain):
This is an N×M collection which shows the threats as correlated to specific vulnerabilities. There is one row for each threat. There is a threat correlation of how the specific threat correlates to a given vulnerability.
Each cell shows how threat is present on a particular vulnerability (relative values).
Any relative score in a pre-determined scale of points would work.
The confidence factor is the % probability that a particular threat can occur. As an example, a tsunami is a threat in California, however the threat is relatively low compared to some other regions of the world.
A threat is a quantification of how a particular threat affects a particular vulnerability.

Security Risk related threat from vulnerability valuation is calculated: (1508) (electric power domain):

Computing the vulnerability collection (1×N) with threat from vulnerability collection (N×M) results in a (1×N) collection. This final collection represents relative valuation of each of these N threats for the given set of vulnerabilities.

This is an final computational collection.

The value is in Dollars based on %'s and $ values from business functions.

TABLE 6

Vulnerability to Threat Correlations

| A | B | C | D | E | F | G | H | I |
|---|---|---|---|---|---|---|---|---|
| 1 Vulnerability To Threat Correlation | | | | | | | | |
| 2 Description | Disk Failure | SQL Injection | Power Outage | Telecommunications Failure | Owner | Start Date | End Date | Notes: |
| 3 Power Surge | I = AA % C = BB % W = CC % | Null | I = AA % C = BB % W = CC % | I = AA % C = BB % W = CC % | | Past | Future | |
| 4 Malicious External Penetration | Null | I = AA % C = BB % W = CC % | Null | Null | | Past | Future | |
| 5 Corrupt Insider | Null | I = AA % C = BB % W = CC % | Null | Null | | Past | Future | |
| 6 High Demand | Null | Null | I = AA % C = BB % W = CC % | Null | | Past | Future | |

Size: A (1×N) collection where: N=threats for the given set of vulnerabilities functions.

TABLE 7

Security Risk related Threat from Vulnerability Calculation
Threat From Vulnerability Function Calculation

| A | B | C | D | E | F | G |
|---|---|---|---|---|---|---|
| 1 Threat From Vulnerability Function Calulation | | | | | | |

TABLE 7-continued

Security Risk related Threat from Vulnerability Calculation
Threat From Vulnerability Function Calculation

| | A | B | C | D | E | F | G |
|---|---|---|---|---|---|---|---|
| 2 | Description | Vulnerability From Function Correlation | Confidence Factor | Owner | Start Date | End Date | Notes: 1. The value will be in Dollars based on %'s and $ values from BF's. |
| 3 | Power Surge | Calculated $$ Value | 100% | | Past | Future | |
| 4 | Malicious External Breach | Calculated $$ Value | 100% | | Past | Future | |
| 5 | Corrupt Insider | Calculated $$ Value | 100% | | Past | Future | |
| 6 | High Demand | Calculated $$ Value | 100% | | Past | Future | |
| 7 | Threat Validation +1 Note: 1 additional for an unknown | Calculated $$ Value | 100% | | Past | Future | |

Security Risk related threat to business function ranking correlation: (1509) (electric power domain):
  The final threat ranked collection is correlated back to the originating business functions via a backwards reversal of the tree. The tree is the correlation of business functions to assets and assets to vulnerabilities and vulnerabilities to threats.
Security Risk related ranked business function to threat output: (1510) (electric power domain):
  The reverse tree look from (1509) is aggregated into a collection which shows the ranked threats correlated back to the original business functions.

Use Case 8: Natural Disaster Risk Evaluation in the Electric Power Domain
  Examples of natural disaster risks to be evaluated (1502, 1510) (electric power domain):
    NOTE: The following is generic to all the cell values (1502, 1510):
      I—Impact: The impact of the asset to the business function.
      W—Weight: The weight ratio determining the overall relative weighting.
      C—Confidence: The confidence in the impact and weight ratios.
  T (1502)
    A list of relevant business functions is determined using a template and by interviewing domain experts.
    Note: These are generally ranked as their relative dollar impact to the business Natural Disaster related business function to assets correlations are associated (1503) (electric power domain):
  This is a collection of cells which shows the assets as correlated to a specific business function. There is one row for each asset. There is an asset correlation of each asset to each business function.
  In this use case, it is determined that electric utility assets correlate to the business functions determined in (1502).
    An asset may have zero correlation to a specific business function.
    The value of the asset to business function is a relative ranking. This is a value between 0 and 1, where 0 represents no correlation and 1 is a 100% correlation.
    Describes how performance of each business function is dependent on different assets.
  Asset Valuation:

$F(x) = \Sigma_{\forall\ consequential\ adverse\ events}$(Asset Cost, time*impact of derating,time*revenue loss)

Note: All durations are determined based on the domain starting with business function to asset.

TABLE 8

Natural Disaster related Security Risk related Business Functions

| | A | B | C | D | E | F | G | H | I |
|---|---|---|---|---|---|---|---|---|---|
| 1 | Business Function | | | | | | | | |
| 2 | Description | Weight Value (Dollar Valuation) Valuation in Millions of | $ Value Range | Confidence Factor | Owner | Duration | Start Date | End Date | Notes: |
| 3 | Transmission Operations | I = AA % C = BB % W = CC % | | 100% | | N | Past | Future | >115 KV System |
| 4 | Distribution Operations | I = AA % C = BB % W = CC % | | 100% | | N | Past | Future | <11 KV |
| 5 | Maintenance Operations | I = AA % C = BB % W = CC % | | 100% | | N | Past | Future | 10% yearly if no maintenance |
| 6 | Customer Relationships | I = AA % C = BB % W = CC % | | 100% | | N | Past | Future | Phone lines/customer support operations |

TABLE 9

Natural Disaster related Business Function to Assets Correlations

| A | B | C | D | E | F | G | H | I | J |
|---|---|---|---|---|---|---|---|---|---|
| 1 Business Function To Asset Correlation | | | | | | | | | |
| 2 Description | Transmission Operations | Distribution Operations | Maintenance Operations | Customer Relationships | Asset Value Includes per time loss | Owner | Start Date | End Date | Notes/ Questions: |
| 3 Substation East | I = AA % C = BB % W = CC % | I = AA % C = BB % W = CC % | Null | Null | | | Past | Future | |
| 4 15 Large Transformers | I = AA % C = BB % W = CC % | I = AA % C = BB % W = CC % | Null | Null | | | Past | Future | |
| 5 1500 Small Transformers | I = AA % C = BB % W = CC % | I = AA % C = BB % W = CC % | Null | Null | | | Past | Future | |
| 6 15,000 Meters | Null | I = AA % C = BB % W = CC % | I = AA % C = BB % W = CC % | I = AA % C = BB % W = CC % | | | Past | Future | |
| 7 75 Feeders | I = AA % C = BB % W = CC % | I = AA % C = BB % W = CC % | Null | Null | | | Past | Future | |
| 8 Truck Fleet (15 Trucks) | I = AA % C = BB % W = CC % | I = AA % C = BB % W = CC % | I = AA % C = BB % W = CC % | I = AA % C = BB % W = CC % | | | Past | Future | |
| 9 Call Center | I = AA % C = BB % W = CC % | I = AA % C = BB % W = CC % | I = AA % C = BB % W = CC % | I = AA % C = BB % W = CC % | | | Past | Future | |

Natural Disaster related asset from business function valuation is calculated: (1504) (electric power domain):
Computing the business function collection (1×N) with asset score collection (N×M) results in a 1×N collection. This intermediate collection represents relative valuation of each of these N assets for the given set of business functions.
This is an intermediate computational collection.
The value is in Dollars based on %'s and $ values from business functions.

Natural Disaster related Asset to vulnerability correlations are associated (1505) (electric power domain):
This is an N×M collection which shows the vulnerabilities as correlated to a specific asset. There is one row for each vulnerability item. There is a vulnerability correlation of how the specific vulnerability correlates to each given asset.
Each cell shows how vulnerability is present on a particular asset (relative values).

TABLE 10

Natural Disaster related Vulnerability to Threat Correlations

| A | B | C | D | E | F | G |
|---|---|---|---|---|---|---|
| 1 Asset From Business Function Calculation | | | | | | |
| 2 Description | Asset From Business Function Correlation | Confidence Factor | Owner | Start Date | End Date | Notes: |
| 3 Substation East | Calculated $$ Value | 100% | | Past | Future | |
| 4 15 Large Transformers | Calculated $$ Value | 100% | | Past | Future | |
| 5 1500 Small Transformers | Calculated $$ Value | 100% | | Past | Future | |
| 6 15,000 Meters | Calculated $$ Value | 100% | | Past | Future | |
| 7 75 Feeders | Calculated $$ Value | 100% | | Past | Future | |
| 8 Truck Fleet (15 Trucks) | Calculated $$ Value | 100% | | Past | Future | |
| 9 Call Center | Calculated $$ Value | 100% | | Past | Future | |

Any relative score in a pre-determined scale of points would work.

TABLE 11

Natural Disaster Related Vulnerability to Threat Correlations

| A | B | C | D | E | F | G | H | I | J | K | L |
|---|---|---|---|---|---|---|---|---|---|---|---|
| 1 Asset To Vunerability Correlation | | | | | | | | | | | |

TABLE 11-continued

Natural Disaster Related Vulnerability to Threat Correlations

| | A | B | C | D | E | F | G | H | I | J | K | L |
|---|---|---|---|---|---|---|---|---|---|---|---|---|
| 2 | Description | Substation East | 15 Large Transformers | 1500 Small Transformers | 15,000 Meter | 75 Feeders | Truck Fleet (15 Trucks) | Call Center | Owner | Start Date | End Date | Notes/ Questions: |
| 6 | Telecommunications Failure | I = AA % C = BB % W = CC % | Null | Null | I = AA % C = BB % W = CC % | Null | Null | I = AA % C = BB % W = CC % | | Past | Future | |
| 7 | Vehicular Accident | Null | I = AA % C = BB % W = CC % | I = AA % C = BB % W = CC % | Null | I = AA % C = BB % W = CC % | I = AA % C = BB % W = CC % | Null | | Past | Future | |
| 8 | Thermal Failure of Power Lines | I = AA % C = BB % W = CC % | I = AA % C = BB % W = CC % | I = AA % C = BB % W = CC % | Null | I = AA % C = BB % W = CC % | Null | Null | | Past | Future | |
| 9 | Mechanical Failure of Power Line | Null | Null | Null | Null | I = AA % C = BB % W = CC % | I = AA % C = BB % W = CC % | Null | | Past | Future | |
| 10 | Structural Failures | I = AA % C = BB % W = CC % | I = AA % C = BB % W = CC % | I = AA % C = BB % W = CC % | Null | I = AA % C = BB % W = CC % | Null | Null | | Past | Future | |

Natural Disaster related vulnerability from asset valuation is calculated: (1506) (electric power domain):
Computing the vulnerability collection (1×N) with asset score collection (N×M) results in a 1×N collection. This intermediate collection represents relative valuation of each of these N vulnerabilities for the given set of assets.
This is an intermediate computational collection.
The value is in Dollars based on %'s and $ values from business functions.
Size: A (1×N) collection where: N=vulnerabilities for the given set of asset functions.

row for each threat. There is a threat correlation of how the specific threat correlates to a given vulnerability.
Each cell shows how threat is present on a particular vulnerability (relative values).
Any relative score in a pre-determined scale of points would work.
The confidence factor is the % probability that a particular threat can occur. As an example, a Tsunami is a threat in California, however the threat is rela-

TABLE 12

Natural Disaster related Vulnerability to Threat Correlations

| | A | B | C | D | E | F | G |
|---|---|---|---|---|---|---|---|
| 1 | Vunerability From Asset Function Calculation | | | | | | |
| 2 | Description | Vunerability From Function Correlation | Confidence Factor | Owner | Start Date | End Date | Notes/ Questions: |
| 4 | Telecommunications Failure | Calculated $$ Value | 100% | | Past | Future | |
| 5 | Vehicular Accident | Calculated $$ Value | 100% | | Past | Future | |
| 6 | Thermal Failure of Power Lines | Calculated $$ Value | 100% | | Past | Future | |
| 7 | Mechanical Failure of Power Lines | Calculated $$ Value | 100% | | Past | Future | |
| 8 | Structural Failures | Calculated $$ Value | 100% | | Past | Future | |

Natural Disaster related vulnerability to threat correlations are associated (1507) (electric power domain):
This is an N×M collection which shows the threats as correlated to specific vulnerabilities. There is one tively low compared to some other regions of the world.
A threat is a quantification of how a particular threat affects a particular vulnerability.

TABLE 13

Natural Disaster related Vulnerability to Threat Correlations

| | A | B | C | D | E | F | G | H | I | J |
|---|---|---|---|---|---|---|---|---|---|---|
| 1 | Vunerability To Threat Correlation | | | | | | | | | |
| 2 | Description | Telecommunications Failure | Vehicular Accident | Thermal Failure of Power Lines | Mechanical Failure of Power Lines | Structural Failures | Owner | Start Date | End Date | Notes/ Questions: |

TABLE 13-continued

Natural Disaster related Vulnerability to Threat Correlations

| | A | B | C | D | E | F | G | H | I | J |
|---|---|---|---|---|---|---|---|---|---|---|
| 3 | Power Surge | I = AA %<br>C = BB %<br>W = CC % | Null | Null | Null | Null | | Past | Future | |
| 4 | High Demand | Null | Null | I = AA %<br>C = BB %<br>W = CC % | Null | Null | | Past | Future | |
| 5 | Local Construction | I = AA %<br>C = BB %<br>W = CC % | Null | Null | Null | Null | | Past | Future | |
| 6 | Ice Storm | Null | I = AA %<br>C = BB %<br>W = CC % | Null | I = AA %<br>C = BB %<br>W = CC % | Null | | Past | Future | |
| 7 | Wildfire | I = AA %<br>C = BB %<br>W = CC % | Null | I = AA %<br>C = BB %<br>W = CC % | I = AA %<br>C = BB %<br>W = CC % | I = AA %<br>C = BB %<br>W = CC % | | Past | Future | |
| 8 | Earthquake | I = AA %<br>C = BB %<br>W = CC % | I = AA %<br>C = BB %<br>W = CC % | Null | I = AA %<br>C = BB %<br>W = CC % | I = AA %<br>C = BB %<br>W = CC % | | Past | Future | |

Natural Disaster related threat from vulnerability valuation is calculated: (1508) (electric power domain):

Computing the vulnerability collection (1×N) with threat from vulnerability collection (N×M) results in a (1×N) collection. This final collection represents relative valuation of each of these N threats for the given set of vulnerabilities.

This is an final computational collection.

The value is in Dollars based on %'s and $ values from business functions.

Size: A (1×N) collection where: N=threats for the given set of vulnerabilities functions.

TABLE 14

Natural Disaster related Threat from Vulnerability Calculation

| | A | B | C | D | E | F | G |
|---|---|---|---|---|---|---|---|
| 1 | Threat From Vunerability Function Calculation | | | | | | |
| 2 | Description | Vunerability From Function | Confidence Factor | Owner | Start Date | End Date | Notes/Questions: |
| 3 | Power Surge | Calculated $$ Value | 100% | | Past | Future | |
| 4 | High Demand | Calculated $$ Value | 100% | | Past | Future | |
| 5 | Local Construction | Calculated $$ Value | 100% | | Past | Future | |
| 6 | Ice Storm | Calculated $$ Value | 100% | | Past | Future | |
| 7 | Wildfire | Calculated $$ Value | 100% | | Past | Future | |
| 8 | Earthquake | Calculated $$ Value | 100% | | Past | Future | |
| 9 | Threat Valuation +1<br>Note: 1 additional for an unknown | Calculated $$ Value | 100% | | Past | Future | |

Threat to business function ranking correlation: (1509) (electric power domain):

The final threat ranked collection is correlated back to the originating business functions via a backwards reversal of the tree. The tree is the correlation of business functions to assets and assets to vulnerabilities and vulnerabilities to threats.

Ranked business function to threat output: (1510) (electric power domain):

The reverse tree look from (1509) is aggregated into a collection which shows the ranked threats correlated back to the original business functions.

Use Case 9: Asset Management Risk Evaluation in the Electric Power Domain

Examples of Asset Management to be evaluated (1502, 1510) (electric power domain):

NOTE: The following is generic to all the cell values (1502, 1510)

Each Cell contains the following three values:

I—Impact: The impact of the asset to the business function,

W—Weight: The weight ratio determining the overall relative weighting.

C—Confidence: The confidence in the impact and weight ratios.

T (1502)

A list of relevant business functions is determined using a template and by interviewing domain experts.

Note: These are generally ranked as their relative dollar impact to the business.

TABLE 15

Asset Management related Security Risk related Business Functions

| A | B | C | D | E | F | G | H | I |
|---|---|---|---|---|---|---|---|---|
| 1 Business Function | | | | | | | | |
| 2 Description | Weight Value (Dollar Valuation) Valuation in Millions of | $ Value Range | Confidence Factor | Owner | Duration | Start Date | End Date | Notes/Questions: |
| 3 Condition Monitoring | I = AA % C = BB % W = CC % | | 100% | | N | Past | Future | Service revenue from maintenence (optimized to save $) What is the failure-cost of operation |
| 4 Transmissions Operations | I = AA % C = BB % W = CC % | | 100% | | N | Past | Future | >115 KV System |
| 5 Distribution Operations | I = AA % C = BB % W = CC % | | 100% | | N | Past | Future | <11 KV |
| 6 Maintenance Operations | I = AA % C = BB % W = CC % | | 100% | | N | Past | Future | 10% yearly if no maintenance |

Business function to assets correlations are associated (1503) (electric power domain):
  This is a collection of cells which shows the assets as correlated to a specific business function. There is one row for each asset. There is an asset correlation of each asset to each business function.
  In this use case, it is determined that electric utility assets are determined to correlate to the business functions determined in (1502).
  An asset may have zero correlation to a specific business function.

The value of the asset to business function is a relative ranking. This is a value between 0 and 1 where 0 represents no correlation and 1 is a 100% correlation.
Describes how performance of each business function is dependent on different assets.
Asset Valuation:

$F(x) = \Sigma_{\forall\ consequential\ adverse\ events}$(Asset Cost, time*impact of derating, time*revenue loss)

Note: All durations are determined based on the domain starting with business function to asset.

TABLE 16

Asset Management related Business Function to Assets Correlations

| A | B | C | D | E | F | G | H | I | J |
|---|---|---|---|---|---|---|---|---|---|
| 1 Business Function To Asset Correlation | | | | | | | | | |
| 2 Description | Condition Monitoring | Transmission Operations | Distribution Operations | Maintenance Operations | Asset Value Includes per time loss | Owner | Start Date | End Date | Notes/ Questions: |
| 3 Substation East | I = AA % C = BB % W = CC % | I = AA % C = BB % W = CC % | I = AA % C = BB % W = CC % | I = AA % C = BB % W = CC % | | | Past | Future | |
| 4 15 Large Transformers | I = AA % C = BB % W = CC % | I = AA % C = BB % W = CC % | I = AA % C = BB % W = CC % | Null | | | Past | Future | |
| 5 1500 Small Transformers | I = AA % C = BB % W = CC % | I = AA % C = BB % W = CC % | I = AA % C = BB % W = CC % | Null | | | Past | Future | |
| 6 75 Feeders | I = AA % C = BB % W = CC % | I = AA % C = BB % W = CC % | I = AA % C = BB % W = CC % | I = AA % C = BB % W = CC % | | | Past | Future | |
| 7 Wind Turbines | I = AA % C = BB % W = CC % | I = AA % C = BB % W = CC % | I = AA % C = BB % W = CC % | I = AA % C = BB % W = CC % | | | Past | Future | |

Asset Management related asset from business function valuation is calculated: (1504) (electric power domain):
Computing the business function collection (1×N) with asset score collection (N×M) results in a 1×N collection. This intermediate collection represents relative valuation of each of these N assets for the given set of business functions.
This is an intermediate computational collection.
The value is in dollars based on %'s and $ values from business functions.

Asset Management related vulnerability from asset valuation is calculated: (1506) (electric power domain):
Computing the vulnerability collection (1×N) with asset score collection (N×M) results in a 1×N collection. This intermediate collection represents relative valuation of each of these N vulnerabilities for the given set of assets.
This is an intermediate computational collection.
The value is in dollars based on %'s and $ values from business functions.
Size: A (1×N) collection where: N=vulnerabilities for the given set of asset functions.

TABLE 17

Asset Management related Vulnerability to Threat Correlations

| | A | B | C | D | E | F | G |
|---|---|---|---|---|---|---|---|
| 1 | Asset From Business Function Calculation | | | | | | |
| 2 | Description | Asset From Business Function Correlation | Confidence Factor | Owner | Start Date | End Date | Notes: |
| 3 | Substation East | Calculated $$ Value | 100% | | Past | Future | |
| 4 | 15 Large Transformers | Calculated $$ Value | 100% | | Past | Future | |
| 5 | 1500 Small Transformers | Calculated $$ Value | 100% | | Past | Future | |
| 6 | 75 Feeders | Calculated $$ Value | 100% | | Past | Future | |
| 7 | Wind Turbines | Calculated $$ Value | 100% | | Past | Future | |

Asset Management related asset to vulnerability correlations are associated (1505) (electric power domain):
This is an N×M collection which shows the vulnerabilities as correlated to a specific asset. There is one row for each vulnerability item. There is a vulnerability correlation of how the specific vulnerability correlates to each given asset.
Each cell shows how vulnerability is present on a particular asset (relative values).
Any relative score in a pre-determined scale of points would work.

TABLE 18

Asset Management related Vulnerability to Threat Correlations

| | A | B | C | D | E | F | G | H | I | J |
|---|---|---|---|---|---|---|---|---|---|---|
| 1 | Asset To Vunerability Correlation | | | | | | | | | |
| 2 | Description | Substation East | 15 Large Transformers | 1500 Small Transformers | 75 Feeders | Wind Turbines | Owner | Start Date | End Date | Notes/Questions: |
| 6 | Telecommunications Failure | I = AA %<br>C = BB %<br>W = CC % | Null | Null | Null | Null | | Past | Future | |
| 7 | Thermal Failure of Power Lines | I = AA %<br>C = BB %<br>W = CC % | I = AA %<br>C = BB %<br>W = CC % | I = AA %<br>C = BB %<br>W = CC % | I = AA %<br>C = BB %<br>W = CC % | Null | | Past | Future | |
| 8 | Mechanical Failure of Power Line | Null | Null | Null | I = AA %<br>C = BB %<br>W = CC % | I = AA %<br>C = BB %<br>W = CC % | | Past | Future | |
| 9 | Premature Component Failure | I = AA %<br>C = BB %<br>W = CC % | I = AA %<br>C = BB %<br>W = CC % | I = AA %<br>C = BB %<br>W = CC % | Null | I = AA %<br>C = BB %<br>W = CC % | | Past | Future | Turbine component failure due to abnormal operating conditions |
| 10 | Structural Failures | I = AA %<br>C = BB %<br>W = CC % | I = AA %<br>C = BB %<br>W = CC % | I = AA %<br>C = BB %<br>W = CC % | I = AA %<br>C = BB %<br>W = CC % | Null | | Past | Future | |

TABLE 19

Asset Management Related Vulnerability toThreat Correlations

| A | B | C | D | E | F | G |
|---|---|---|---|---|---|---|
| 1 Vunerability From Asset Function Calculation | | | | | | |
| 2 Description | Vunerability From Function Correlation | Confidence Factor | Owner | Start Date | End Date | Notes/ Questions: |
| 4 Telecommunications Failure | Calculated $$ Value | 100% | | Past | Future | |
| 5 Thermal Failure of Power Lines | Calculated $$ Value | 100% | | Past | Future | |
| 6 Mechanical Failure of Power Lines | Calculated $$ Value | 100% | | Past | Future | |
| 7 Premature Component Failure | Calculated $$ Value | 100% | | Past | Future | |
| 8 Structural Failures | Calculated $$ Value | 100% | | Past | Future | |

Asset Management related vulnerability to threat correlations are associated (1507) (electric power domain): This is an N×M collection which shows the threats as correlated to specific vulnerabilities. There is one row for each threat. There is a threat correlation of how the specific threat correlates to a given vulnerability.

Each cell shows how threat is present on a particular vulnerability (relative values).

Any relative score in a pre-determined scale of points would work.

The confidence factor is the % probability that a particular threat can occur. As an example, a Tsunami is a threat in California, however the threat is relatively low compared to some other regions of the world.

A threat is a quantification of how a particular threat affects a particular vulnerability.

Asset Management related threat from vulnerability valuation is calculated: (1508) (electric power domain):

Computing the vulnerability collection (1×N) with threat from vulnerability collection (N×M) results in a (1×N) collection. This final collection represents relative valuation of each of these N threats for the given set of vulnerabilities.

This is an final computational collection.

The value is in dollars based on %'s and $ values from business functions.

Size: A (1×N) collection where: N=threats for the given set of vulnerabilities functions.

TABLE 20

Asset Management Related Vulnerability to Threat Correlations

| A | B | C | D | E | F | G | H | I | J |
|---|---|---|---|---|---|---|---|---|---|
| 1 Vulnerability To Threat Correlation | | | | | | | | | |
| 2 Description | Telecommunications Failure | Thermal Failure of Power Lines | Mechanical Failure of Power Line | Premature Component Failure | Structural Failures | Owner | Start Date | End Date | Notes/ Questions: |
| 3 Power Surge | I = AA % C = BB % W = CC % | Null | Null | Null | Null | | Past | Future | |
| 4 High Demand | Null | I = AA % C = BB % W = CC % | Null | I = AA % C = BB % W = CC % | Null | | Past | Future | |
| 5 Excessive Temperature Deviations | I = AA % C = BB % W = CC % | Null | Null | I = AA % C = BB % W = CC % | Null | | Past | Future | |
| 6 Highly Variable Wind Speeds | Null | I = AA % C = BB % W = CC % | I = AA % C = BB % W = CC % | I = AA % C = BB % W = CC % | I = AA % C = BB % W = CC % | | Past | Future | |
| 7 Wildfire | I = AA % C = BB % W = CC % | I = AA % C = BB % W = CC % | I = AA % C = BB % W = CC % | I = AA % C = BB % W = CC % | I = AA % C = BB % W = CC % | | Past | Future | |
| 8 Ice Storm | Null | Null | I = AA % C = BB % W = CC % | I = AA % C = BB % W = CC % | Null | | Past | Future | |

TABLE 21

Asset Management related Threat from Vulnerability Calculation

| | A | B | C | D | E | F | G |
|---|---|---|---|---|---|---|---|
| 1 | Threat From Vunerability Function Calculation | | | | | | |
| 2 | Description | Vunerability From Function | Confidence Factor | Owner | Start Date | End Date | Notes/ Questions: |
| 3 | Power Surge | Calculated $$ Value | 100% | | Past | Future | |
| 4 | High Demand | Calculated $$ Value | 100% | | Past | Future | |
| 5 | Excessive Temperature Deviations | Calculated $$ Value | 100% | | Past | Future | |
| 6 | Highly Variable Wind Speeds | Calculated $$ Value | 100% | | Past | Future | |
| 7 | Wildfire | Calculated $$ Value | 100% | | Past | Future | |
| 8 | Ice Storm | Calculated $$ Value | 100% | | Past | Future | |
| 9 | Threat Valuation +1 Note: 1 additional for an unknown | Calculated $$ Value | 100% | | Past | Future | |

Asset Management related threat to business function ranking correlation: (1509) (electric power domain):
 The final threat ranked collection is correlated back to the originating business functions via a backwards reversal of the tree. The tree is the correlation of business functions to Assets and Assets to Vulnerabilities and Vulnerabilities to Threats.
Ranked business function to threat output: (1510) (electric power domain):
 The reverse tree look from (1509) is aggregated into a collection which shows the ranked threats correlated back to the original business functions.

Computer Implementation

Figure 19:
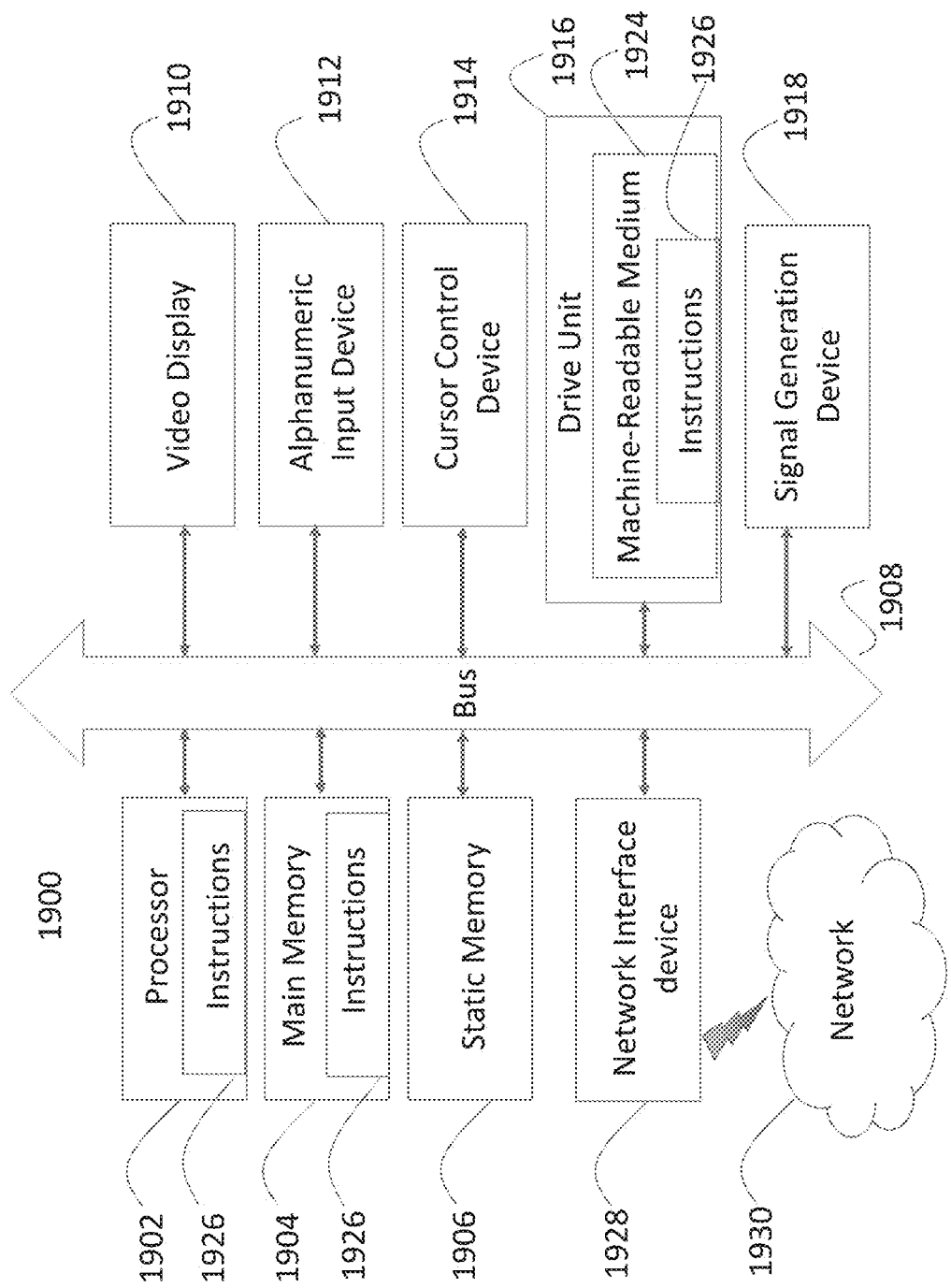
FIG. 19 is a block schematic diagram that depicts a machine in the exemplary form of a computer system within which a set of instructions for causing the machine to perform any of the herein disclosed methodologies may be executed.

FIG. 19 is a block schematic diagram that depicts a machine in the exemplary form of a computer system 1900 within which a set of instructions for causing the machine to perform any of the herein disclosed methodologies may be executed. In alternative embodiments, the machine may comprise or include a network router, a network switch, a network bridge, personal digital assistant (PDA), a cellular telephone, an Intelligent Electronic Device (IED) embedded in mechanical or electric equipment or appliance, a Web appliance or any machine capable of executing or transmitting a sequence of instructions that specify actions to be taken.

The computer system (1900) includes a processor (1902), a main memory (1904) and a static memory (1906), which communicates with each other via a bus (1908). The computer system (1900) may further include a display unit (1910), for example, a liquid crystal display (LCD), a light emitting diode (LED) display or a cathode ray tube (CRT). The computer system (1900) also includes an alphanumeric input device (1912), for example, a keyboard; a cursor control device (1914), for example, a mouse; a disk drive unit (1916), a signal generation device (1918), for example, a speaker, and a network interface device (1928).

The disk drive unit (1916) includes a machine-readable medium (1924), for example semiconductor, magnetic or optical, on which is stored a set of executable instructions, i.e., software, (1926) embodying any one, or all, of the methodologies described herein below. The software (1926) is also shown to reside, completely or at least partially, within the main memory (1904) and/or within the processor (1902). The software (1926) may further be transmitted or received over a network (1930) by means of a network interface device (1928).

In contrast to the system (1900) discussed above, a different embodiment uses logic circuitry instead of computer-executed instructions to implement processing entities. Depending upon the particular requirements of the application in the areas of speed, expense, tooling costs, and the like, this logic may be implemented, in part or in totality, by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for protecting an enterprise-wide computer network of operational technology (OT) systems, information technology (IT) systems, and security systems (ST) that are embedded in a computer network of a larger global set of enterprises and that are protected by a dynamic and adaptive perimeter security system from external malicious agents and adverse events, said enterprise-wide computer network comprising a plurality of clusters of subsystems, each subsystem comprising a plurality of lower level subsystems and individual computers, said individual computers, in turn, comprising a plurality of other smaller monitored and controlled elements (MCE) comprising computers, applications, sensors, actuators, and underlying business processes, the method comprising:

conforming elemental processes in said enterprise-wide computer network to a processor-implemented self-similar structure comprising a plurality of business processes spread over a plurality of domains, said domains comprising any and all of operational systems, IT systems, and security systems;

representing the most elemental business and operational processes in each domain as a network supporting exchange of value that represents information and action, wherein all elementary business processes in all of said domains are conceptually and logically similar to each other;

wherein the elemental processes in an enterprise are based on any of a physical or logical network, a conceptual network, and organizational structures; and extending self similarity to all layers in said network, wherein a smallest element is structurally a single sensor, actuator, or compute element, and functionally a single transaction between two elemental nodes;

performing pervasive and persistent business risk and security monitoring to adapt to evolving situational intelligence comprising of any and all normative and anomalous values, and state information and activities in the OT, IT, and ST systems;

providing autonomous and adaptive business and operational control capabilities, capacities, and security postures of target systems, subsystems, and elements at a plurality of hierarchical levels of said networks;

monitoring real-time conditions, values, state information, and activities on said network elements, as well as elements of underlying enterprise business processes that are affected if and when security of an element is breached or business processes compromised;

dynamically adapting said security monitoring and control capabilities, capacities, and postures at selected hierarchical levels and at selected time scales in response to enterprise situational knowledge and knowledge about domain specific normative models that is relevant to said OT, IT, and ST systems, as well as subsystems and elements of said systems with regard to said underlying business processes;

wherein said situational knowledge comprises any of situational changes in value, state, capabilities, capacities in monitoring, decision making, and control implementations, and adjustments thereof, and other transitions in any of said OT systems, IT systems, ST systems. and operational, business and, security threat environment;

wherein said hierarchical levels range from an entire enterprise-wide network at a highest level to a single transaction at a lowest level; and wherein said perimeters are logically around an entire enterprise-wide network at a highest level to a single computer or end device at a lowest level;

providing a threat and vulnerability analysis processor for dynamically executing a formal computational algorithm in response to dynamic input from other systems and environments to derive a ranked list of business functions subject to threats; and producing a dynamic output for use either stand-alone for enterprise operation, business, and security risk management or integrated into a pervasive framework to provide real-time and dynamic feed back into coordinated learning and rule engines determining next step control postures.

2. The method of claim 1, where said operational systems comprise any of power, water, sewage, gas, chemical processes, supply chains, and trading and other financial systems.

3. The method of claim 1, wherein said physical network comprises any of gas pipelines, electric transmission and distribution lines, railroads, highways, trading platforms, and health care data exchanges.

4. The method of claim 1, wherein said conceptual network comprises account structures within a bank.

5. The method of claim 1, wherein each element is represented by a node, and each of its interactions with other elements is represented by an edge.

6. The method of claim 1, wherein said OT systems comprise one or more industrial control systems (ICSs) further comprising embedded devices for monitoring, computing, and controlling performance of any of other physical process equipment, security devices, and application configuration.

7. The method of claim 1, wherein said enterprise elements that are monitored and controlled (MCEs) comprise any of:

an entire enterprise-wide OT and IT network comprising any of hardware, firmware, and software applications and systems distributed within diverse geographical locations;

one or more subsystems of said enterprise-wide OT and IT network;

one or more information or data processing device;

one or more peripheral devices and embedded information devices for monitoring, analyzing, processing, decision making, and actuating controls;

one or more software elements within said peripheral devices and embedded information devices;

one or more messages, represented by a collection of information and data elements, exchanged between said elements, devices, subsystems, and systems; and one or more messages exchanged between of said enterprise-wide network or its elements with any elements external to a monitored network.

8. A computer-implemented security method in a pervasively distributed architecture comprising an enterprise of operational technology (OT) systems and information technology (IT) systems having n business domains, modeled as n+2 networks with one network for each of the n business domains, one network for a supporting IT network, and another network for a security system (ST), comprising:

providing for each network a processor-implemented self-similar structure consisting of a plurality of monitored and controlled elements (MCE);

deploying a holistic security and operation monitor pervasively around each MCE to monitor and analyze said MCE's producer-consumer interactions with other MCEs, said security monitor providing situational monitoring and producing control posture information from each MCE with other subscribing MCEs consuming and adaptively adjusting their control postures in turn;

based upon said self-similar structure, monitoring, analyzing, and adjusting control postures of all MCEs corresponding to various geographical, organizational, and temporal hierarchies within said distributed architecture;

pervasively monitoring security and operational variables, states, functions and adaptively reconfiguring security and operation control capabilities, capacities, and postures at selected hierarchical levels and at selected time scales in response to enterprise situational knowledge that is relevant to said OT, IT, and ST networks, as well as subsystems and elements of said networks with regard to underlying business processes;

wherein said situational knowledge comprises any of situational changes, control implementations, and adjustments thereof, and other transitions in any of said OT systems, said IT systems, and a security threat environment; and wherein said hierarchical levels range from an entire enterprise-wide network and business operation at a highest level to a single sensor, processor, or actuator and information transaction at a lowest level;

providing a threat and vulnerability analysis processor for dynamically executing a formal computational algorithm in response to dynamic input from other systems to derive a ranked list of business functions subject to threats; and producing a dynamic output for use either stand-alone for enterprise operation, business, and security risk management or integrated into a pervasive framework to provide real-time and dynamic feed back into coordinated learning and rule engines determining next step security control.

9. The method of claim 8, wherein said MCEs comprise fractal objects and networks that are similar in structure and procedures on all scales, and polymorphic, in that they are overloaded to take on different context-dependent inputs and operate accordingly by appropriate selection and configuration of available capabilities, functions and scales, with each other, wherein said MCEs differ only in the scope of the input data and output results.

10. The method of claim 8, wherein said OT systems comprise one or more industrial control systems (ICSs) further comprising embedded devices for monitoring, analyzing, and controlling performance of other physical process equipment.

11. A computer-implemented network security method, comprising:
    providing an enterprise comprising:
        an enterprise-wide computer network; and
        a plurality of computers in said network organized into clusters,
    wherein each cluster comprises one or more computers designated as a server or client, wherein said computers within each cluster communicate with each other through physical network configurations and logical messaging structures, wherein a computer comprises any of a real computer and a virtual computer; and
    providing a processor-implemented formal business and security threat prioritization processor configured to lower analysis and control priority of less consequential inputs, wherein information exchanges among computer applications, along with state information about devices and infrastructure controlled by devices, are monitored, and wherein prioritized situational awareness information, including exogenous security incidents or state transition alerts, is analyzed and correlated for automated security risk analysis;

using a control synthesis process to implement a needed security control adjustment adaptively and automatically when a change in a situational awareness of operation, business or network state, function, value, or change in domain knowledge system, process, rule, or real time or longer interval control postures is warranted; and using said control synthesis process to implement a needed adjustment when a change in a security and business control blueprint, process, rule, or real time or longer interval control postures is warranted by:
    identifying increased risk through specific networked vulnerability analysis;
    determining that the increased risk has high consequentiality to the enterprise business and operation; and
    responsive thereto, triggering said control synthesis process dynamically, adaptively, and autonomously (distributive) to mitigate the threat while continuing the business functions resiliently.

12. A computer-implemented method for protecting an enterprise-wide computer network of operational technology (OT) systems, information technology (IT) systems, and security systems (ST) that are embedded in a computer network of a larger global set of enterprises and that are protected by a dynamic and adaptive perimeter security system from external malicious agents and adverse events, said enterprise-wide computer network comprising a plurality of clusters of subsystems, each subsystem comprising a plurality of lower level subsystems and individual computers, said computers, in turn, comprising a plurality of other smaller monitored and controlled elements (MCE) comprising computers, applications, sensors, and actuator systems, at every level within the enterprise-wide computer network, and underlying business processes, the method comprising:
    a processor implemented control synthesis process automatically constructing control functions implemented throughout the OT, IT, and ST systems;
    said processor receiving as inputs to the control synthesis process a high level behavioral description of control postures needed at specific OT and IT network elements in the form of control postures and performance requirements;
    said processor receiving knowledge about security functions available in the OT, IT, and ST systems and a full catalogue of their capabilities, capacities, and transformations as a pre-characterized library of standard security functions available in said OT, IT, and ST systems, reconfiguration or installation of macro security functions composed from said library of standard security functions including encryption and authentication, and performance and cost attributes for optimal composition of said functions at appropriate strength and locations to achieve effective low and high level control syntheses;
    said processor transforming high level requirements specified in the inputs into optimized control implementations by deploying algorithms which explore different control functions in the library to compose the low level implementation, as guided by the objectives and constraints;
    identifying increased risk through specific networked vulnerability analysis;
    determining that the increased risk has high consequentiality to the enterprise business and operation; and
    responsive thereto, triggering said control synthesis process for implementing dynamic security control adaptively, and autonomously (distributive) to mitigate the threat while continuing the business functions resiliently.

13. The method of claim 12, further comprising:
providing performance characteristics for reporting and implementing dynamic control performance, capacity, capabilities, and constraints at high level achieved by selection and composition from the said library of standard control functions to synthesize automatically the low level control implementation.

14. A computer-implemented method for monitoring an enterprise-wide computer network of operational technology (OT) systems, information technology (IT) systems, and security systems (ST) and dynamically analyzing asset and process vulnerability and consequent business and operational impact, said enterprise-wide monitoring of computer network comprising a plurality of clusters of monitoring and analysis subsystems, each subsystem comprising a plurality of lower level monitoring and analysis subsystems and individual computers, said computers, in turn, comprising a plurality of other smaller monitoring and analysis elements, wherein all computers, applications, sensors, analysis, and detection systems, at a plurality of hierarchical levels of said networks are configurable as monitoring and analysis elements, the method comprising:
providing a processor for performing real-time and longer interval monitoring, said monitoring comprising promiscuous listening in time and space and conducting deep message inspection of interactions among a plurality of computers and applications;
assigning a confidence measure to each interaction;
using said confidence measure to determine a clear and present anomaly in operational processes and enterprise network or a pre-cursor thereof;
with said confidence measure identifying increased risk through specific networked vulnerability analysis;
determining that the increased risk has high consequentiality to the enterprise business and operation; and
responsive thereto, triggering a control synthesis process for implementing dynamic security control adaptively, and autonomously (distributive) to mitigate the risk while continuing the business functions resiliently.

15. The method of claim 14, further comprising:
monitoring conditions, values, state information, and activities on said OT, IT, and ST network elements, as well as elements of underlying enterprise business and operational processes that are affected if and when security of an element is breached, operational processes diverge from normal characteristics, or business processes are compromised;
dynamically analyzing business, operational, and security risk of an enterprise in a pervasively distributed architecture, self-similar or otherwise in structure and function, comprising an enterprise of operational technology (OT) systems, information technology (IT) systems, and security technology systems (ST); and
performing pervasive and persistent business risk, operational risk, and security analysis through analysis of real-time conditions, values, state information, and activities on said network elements, as well as promiscuous listening of information exchanges among elements of underlying enterprise business processes that are affected if and when security of an element is breached or business processes are compromised.

16. The method of claim 14, further comprising:
monitoring of operational values and state information comprising determining that:
voltage and phase angle in a power network is anomalous;
volume of meter reading data through a network is significantly higher when compared to number of meters;
a number of customers without power following a transformer outage is a statistical outlier; or
a number of young insured making vision claims is too high.

17. The method of claim 14, further comprising:
dynamically monitoring a plurality of business and operation processes and asset correlations comprising a correlation between processes which comprise customer Web access or meter data collection and assets touched by process flows comprising any of data bases, network servers, hosting applications, peripheral devices; and
automatically determining any of a change in asset value, vulnerability index of an asset, and an increase in attack paths for a class of threats.

18. The method of claim 14, further comprising:
monitoring an increased vulnerability of an IT asset resulting from a deficit in patch management or a higher likelihood of an OT asset failure due to an increased frequency in thermal overloading or an increased likelihood of data leakage through an ST asset resulting from an improper firewall level setting; and
automatically determining that there is increased threat of attack or equipment outage through promiscuous listening to community emergency response team (CERT) and asset health monitoring data and weather updates.

19. An enterprise monitoring method, comprising:
providing at least one computer executing program instructions for dynamically analyzing business, operational, and security risk of said enterprise in a pervasively distributed architecture, self-similar or otherwise in structure and function, comprising an enterprise of operational technology (OT) systems, information technology (IT) systems, and security technology systems (ST), the method comprising:
receiving pervasive and evolving situational intelligence comprising of any and all normative and anomalous values, state information, and activities in the OT, IT, and ST systems as a result of monitoring real-time conditions, values, state information, and activities on said network elements and processes, as well as promiscuous listening of information exchanges among elements of underlying enterprise business processes that are affected if and when security of an element is breached or adverse operations compromise business processes;
wherein domain knowledge comprises directories, information, rules, and processes about functional capabilities, structural capacities, vulnerabilities in different configurations, settings, and connectivity for the OT, IT, and ST systems and subsystems, their topological, geographical, organizational, and temporal hierarchies within said distributed architecture;
dynamically correlating situational intelligence at selected hierarchical levels and at selected time scales with domain knowledge about respective normative and anomalous models that is relevant to said OT, IT, and ST networks, as well as subsystems and elements of said networks with regard to underlying operation and business processes;

identifying a dynamic increase or decrease of operational, business, and security risk through specific adverse impact analysis due to change in situational intelligence;
identifying increased risk through specific networked vulnerability analysis;
determining that the increased risk has high consequentiality to the enterprise business and operation; and
responsive thereto, triggering a control synthesis process for implementing dynamic security control adaptively, and autonomously (distributive) to mitigate the risk while continuing the business functions resiliently.

20. A computer implemented method of analyzing the consequence and logical and physical implication of situational intelligence at all hierarchical levels and time scales that is relevant to enterprise in a pervasively distributed architecture, self-similar or otherwise in structure and function, comprising any and all of operational technology (OT) systems, information technology (IT) systems, and security technology systems (ST), as well as subsystems and elements of said networks with regard to underlying operation and business processes, the method comprising:
   providing a processor executing program instructions for performing an analysis of a domain knowledge base regarding underlying business, operations, and security processes and assets, loss and de-rating impact to the operational, business, and security effectiveness, said analysis using normative models and knowledge embedded in the said knowledge base which is created, updated, and managed, with administrative, interactive, and automated updates through feedback and learning mechanisms;
   wherein domain knowledge comprises directories, information, rules, and processes about functional capabilities, structural capacities, transformation methods available to manage capabilities and capacities, vulnerabilities to different attacks in different settings, connectivity and configuration for the OT, IT, and ST systems and subsystems and their topological, geographical, organizational, and temporal hierarchies within said distributed architecture; and
   wherein situational intelligence comprises conditions, values, state information, and activities of said OT, IT, and ST systems comprising computers, applications, sensors, analysis, and detection systems, at a plurality of hierarchical levels of said networks;
   dynamically correlating said situational intelligence with said domain knowledge via application of respective normative and anomalous models that are relevant to said OT, IT, and ST systems, as well as subsystems and elements of said systems, with regard to underlying operation and business processes;
   identifying a dynamic increase or decrease of operational, business, and security risk in assets, processes, applications, equipment, devices, and transactions through specific adverse impact analysis of situational intelligence in the context of domain specific normative models;
   identifying increased risk through specific networked vulnerability analysis;
   determining that the increased risk has high consequentiality to the enterprise business and operation; and
   responsive thereto, triggering a control synthesis process for implementing dynamic security control adaptively, and autonomously (distributive) to mitigate the risk while continuing the business functions resiliently.

21. A computer implemented method for automatic generation (synthesis) of adaptive control functions and settings at all hierarchical levels and time scales that are relevant to an enterprise in a pervasively distributed architecture, self-similar or otherwise in structure and function, comprising enterprise operational technology (OT) systems, information technology (IT) systems, and security technology systems (ST), as well as subsystems and elements of said networks for protecting operation, business and security processes, devices, assets and transactions of an enterprise OT, IT, and ST systems, the method comprising:
   providing a processor executing program instructions for performing an analysis of the functional capabilities, structural capacities, transformation methods available to manage control and security capabilities, and capacities available at all hierarchical levels and time scales in the OT, IT, and ST systems, in the form of a security and control function library at various levels of composition of elemental security and control requirements and functions;
   determining functional control requirements at all hierarchical levels and time scales in the OT, IT, and ST systems;
   determining applicable constraints for a synthesis process based on latency, bandwidth, processing, and storage capacities available at all hierarchical levels and time scales in the OT, IT, and ST systems;
   mapping control function requirements and said constraints to perform logical and physical signature matching and fitting to low level control functions that are available in the said control function library;
   identifying increased risk through specific networked vulnerability analysis;
   determining that the increased risk has high consequentiality to the enterprise business and operation; and
   responsive thereto, triggering a control synthesis process for implementing dynamic security control adaptively, and autonomously (distributive) to mitigate the risk while continuing the business functions resiliently.

22. A computer implemented method for adaptively adjusting control functions and settings at all hierarchical levels and time scales that is relevant to enterprise in a pervasively distributed architecture, self-similar or otherwise in structure and function, comprising enterprise operational technology (OT) systems, information technology (IT) systems, providing automated and dynamic protection to operation, business, and security processes, devices, assets, and transactions of an enterprise OT, IT and ST systems, the method comprising:
   determining a situational context comprising conditions, values, state information, and activities on said OT, IT and ST systems at a plurality of hierarchical levels of said networks comprising computers, applications, sensors, analysis, and detection systems;
   determining a dynamic adjustment in functional control requirements at all hierarchical levels and time scales in the OT, IT, and ST systems in response to a new situational context;
   determining a dynamic adjustment in constraints for a re-synthesis process in terms of latency, bandwidth, processing, and storage capacities for needed control process available at all hierarchical levels and time scales in the OT, IT, and ST systems in response to the new situational context;
   mapping the dynamic adjustment in control function requirements and the constraints through difference or delta functional and structural mapping to low level control functions that are available in the said control function library;

using adaptive feedback for dynamically adjusting the control actions to effect elevated capability and actuating of controls from the differential functional and structural mapping;

identifying increased risk through specific networked vulnerability analysis;

determining that the increased risk has high consequentiality to the enterprise business and operation; and responsive thereto, triggering a control synthesis process for implementing dynamic security control adaptively, and autonomously (distributive) to mitigate the risk while continuing the business functions resiliently.

* * * * *